(12) United States Patent
Rastegardoost et al.

(10) Patent No.: US 12,671,561 B2
(45) Date of Patent: Jun. 30, 2026

(54) DYNAMIC MULTI-CARRIER UPLINK OPERATIONS

(71) Applicant: Ofinno, LLC, Reston, VA (US)

(72) Inventors: Nazanin Rastegardoost, McLean, VA (US); Hyoungsuk Jeon, Centreville, VA (US); Esmael Hejazi Dinan, McLean, VA (US); Hua Zhou, Vienna, VA (US); Ali Cagatay Cirik, Chantilly, VA (US); Hyukjin Chae, San Diego, CA (US); Foad Sohrabi, Maple (CA); Mohammad Ghadir Khoshkholgh Dashtaki, Reston, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/601,473

(22) Filed: Mar. 11, 2024

(65) Prior Publication Data

US 2024/0250799 A1      Jul. 25, 2024

Related U.S. Application Data

(63) Continuation of application No. PCT/US2022/054281, filed on Dec. 29, 2022.
(Continued)

(51) Int. Cl.
H04L 5/00 (2006.01)

(52) U.S. Cl.
CPC .......... H04L 5/0094 (2013.01); H04L 5/0053 (2013.01); H04L 5/0096 (2013.01); H04L 5/0007 (2013.01)

(58) Field of Classification Search
CPC ... H04L 5/0094; H04L 5/0053; H04L 5/0096; H04L 5/0007
(Continued)

(56) References Cited

U.S. PATENT DOCUMENTS

| | | |
|---|---|---|
| 10,270,570 B2 | 4/2019 | Liu et al. |
| 10,560,905 B2 | 2/2020 | Ryoo et al. |
| | (Continued) | |

FOREIGN PATENT DOCUMENTS

| | | |
|---|---|---|
| CN | 108886457 B | 11/2021 |
| EP | 3979539 A1 | 4/2022 |
| | (Continued) | |

OTHER PUBLICATIONS

3GPP TS 38.101-1 V16.4.0 (Jun. 2020); Technical Specification; 3rd Generation Partnership Project; Technical Specification Group Radio Access Network; NR; User Equipment (UE) radio transmission and reception; Part 1: Range 1 Standalone; (Release 16).
(Continued)

*Primary Examiner* — Chi Tang P Cheng
(74) *Attorney, Agent, or Firm* — Brett K. Gardner; Kavon Nasabzadeh; Jacob L. Mangan

(57) ABSTRACT

A wireless device comprises one or more processors and memory storing instructions. When executed by the one or more processors, the instructions cause the wireless device to receive one or more radio resource control, RRC, messages indicating: a plurality of band pairs for uplink switching; and whether each band pair, of the plurality of band pairs, is configured with uplink switching based on dual uplink or configured with uplink switching based on switched uplink. The instructions cause the wireless device to transmit, based on a first band pair, of the plurality of band pairs, being configured with dual uplink: a first uplink transmission via a first band of the first band pair; and a second uplink transmission via a second band of the first band pair.

19 Claims, 31 Drawing Sheets

Related U.S. Application Data

(60) Provisional application No. 63/294,762, filed on Dec. 29, 2021.

(58) Field of Classification Search
USPC .......................................................... 370/330
See application file for complete search history.

(56) References Cited

U.S. PATENT DOCUMENTS

| | | | |
|---|---|---|---|
| 10,638,483 | B2 | 4/2020 | Zhou et al. |
| 10,693,610 | B2 | 6/2020 | Liu et al. |
| 11,476,989 | B2 | 10/2022 | Liu et al. |
| 11,678,353 | B2 | 6/2023 | Choi et al. |
| 2011/0159867 | A1* | 6/2011 | Kuo ...................... H04W 28/16 |
| | | | 455/422.1 |
| 2018/0324715 | A1 | 11/2018 | Ryoo et al. |
| 2019/0044678 | A1 | 2/2019 | Liu et al. |
| 2019/0200337 | A1 | 6/2019 | Zhou et al. |
| 2020/0037383 | A1 | 1/2020 | Rico Alvarino et al. |
| 2020/0413305 | A1 | 12/2020 | Rahman et al. |
| 2021/0144716 | A1 | 5/2021 | Choi et al. |
| 2021/0306923 | A1 | 9/2021 | Ly et al. |
| 2022/0304112 | A1 | 9/2022 | Kumar |
| 2022/0322388 | A1 | 10/2022 | Takeda et al. |
| 2023/0156608 | A1 | 5/2023 | Park et al. |
| 2023/0254848 | A1* | 8/2023 | Rico Alvarino ...... H04L 5/0064 |
| | | | 370/330 |
| 2023/0309091 | A1 | 9/2023 | Rico Alvarino et al. |
| 2023/0354312 | A1* | 11/2023 | Nimbalker ............ H04L 5/0053 |
| 2024/0031114 | A1 | 1/2024 | Wang et al. |

FOREIGN PATENT DOCUMENTS

| | | | |
|---|---|---|---|
| WO | 2017/173388 | A1 | 10/2017 |
| WO | 2017/173388 | A8 | 10/2017 |
| WO | 2020/239041 | A1 | 12/2020 |
| WO | 2021/162620 | A1 | 8/2021 |
| WO | 2021/205419 | A1 | 10/2021 |
| WO | 2022/046933 | A1 | 3/2022 |
| WO | 2022/183397 | A1 | 9/2022 |
| WO | 2022/217617 | A1 | 10/2022 |
| WO | 2022/241603 | A1 | 11/2022 |
| WO | 2023/141801 | A1 | 8/2023 |
| WO | 2024/035643 | A1 | 2/2024 |

OTHER PUBLICATIONS

3GPP TS 38.101-2 V16.4.0 (Jun. 2020); Technical Specification; 3rd Generation Partnership Project; Technical Specification Group Radio Access Network; NR; User Equipment (UE) radio transmission and reception; Part 2: Range 2 Standalone; (Release 16).

3GPP TS 38.101-3 V16.4.0 (Jun. 2020); Technical Specification; 3rd Generation Partnership Project; Technical Specification Group Radio Access Network; NR; User Equipment (UE) radio transmission and reception; Part 3: Range 1 and Range 2 Interworking operation with other radios; (Release 16).

3GPP TS 38.101-4 V16.1.0 (Jun. 2020); Technical Specification; 3rd Generation Partnership Project; Technical Specification Group Radio Access Network; NR; User Equipment (UE) radio transmission and reception; Part 4: Performance requirements; (Release 16).

3GPP TS 38.211 V16.3.0 (Sep. 2020); Technical Specification; 3rd Generation Partnership Project; Technical Specification Group Radio Access Network; NR; Physical channels and modulation; (Release 16).

3GPP TS 38.212 V16.7.0 (Sep. 2021); Technical Specification; 3rd Generation Partnership Project; Technical Specification Group Radio Access Network; NR; Multiplexing and channel coding; (Release 16).

3GPP TS 38.213 V16.6.0 (Jun. 2021); Technical Specification; 3rd Generation Partnership Project; Technical Specification Group Radio Access Network; NR; Physical layer procedures for control (Release 16).

3GPP TS 38.214 V16.6.0 (Jun. 2021); Technical Specification; 3rd Generation Partnership Project; Technical Specification Group Radio Access Network; NR; Physical layer procedures for data; (Release 16).

3GPP TS 38.321 V16.6.0 (Sep. 2021); Technical Specification; 3rd Generation Partnership Project; Technical Specification Group Radio Access Network; NR; Medium Access Control (MAC) protocol specification; (Release 16).

3GPP TS 38.331 V16.5.0 (Jun. 2021); Technical Specification; 3rd Generation Partnership Project; Technical Specification Group Radio Access Network; NR; Radio Resource Control (RRC) protocol specification; (Release 16).

RP-212151; 3GPP TSG RAN Meeting #93-e; Electronic Meeting, Sep. 13-17, 2021; Source: Huawei, HiSilicon; Title: Updated views on Rel-18 uplink enhancement; Agenda item: 9.0.2; Document for: Discussion and decision.

RP-212702; 3GPP TSG RAN Meeting #94e; Electronic Meeting, Dec. 6-17, 2021; Source: NTT Docomo, Inc.; Title: New WID on NR UL Enhancements; Document for: Approval.

RP-213207; 3GPP TSG RAN Meeting #94-e; Electronic Meeting, Dec. 6-17, 2021; Source: CMCC; Title: Discussion on WID on NR uplink enhancements; Agenda item: 8.6.1; Document for: Discussion.

RP-213280; 3GPP TSG RAN Meeting #94e; Electronic meeting, Dec. 6-17, 2021; Agenda item: 8A.1; Source: Nokia, Nokia Shanghai Bell; Title: On Rel-18 UL Enhancements; Document for: Discussion.

RP-213285; 3GPP TSG RAN WG Meeting #94-e; Electronic Meeting, Dec. 6-17, 2021; Agenda Item: 8A. 1; Source: Lenovo, Motorola Mobility, Xiaomi; Title: On Rel-18 CA Enhancement; Document for: Discussion.

RP-213321; 3GPP TSG RAN Meeting #94-e; Electronic Meeting, Dec. 6-17, 2021; Agenda Item: 8A. 1; Source: NEC; Title: Views on NR UL Enhancements; Document for: Discussion and Decision.

RP-213394; 3GPP TSG RAN Meeting #94-e; Electronic Meeting, Dec. 6-17, 2021; Source: ZTE; Title: On Uplink Enhancements for 5G Advanced; Agenda item: 8A. 1; Document for: Discussion.

RWS-210436; 3GPP TSG RAN Rel-18 workshop; Electronic Meeting, Jun. 28-Jul. 2, 2021; Source: Huawei, HiSilicon; Title: NR uplink boosting; Agenda item: 4.3; Document for: Discussion and decision.

RP-211652; 3GPP TSG RAN#93e; Electronic Meeting, Sep. 13-17, 2021; Agenda Item: 9.0.1; Source: NTT Docomo, Inc.; Title: Moderator's summary for discussion [RAN93e-R18Prep-02] UL enhancements; Document for: Information & Decision.

RP-211652; 3GPP TSG RAN#93e; Electronic Meeting, Sep. 13-17, 2021; Agenda Item: 9.0.1; Conclusion of [RAN93e-R18Prep-02] UL enhancements; Moderator (NTT Docomo, Inc.).

RP-211679; 3GPP TSG RAN#93-e; Sep. 13-17, 2021; Agenda: 9.0; RAN Chair's Summary for RAN Release 18; Source: RAN Chair.

RP-212608; 3GPP TSG RAN#93-e; Sep. 13-17, 2021; Agenda: 9.0; RAN Chair's Summary for RAN Release 18; Source: RAN Chair.

RP-212662; 3GPP TSG RAN#94e; Electronic Meeting, Dec. 6-17, 2021; Agenda Item: 8A.1; Type: report; Source: NTT Docomo, Inc.; Title: Moderator's summary of discussion [RAN94e-R18Prep-02] UL Enhancements (e. g. coverage; enhancements; excluding MIMO).

RWS-210659; Summary of RAN Rel-18 Workshop; Source: RAN Chair; Jul. 2021.

Ericsson white paper; GFMC-18:000530; Nov. 2018; Advanced antenna systems for 5G networks.

ZTE white paper; 5G Uplink Enhancement Technology; Nov. 23, 2020.

MediaTek white paper; 5G NR Uplink Enhancements; Better Cell Coverage & User Experience; Feb. 21, 2019.

3GPP TS 38.331 V16.1.0 (Jul. 2020); Technical Specification; 3rd Generation Partnership Project; Technical Specification Group Radio Access Network; NR; Radio Resource Control (RRC) protocol specification; (Release 16).

R1-211xxxx; 3GPP TSG RAN WG1 #106bis-e; e-Meeting, Oct. 11-19, 2021; Agenda item: 8.16.17; Source: Moderator (NTT Docomo, Inc.); Title: [draft] Summary on other UE feature related discussions; Document for: Discussion and Decision.

(56)        References Cited

OTHER PUBLICATIONS

R2-210xxxx; 3GPP TSG-RAN2 Meeting #115 electronic; Online, Aug. 9-27, 2021; Change Request; 38.306; CR -; rev—Current version: 16.5.0.
R2-210xxxx; 3GPP TSG-RAN2 Meeting #115 electronic; Online, Aug. 9-27, 2021; Change Request; 38.331; CR -; rev-; Current version: 16.5.0.
International Search Report and Written Opinion of the International Searching authority mailed Aug. 7, 2023, in International Application No. PCT/US2022/054281.
R2-130246; 3GPP TSG RAN WG2 Meeting #81; Malta, MT, Jan. 28-Feb. 1, 2013; Source: Qualcomm Incorporated; Title: Considerations on UL carrier switching; Agenda item: 10.1; Document for: Discussion.
R1-2212133; 3GPP TSG RAN WG1 #111; Toulouse, France, Nov. 14-Nov. 18, 2022; Agenda item: 9.9.2; Source: Qualcomm Incorporated; Title: Discussion on Rel-18 UL Tx switching; Document for: Discussion/Decision.
R1-2212894; 3GPP TSG RAN WG1 #111; Toulouse, France, Nov. 14-18, 2022; Source: Moderator (NTT Docomo, Inc.); Title: Summary#4 of discussion on multi-carrier UL Tx switching scheme; Agenda Item: 9.9.2; Document for: Discussion and Decision.
Office Action mailed Oct. 25, 2024 in European Patent Application No. 22854655.2.
R2-2211742; 3GPP TSG RAN WG2 Meeting #120; Toulouse, France, Nov. 14-18, 2022; Agenda item: 8.19; Source: Apple; Title: Discussion on UL Tx switching; WID/SID: NR_MC_enh-Core-Release 18; Document for: Discussion and Decision.

Office Action mailed Jul. 16, 2025 in European Patent Application No. 22854655.2.
3GPP TS 38.306 V16.4.0 (Mar. 2021); Technical Specification; 5G; NR; User Equipment (UE) radio access capabilities (Release 16).
3GPP TS 38.331 V16.4.1 (Mar. 2021); Technical Specification; 5G; NR; Radio Resource Control (RRC); Protocol specification (Release 16).
Notice of Allowance mailed Jan. 16, 2026 in Japanese Patent Application No. 2024-539529.
R1-1910108; 3GPP TSG RAN WG1 Meeting #98bis; Chongqing, China, Aug. 14-20, 2019; Agenda item: 7.2.13.2; Source: ZTE Corporation; Title: Discussion on single Tx switched uplink solution for EN-DC; Document for: Discussion/Decision.
R2-2108274; 3GPP TSG-RAN WG2 Meeting #115 electronic; Online, Aug. 16-Aug. 27, 2021; Agenda item: 8.22; Source: China Telecommunication, CATT, Baicells; Title: UE capability reporting and RRC configuration for Rel-17 UL Tx switching enhancements; Document for: Discussion and Decision.
R2-2108671; 3GPP TSG-RAN WG2 Meeting #115-e; E-Meeting, Aug. 16-27, 2021; Agenda item: 8.22; Source: vivo; Title: R17 Tx switching enhancements; Document for: Discussion and Decision.
3GPP TS 38.306 V15.16.0 (Dec. 2021); Technical Specification; 3rd Generation Partnership Project; Technical Specification Group Radio Access Network; NR; User Equipment (UE) radio access capabilities; (Release 15).
3GPP TS 38.331 V15.15.0 (Sep. 2021); Technical Specification; 3rd Generation Partnership Project; Technical Specification Group Radio Access Network; NR; Radio Resource Control (RRC) protocol specification; (Release 15).
Notice of Allowance mailed Feb. 1, 2026 in KR Patent Application No. 2024-7025449.

* cited by examiner

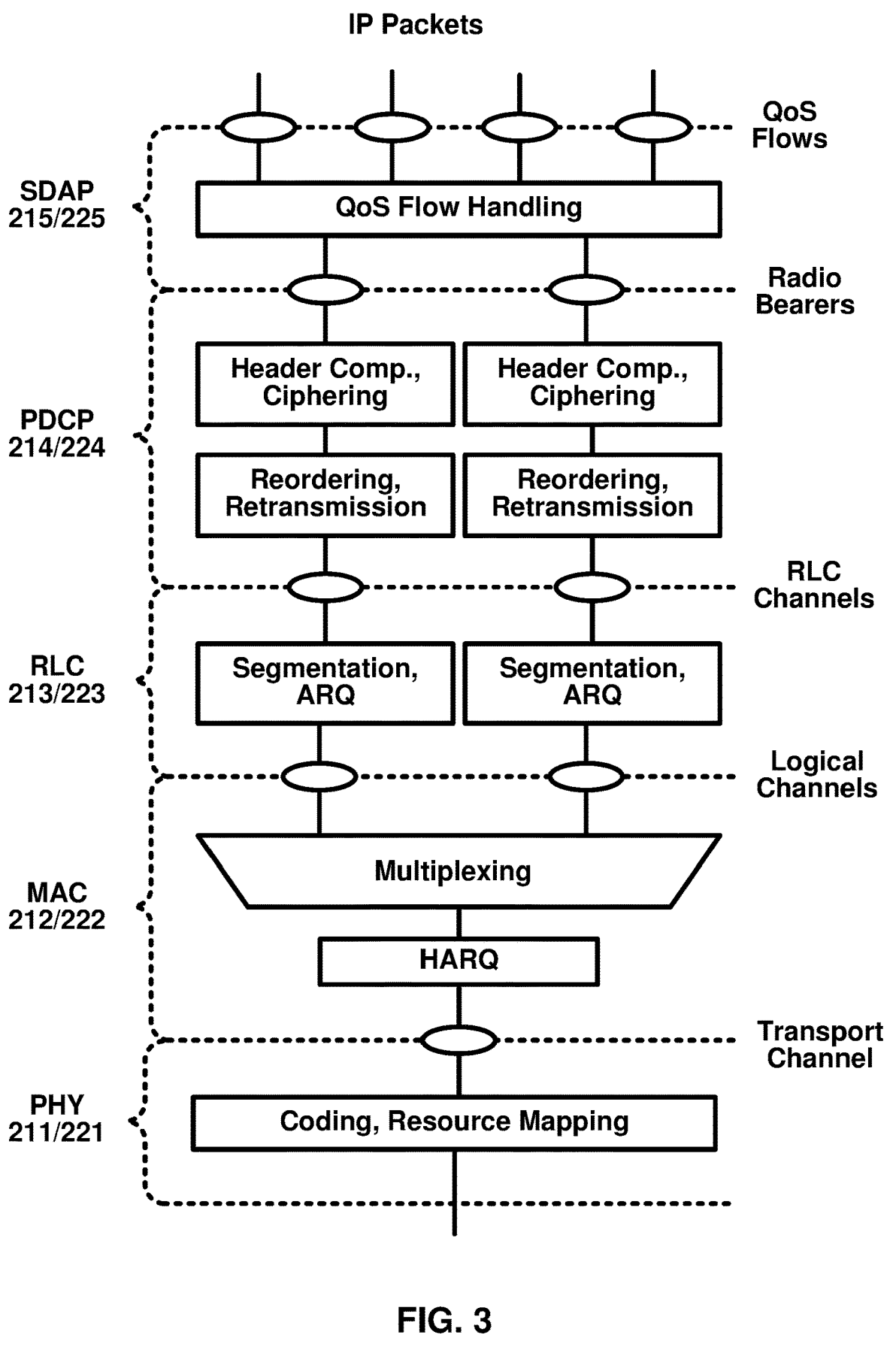

IP Packets

QoS
Flows

SDAP
215/225

QoS Flow Handling

Radio
Bearers

Header Comp.,
Ciphering

Header Comp.,
Ciphering

PDCP
214/224

Reordering,
Retransmission

Reordering,
Retransmission

RLC
Channels

RLC
213/223

Segmentation,
ARQ

Segmentation,
ARQ

Logical
Channels

Multiplexing

MAC
212/222

HARQ

Transport
Channel

PHY
211/221

Coding, Resource Mapping

FIG. 3

Uplink

FIG. 5B

Downlink

FIG. 5A

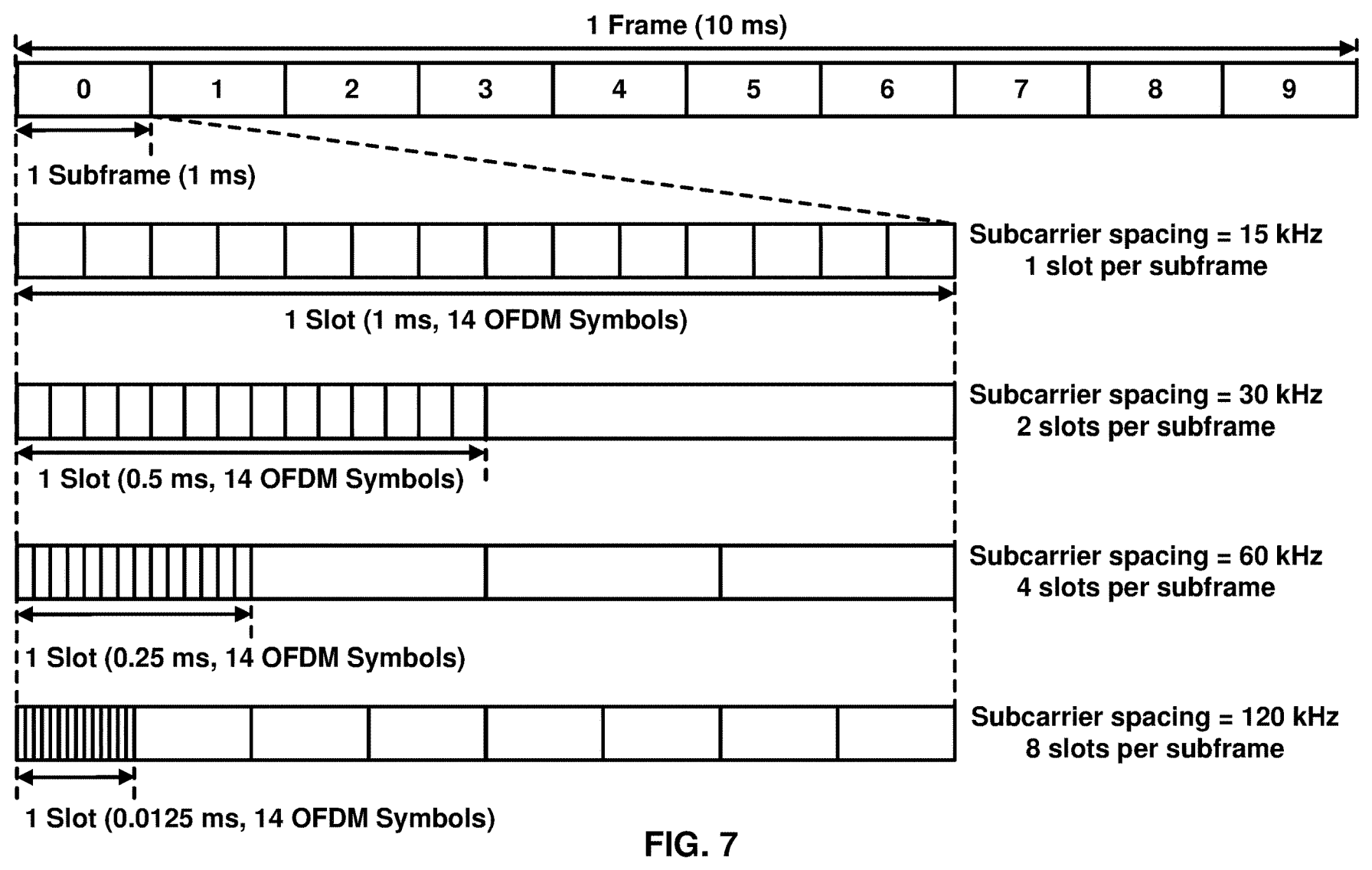

1 Frame (10 ms)

| 0 | 1 | 2 | 3 | 4 | 5 | 6 | 7 | 8 | 9 |

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

FIG. 7

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Frequency

Time

——— 5G NR

- - - - - 4G

4G: DL+UL

4G: DL+UL

5G: DL+UL

5G: DL

5G Uplink Coverage

5G Downlink Coverage

4G Coverage

| Area A | Area B |
|---|---|

TDD-NR
e.g. 3.5 GHz

1Tᵧ | D | D | D | S | U | D | D | S | U | U |

(A) UL:
FDD-LTE 1Tx+TDD-NR 1Tx

FDD-LTE
e.g. 2.1 GHz

1Tᵧ | U | U | U | U | U |

TDD-NR
e.g. 3.5 GHz

1Tᵧ | D | D | D | S | U | D | D | S | U | U |

(B) UL:
FDD-LTE 1Tx

FDD-LTE
e.g. 2.1 GHz

1Tᵧ | U | U | U | U | U |

▨ With data sending

☐ No data sending

Option 1

| | Antenna Tx mode | Number of UL Tx antenna ports |
|---|---|---|
| Mode 1 | 1T+1T | 1P+0P |
| Mode 2 | 0T+2T | 0P+2P, 0P+1P |

Option 2

| | Antenna Tx mode | Number of UL Tx antenna ports |
|---|---|---|
| Mode 1 | 1T+1T | 1P+0P, 1P+1P, 0P+1P |
| Mode 2 | 0T+2T | 0P+2P, 0P+1P |

DYNAMIC MULTI-CARRIER UPLINK OPERATIONS

CROSS-REFERENCE TO RELATED APPLICATIONS

This application is a continuation of International Application No. PCT/US2022/054281, filed Dec. 29, 2022, which claims the benefit of U.S. Provisional Application No. 63/294,762, filed Dec. 29, 2021, all of which are hereby incorporated by reference in their entireties.

BRIEF DESCRIPTION OF THE DRAWINGS

Examples of several of the various embodiments of the present disclosure are described herein with reference to the drawings.

FIG. 3 illustrates an example of services provided between protocol layers of the NR user plane protocol stack of FIG. 2A.

FIG. 5A and FIG. 5B respectively illustrate a mapping between logical channels, transport channels, and physical channels for the downlink and uplink.

FIG. 7 illustrates an example configuration of an NR frame into which OFDM symbols are grouped.

DETAILED DESCRIPTION

Figures 1A, 1B:
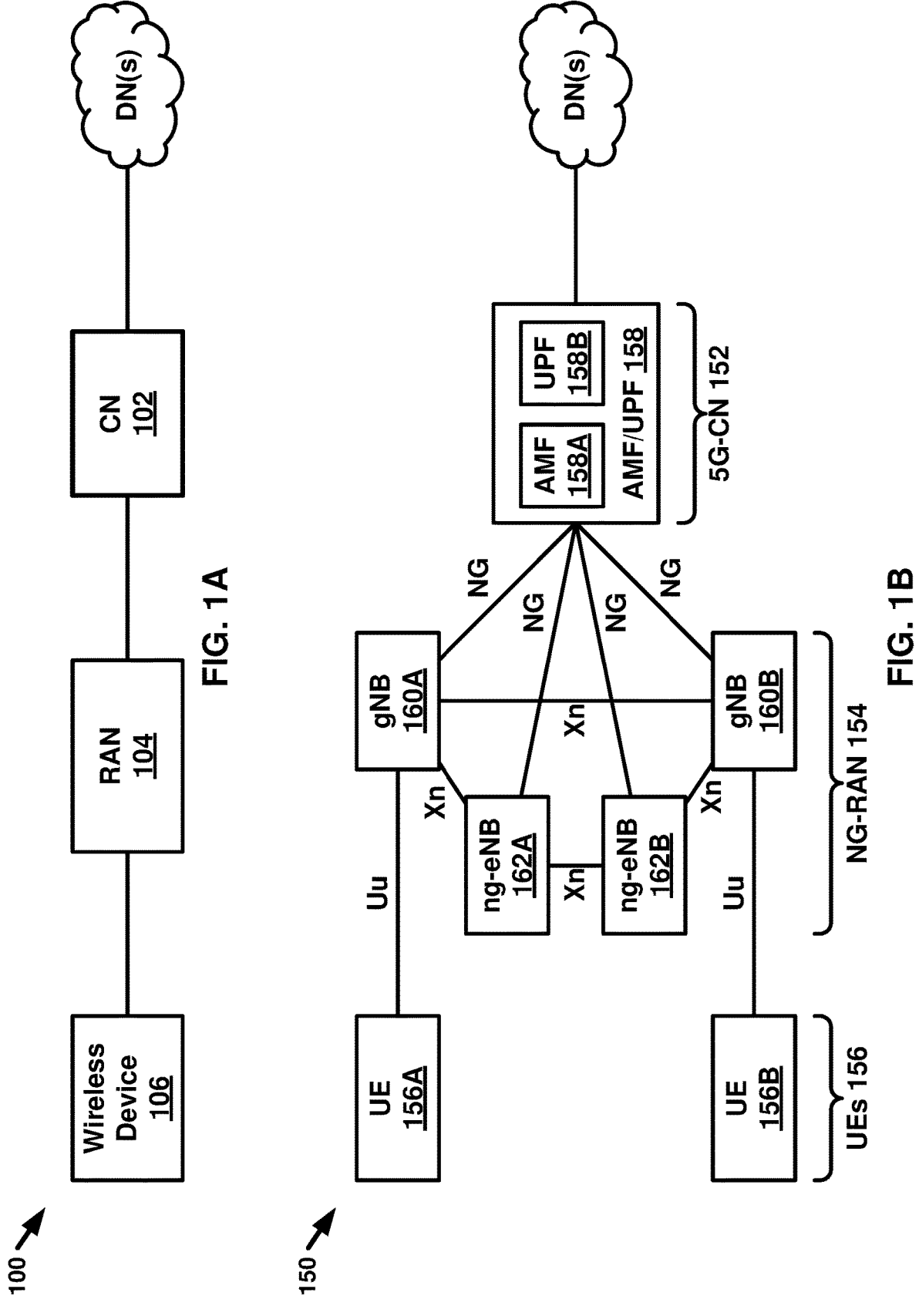
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN).

Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interlaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
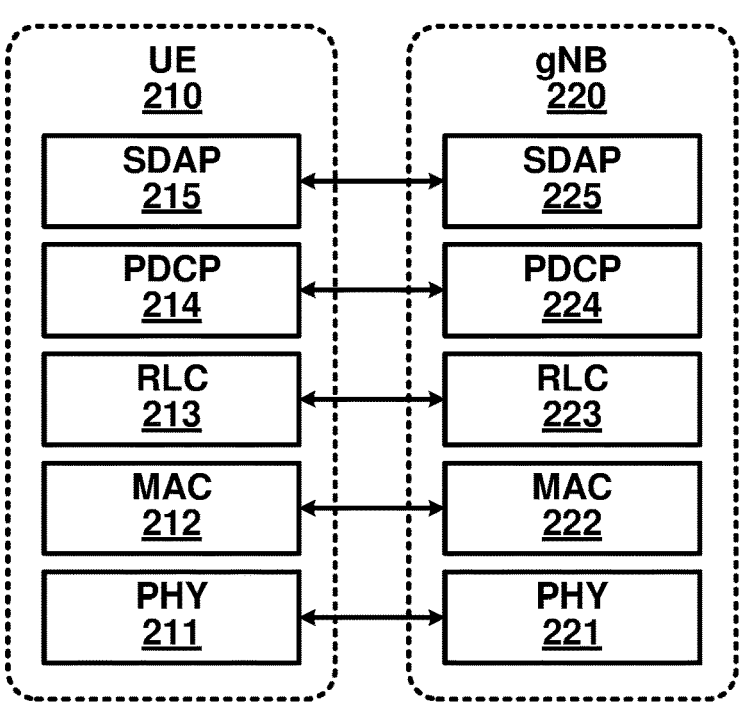
FIG. 2A and FIG. 2B respectively illustrate a New Radio (NR) user plane and control plane protocol stack.
Figure 2B:
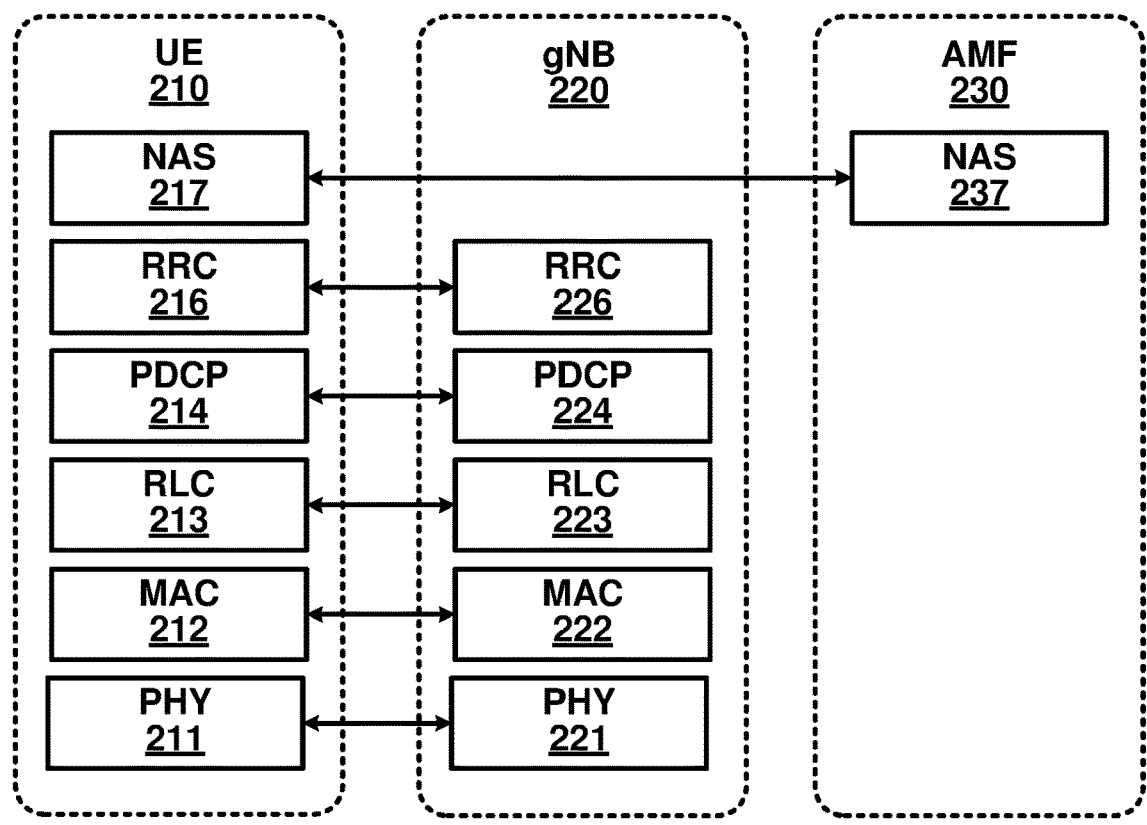

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
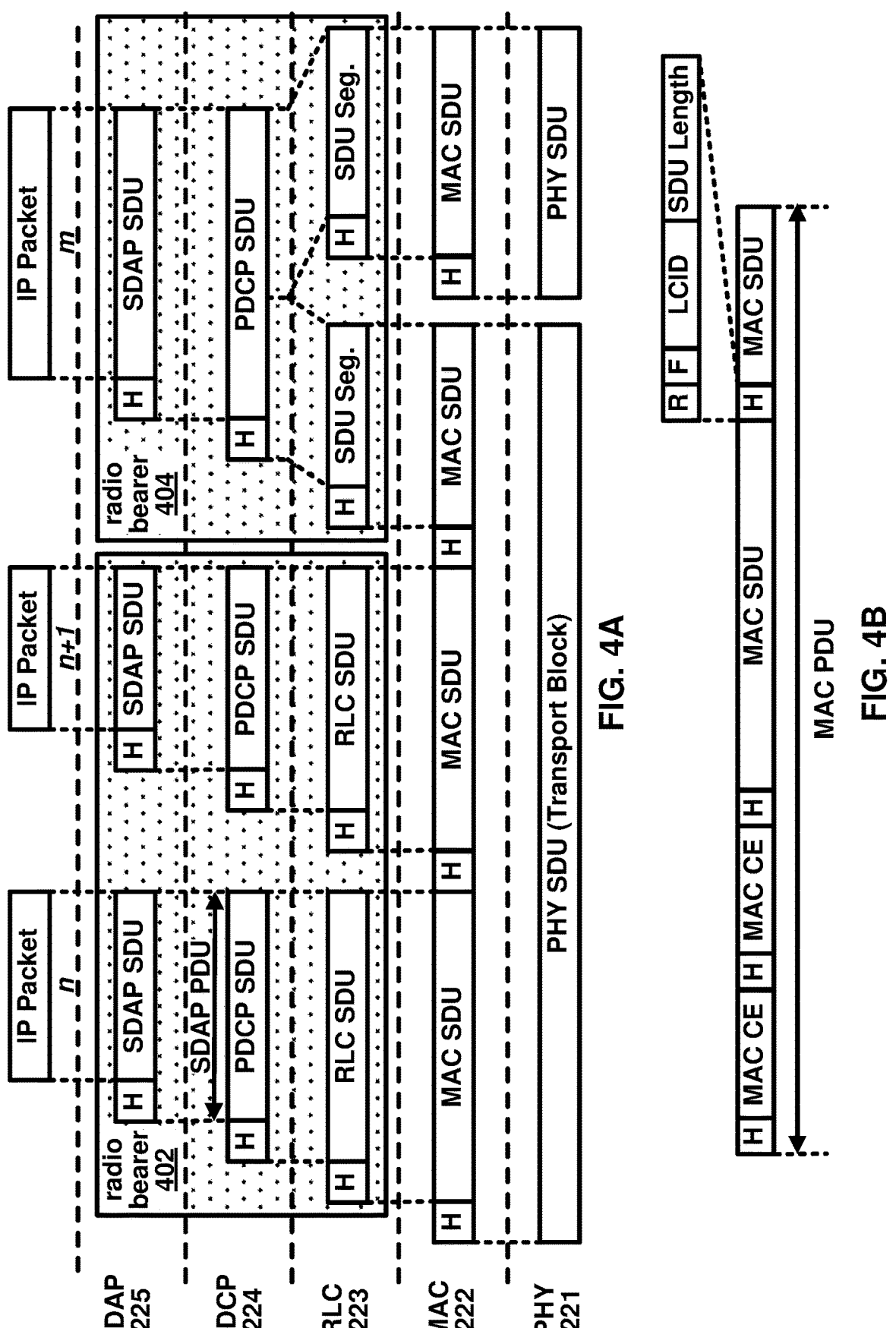
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
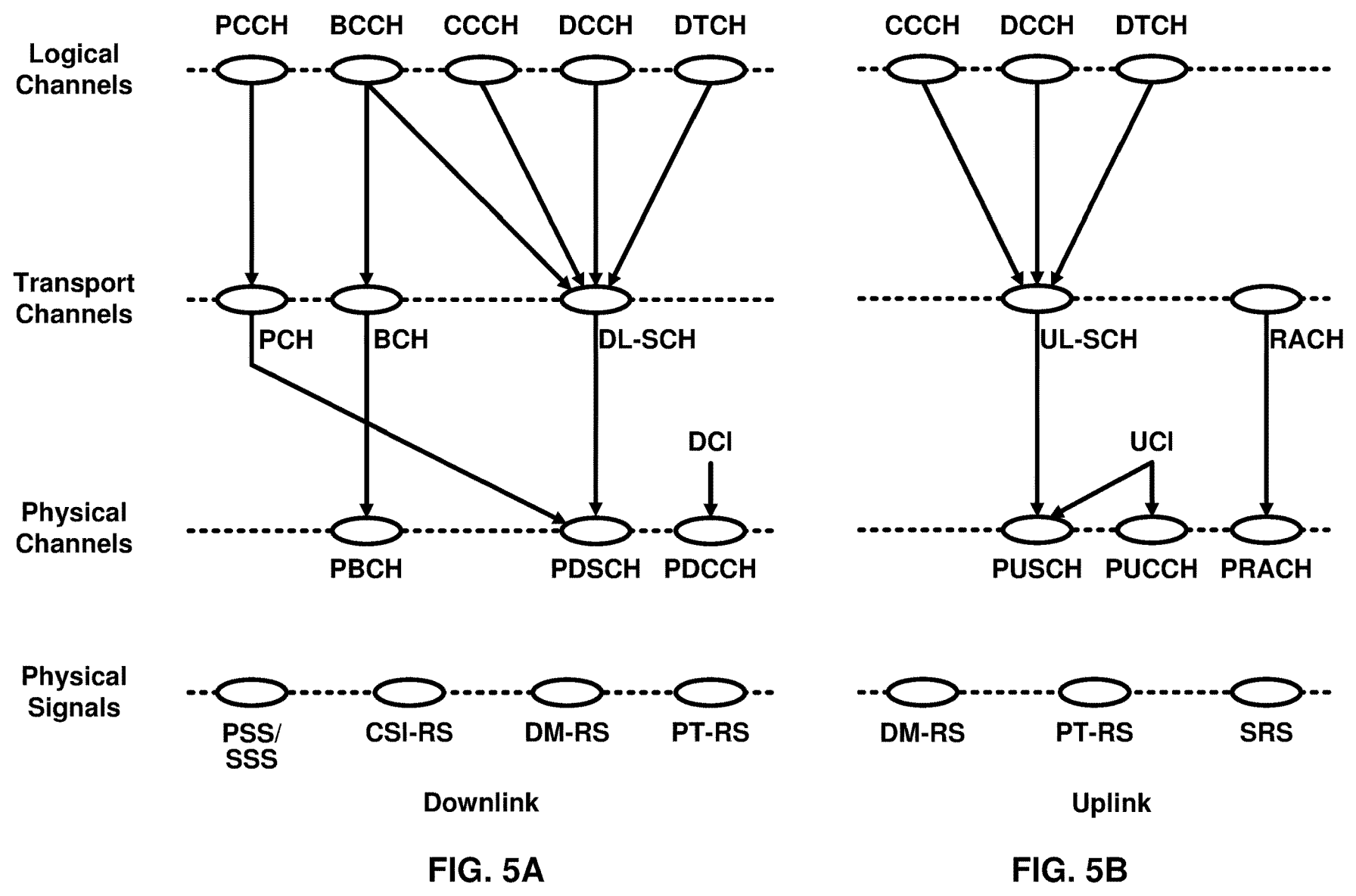

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
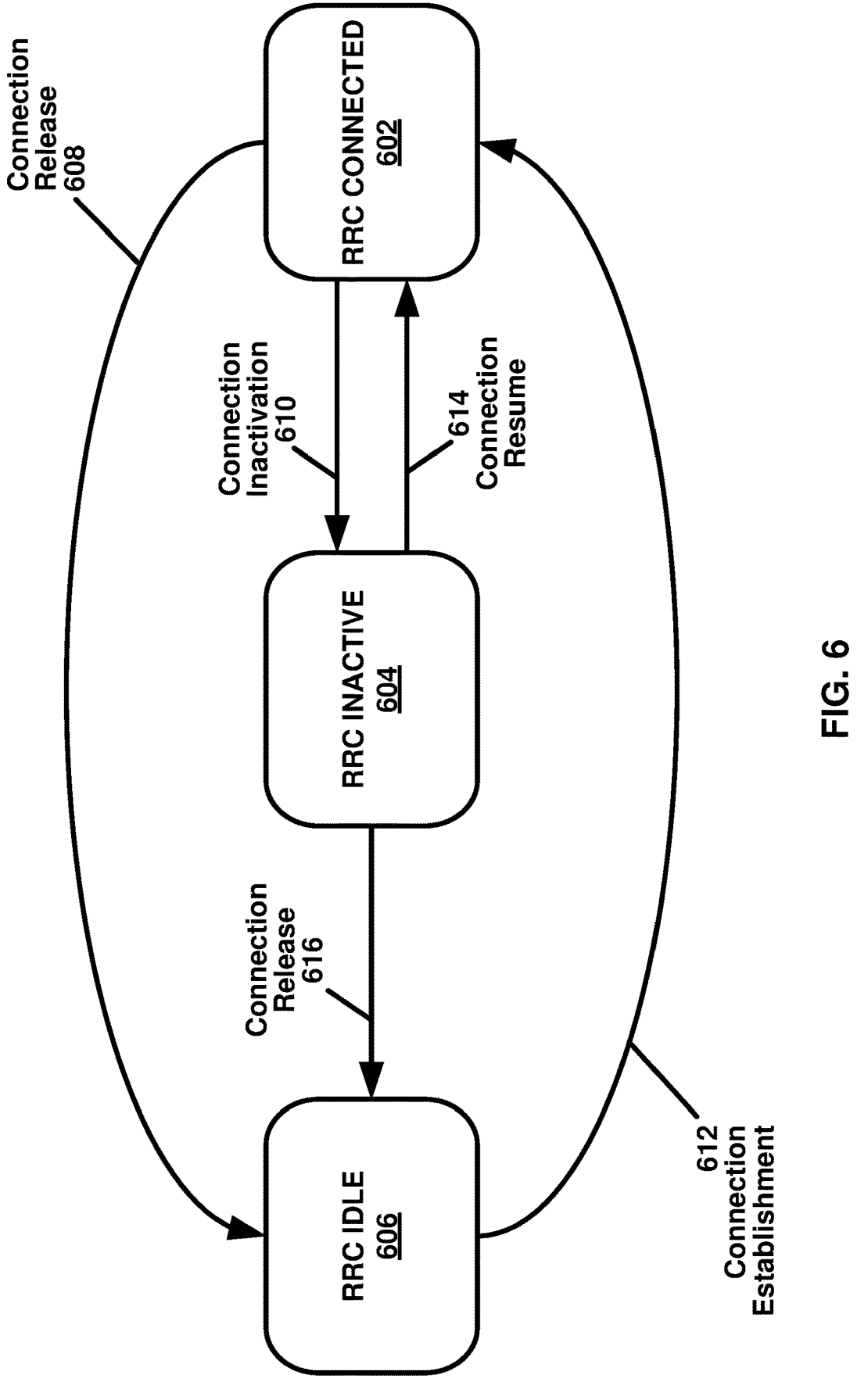
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1A, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
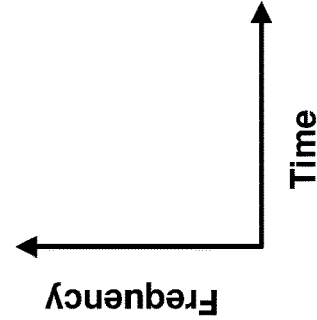
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
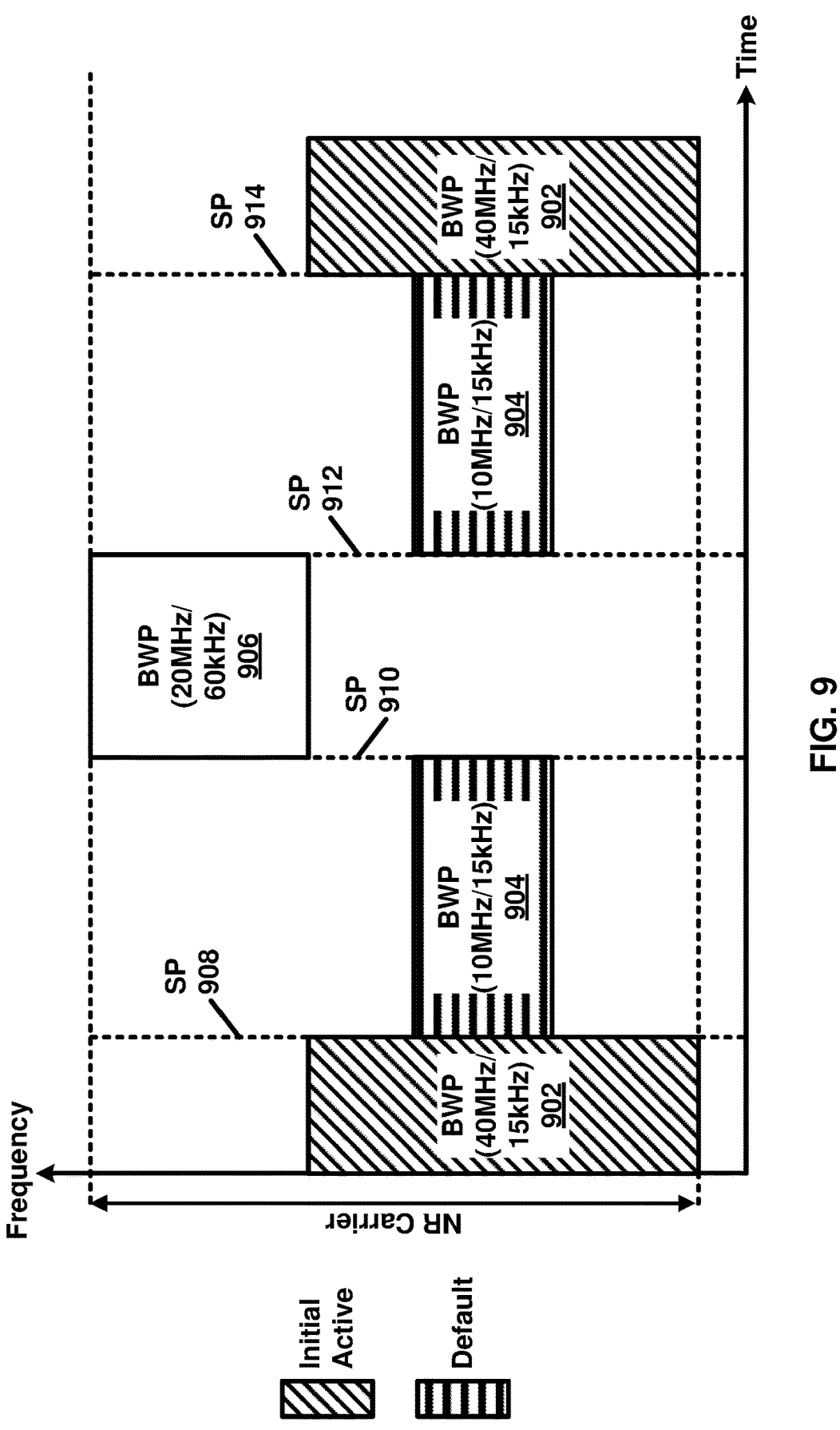
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
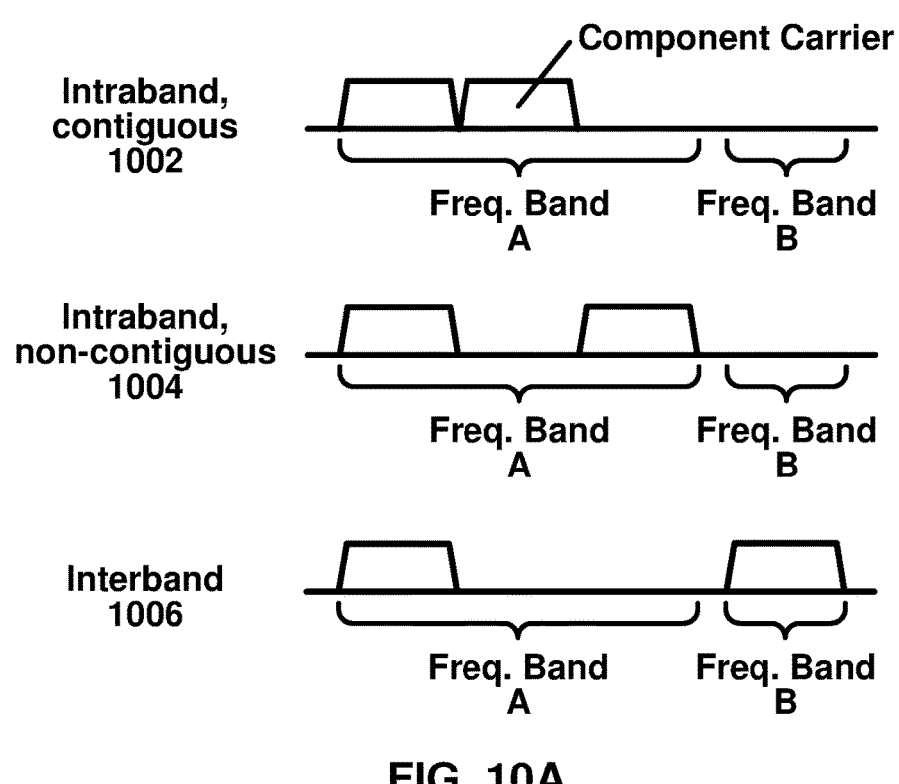
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
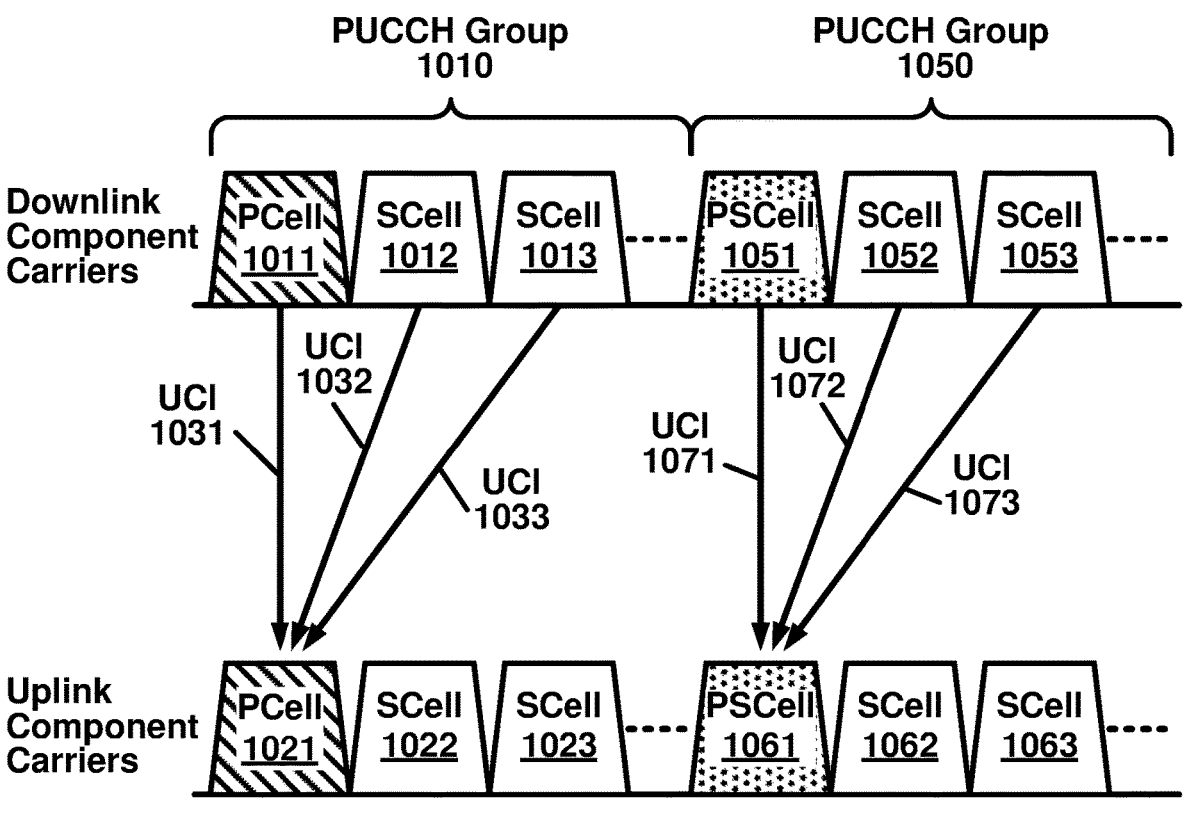
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
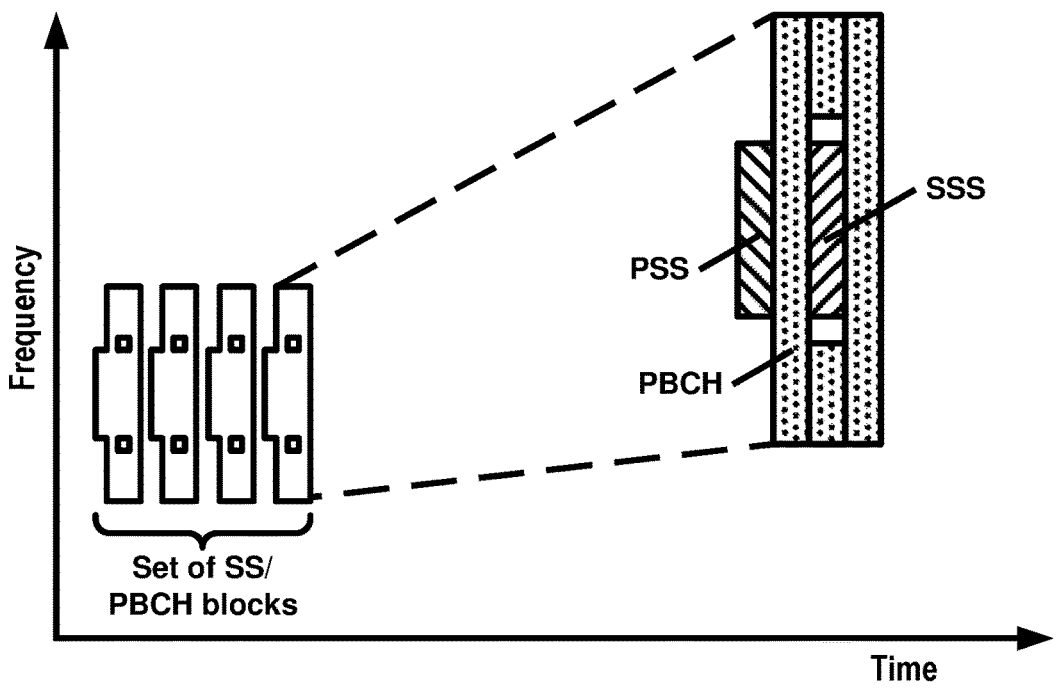
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
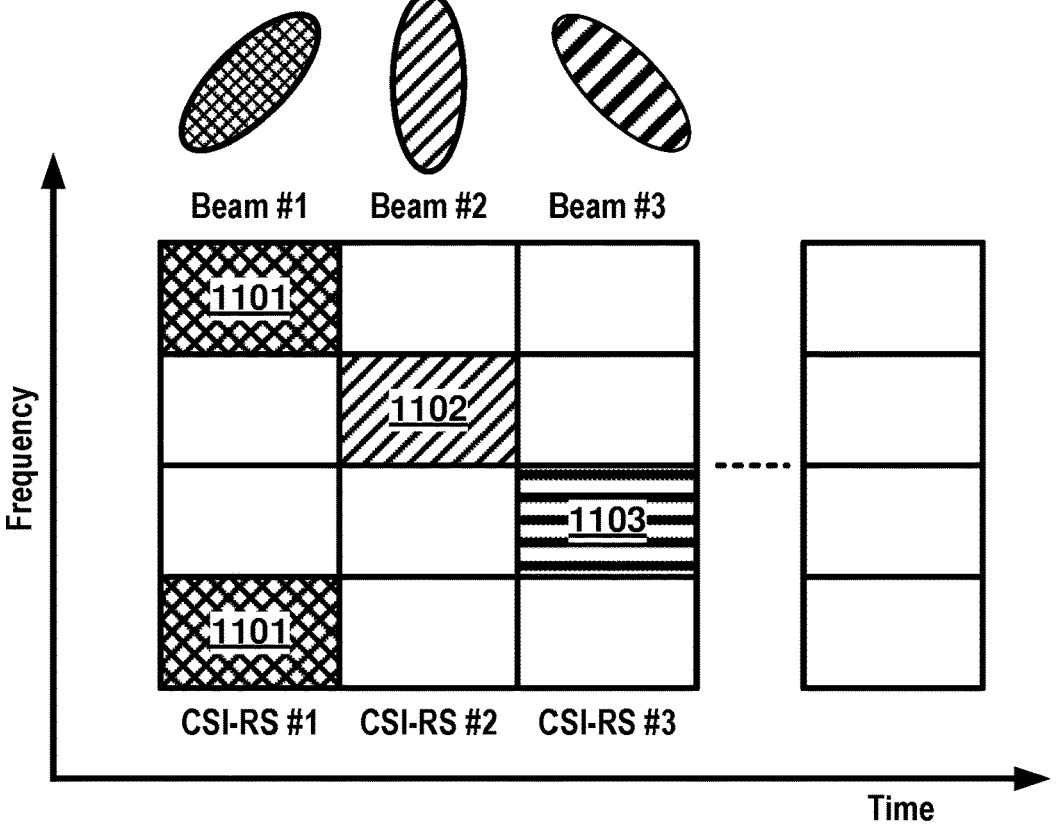
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figures 12A, 12B:
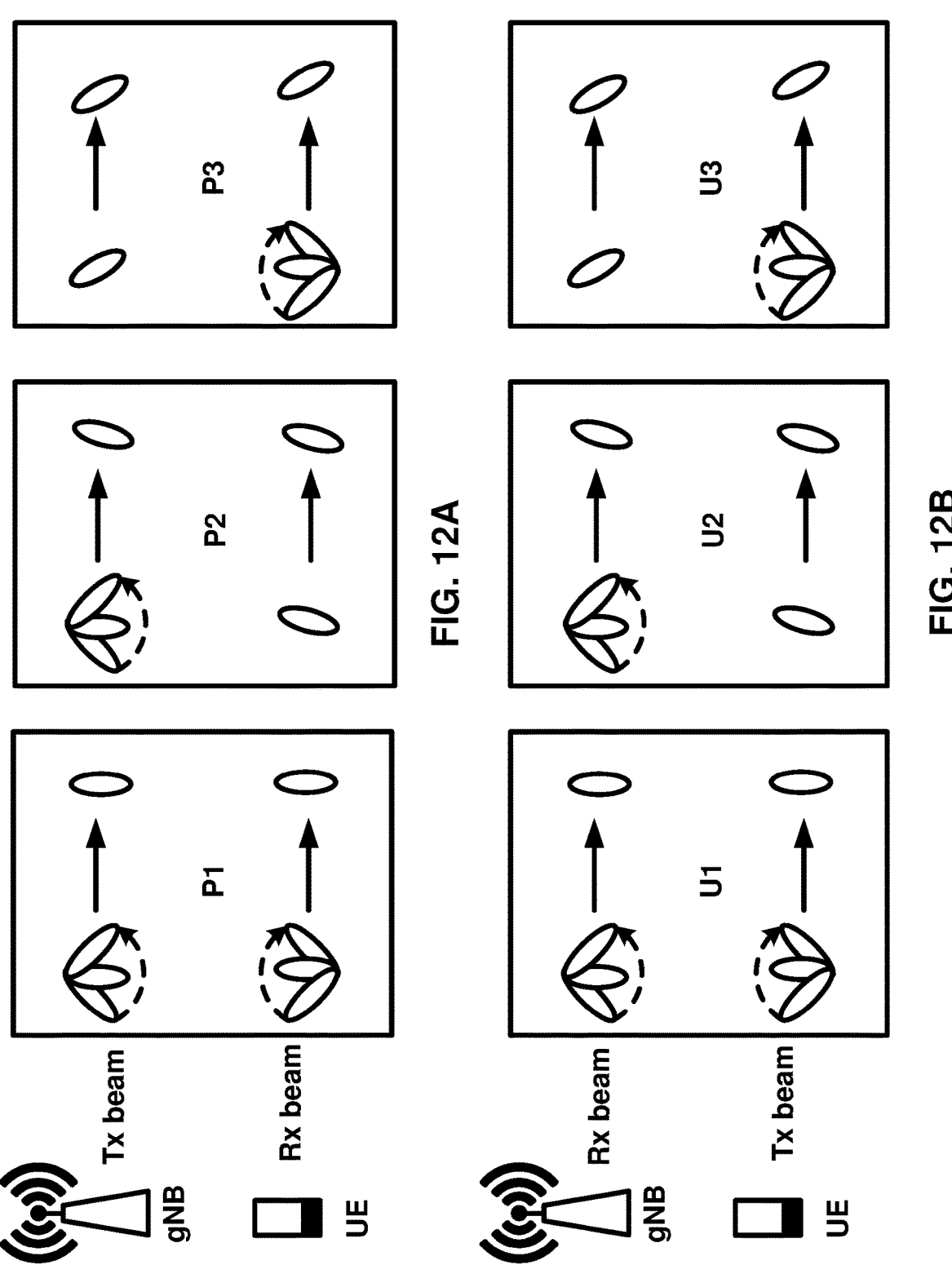
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figures 13A, 13B, 13C:
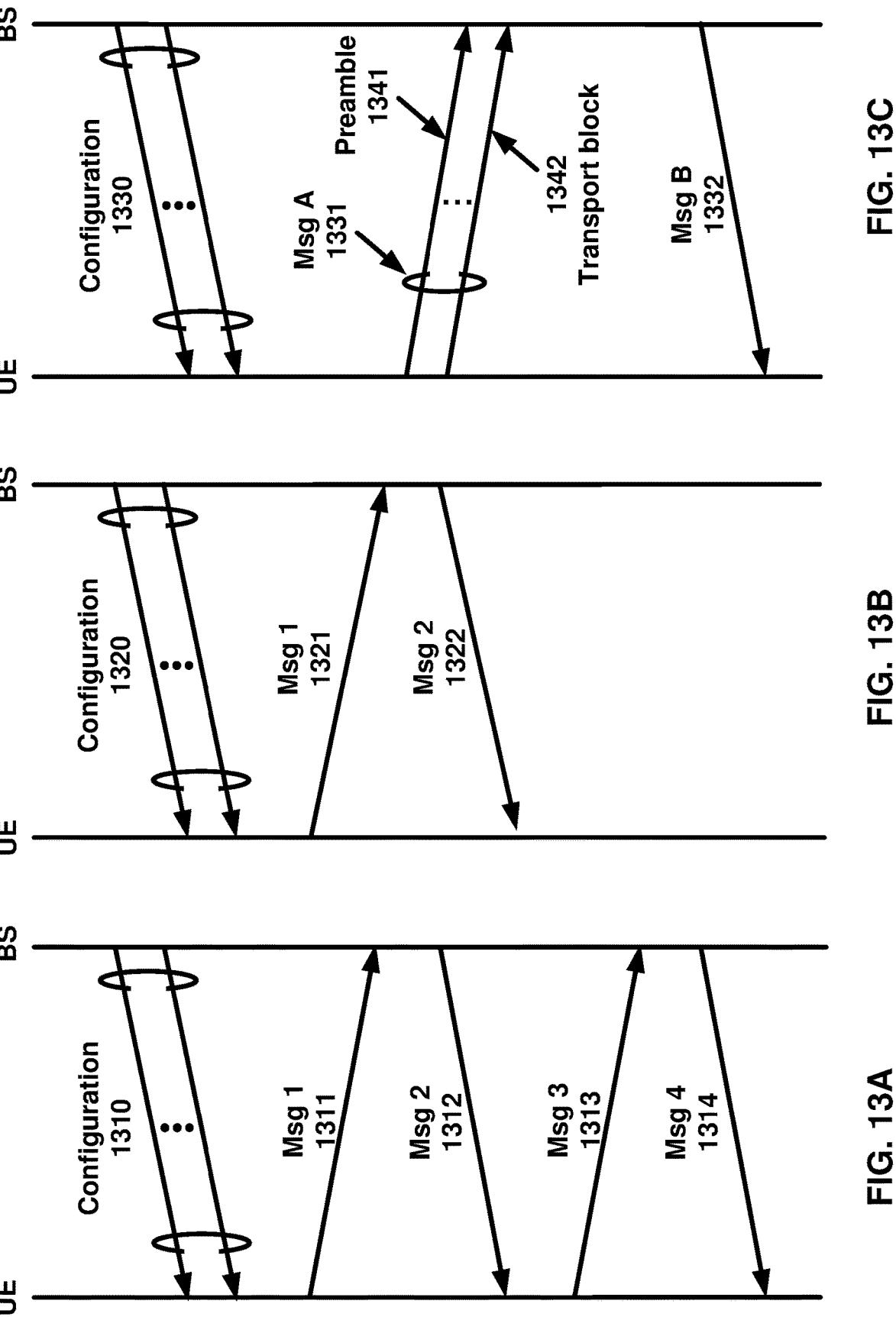
FIG. 13A, FIG. 13B, and FIG. 13C respectively illustrate a four-step contention-based random access procedure, a two-step contention-free random access procedure, and another two-step random access procedure.

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_I-NACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb- OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER-_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE-_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-Response-Window) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$\text{RA-RNTI} = 1 + s\_\text{id} + 14 \times t\_\text{id} + 14 \times 80 \times f\_\text{id} + 14 \times 80 \times 8 \times \text{ul\_carrier\_id}$$

where s_id may be an index of a first OFDM symbol of the PRACH occasion (e.g., $0 \le s\_\text{id} < 14$), t_id may be an index of a first slot of the PRACH occasion in a system frame (e.g., $0 \le t\_\text{id} < 80$), f_id may be an index of the PRACH occasion in the frequency domain (e.g., $0 \le f\_\text{id} < 8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
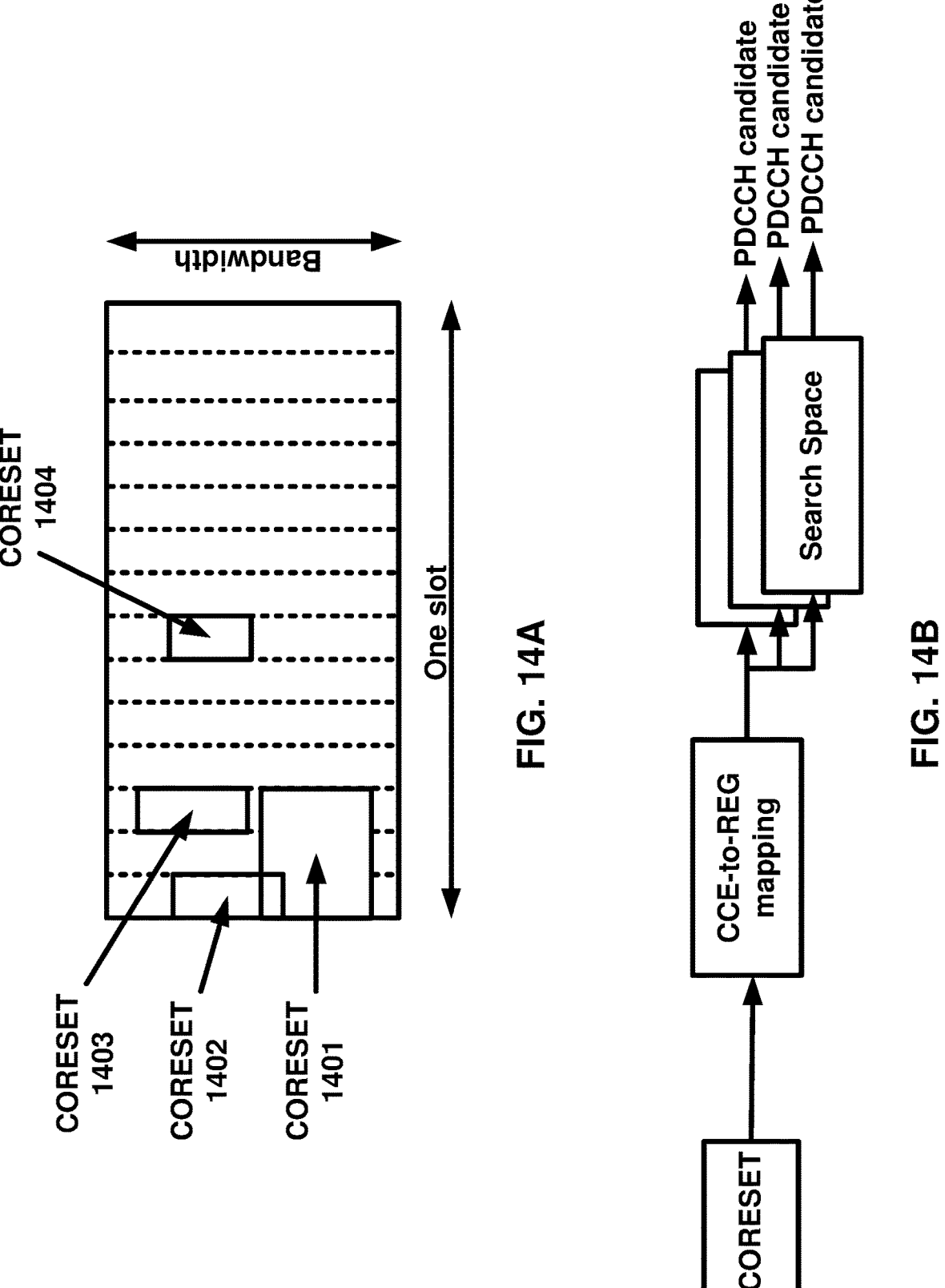
FIG. 14A illustrates an example of CORESET configurations for a bandwidth part.
FIG. 14B illustrates an example of a CCE-to-REG mapping for DCI transmission on a CORESET and PDCCH processing.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an inter-leaved mapping (e.g., for the purpose of providing fre-quency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configu-ration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORE-SETs and one or more search space sets. The configuration parameters may indicate an association between a search space set and a CORESET. A search space set may comprise a set of PDCCH candidates formed by CCEs at a given aggregation level. The configuration parameters may indi-cate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC mes-sages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise sched-uling requests (SR). The UE may transmit an SR indicating that uplink data is available for transmission to the base station. The UE may transmit a UCI (e.g., HARQ acknowl-edgements (HARQ-ACK), CSI report, SR, and the like) via a physical uplink control channel (PUCCH) or a physical uplink shared channel (PUCCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more sym-bols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI infor-mation bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second config-ured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
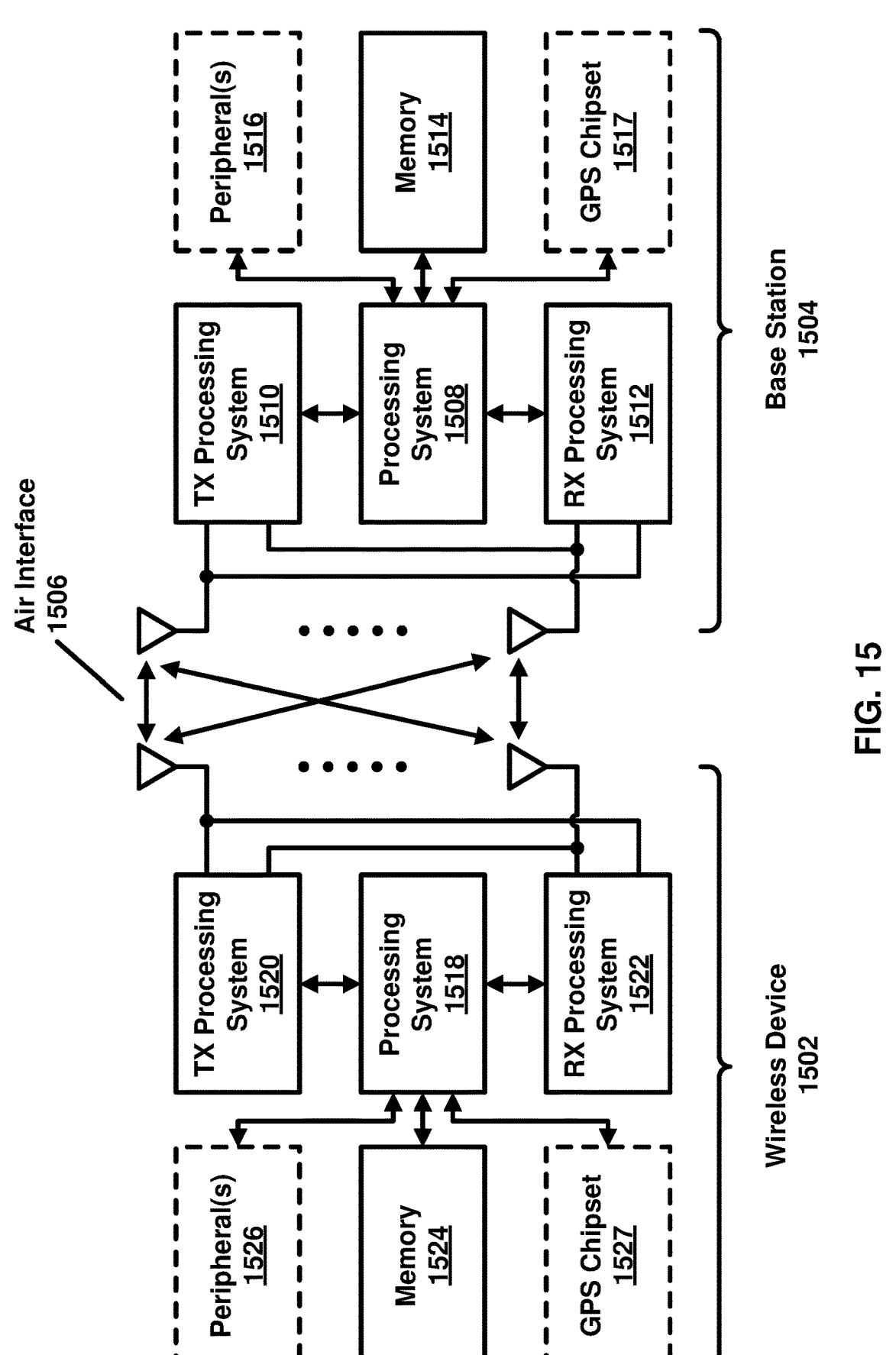
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a micro-controller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
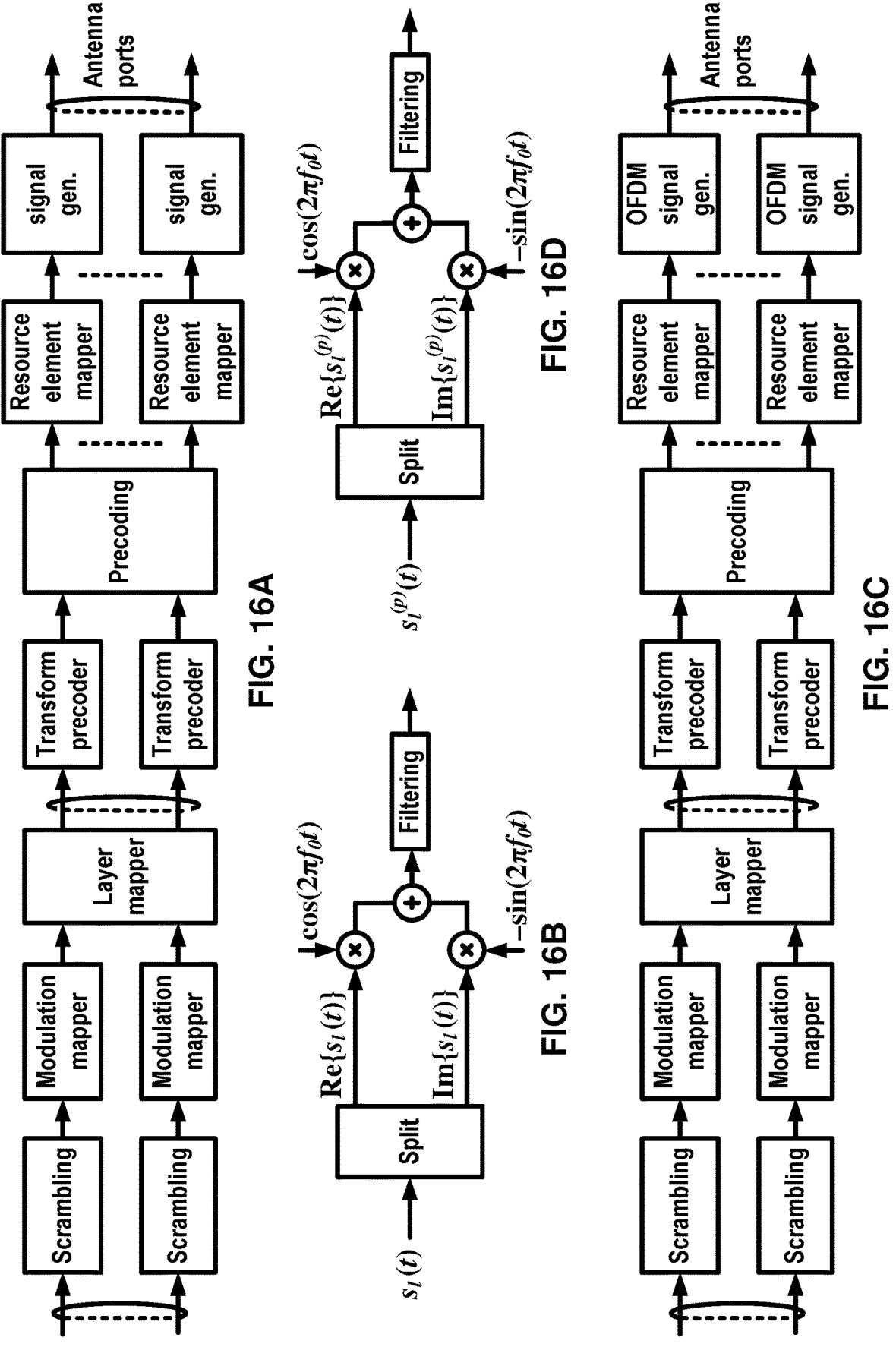
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A UE may access a cell, as part of the frequency spectrum, for wireless communications. The UE may receive broadcast signals comprising access information of the cell, e.g., synchronization signal block(s) (SSB) and/or system information block (SIB, e.g., SIB1). A cell, e.g., a serving cell, may be associated with one or more SSBs. The SIB1 (e.g., transmitted by one or more SSBs) may indicate the frequency information of the serving cell (e.g., via serving-CellConfigCommon and/or servingCellConfigCommon-SIB). A serving cell may comprise a downlink (DL) carrier and one or more uplink (UL) carriers (e.g., (normal) UL and/or supplementary UL). The serving cell configuration comprises downlink configuration of the DL carrier (e.g., via downlinkConfigCommon and/or downlinkConfigCommon-SIB) and/or uplink configuration of the one or more UL carriers (e.g., uplinkConfigCommon and/or uplinkConfig-CommonSIB) of the cell. A carrier may be referred to as component carrier.

Throughout this disclosure, uplink (UL) may refer to communication directed from mobile/wireless device to base station/network, and downlink (DL) may refer to communication directed from base station/network to mobile/wireless device/UE.

The downlink configuration may indicate basic parameters of a DL carrier and transmission thereon, comprising frequency information of the DL carrier. The frequency information of the DL carrier may indicate a list one or more frequency bands to which the DL carrier belongs (e.g., via frequencyBandList); an offset of the DL carrier to Point A (offsetToPointA); and/or a set of carriers for different sub-carrier spacings (SCS, numerologies) that are used in the DL BWPs in the serving cell. Multiple bands may be defined, e.g., for 5G and/or 6G, each with a respective center frequency. Each band (e.g., n1, n2, . . . , n25, n26, . . . , n99 in FR1, and n257, n258, . . . , n262 in FR2) may be defined with a duplex mode (TDD and/or FDD), a range of frequencies for uplink and downlink, and a allowed channels bandwidths (e.g., 5 MHz, 10 MHz, . . . , 50 MHz, 200 MHz, 400 MHz).

A frequency band may a range of frequencies in a spectrum between two limits used in telecommunications. A frequency band may be a range of frequencies defined and dedicated to a particular type of service or radio technology. Frequency bands for 5G New Radio (5G NR) may be separated into two different frequency ranges. First there is Frequency Range 1 (FR1), which includes sub-6 GHz frequency bands, some of which are traditionally used by previous standards, but has been extended to cover potential new spectrum offerings (e.g., from 410 MHz to 7125 MHz). The other is Frequency Range 2 (FR2), which includes frequency bands from 24.25 GHz to 52.6 GHz. In an example, frequency bands may be defined for FR3 (e.g., above 72 GHz).

The DL carrier may comprise one or more DL bandwidth parts (BWPs). Each DL BWP may comprise a part of the frequency resources of the DL carrier. A DL BWP configuration may indicate a frequency domain location and bandwidth of this BWP; and a SCS to be used in the BWP for (all) channels and (reference) signals.

The uplink configuration may indicate basic parameters of an UL carrier (e.g., NUL carrier and/or SUL carrier) and transmission thereon, comprising frequency information of the UL carrier. The frequency information of the UL carrier may indicate a list one or more frequency bands to which the UL carrier belongs (e.g., via frequencyBandList); an absolute frequency of the reference resource block (common RB 0, e.g., via absoluteFrequencyPointA, its lowest subcarrier may be referred to as Point A); and/or a set of carriers for different subcarrier spacings (SCS, numerologies) that are used in the UL BWPs in the serving cell and/or UL carrier.

An UL carrier (e.g., NUL carrier and/or SUL carrier) may comprise one or more UL bandwidth parts (BWPs). Each UL BWP may comprise a part of the frequency resources of the UL carrier. An UL BWP configuration may indicate a frequency domain location and bandwidth of this BWP; and a SCS to be used in the BWP for (all) channels and (reference) signals.

An architectural consideration is the dual connectivity (DC) operation involving a first RAT (e.g., enhanced Universal Terrestrial Radio Access (E-UTRA)) and a second RAT (e.g., NR). In one example of Dual Connectivity (DC) operation involving E-UTRA and NR, the E-UTRA is the master. In another example of the DC operation involving E-UTRA and NR, NR is the master. The dual connectivity operation involving only NR serving cells (e.g., NR primary cell (PCell) and NR PSCells) is also envisaged.

A standalone deployments of a first RAT (e.g., NR) may be single or multi-carrier (e.g., NR carrier aggregation, CA, or dual connectivity with NR PCell and NR PSCell). The non-standalone (NSA) deployment of a first RAT (e.g., NR) refers to a dual connectivity (DC) deployment involving a second RAT (e.g., E-UTRA), e.g., where there is Long Term Evolution (LTE) PCell and NR PSCell (there may also be one or more LTE SCells and one or more NR SCell). LTE PCell and NR PSCell are configured in master cell group (MCG) and secondary cell group (SCG) respectively. The MSG and SCG are more generally called cell groups (CG). The MCG and SCG may be configured with one or more additional serving cells, e.g., one or more LTE secondary cells (SCells) in MCG and one or more SCells in SCG.

Carrier Aggregation (CA) is generally used in an RAT (e.g., NR and LTE systems) to improve communication device transmit/receive data rates. With CA, the UE typically operates initially on a single serving cell called a primary cell (Pcell). The Pcell is operated on a component carrier in a frequency band. The UE is then configured by the network with one or more secondary serving cells (Scell(s)). Each Scell can correspond to a component carrier (CC) in the same frequency band (intra-band CA) or different frequency band (inter-band CA) from the frequency band of the CC corresponding to the Pcell. For the UE to transmit/receive data on the Scell(s) (e.g., by receiving DownLink Shared Channel (DL-SCH) information on a Physical DownLink Shared Channel (PDSCH) or by transmitting UpLink Shared Channel (UL-SCH) on a Physical UpLink Shared Channel (PUSCH)), the Scell(s) may need to be activated by the network. The Scell(s) can also be deactivated and later reactivated as needed via activation/deactivation signaling. UE can be configured with carrier aggregation to aggregate Frequency Division Duplex (FDD) carriers, Time Division Duplex (TDD) carriers or both FDD and TDD carriers. UE can indicate via capability its carrier aggregation capability, including whether it supports CA on the downlink and whether it supports CA on the uplink.

A wireless system may incorporate multiple uplink enhancement technologies. For example, there are three multiple uplink enhancement technologies in 3GPP 5G NR Rel. 15: EUTRA-NR Dual Connectivity (EN-DC); Uplink carrier aggregation (CA); and Supplementary uplink (SUL).

The above mechanisms are designed to address the coverage enhancement issue for NR. In all above scenarios, a UE may be configured with a first carrier (e.g., LTE carrier, and/or SUL carrier) in a lower frequency band (e.g., FDD band), and a second carrier (e.g., NR carrier, and/or NUL carrier) in a higher frequency band (e.g., TDD band). The carrier in the lower frequency band may have a larger coverage area. The carrier in the higher frequency may have a smaller coverage area. The UE can transmit data either under the first carrier coverage (i.e., the carrier in the lower frequency band with larger coverage), or under both the first carrier and the second carrier coverage (i.e., the carrier in the higher frequency with smaller coverage). Therefore, the coverage problem of users at the edge of the cell can be resolved.

Commercial UEs, limited by the complexity of antenna design and low transmission power, generally support 2 transmission channels (2Tx). In the above uplink enhancement scenarios, one Tx of the UE's transmitter can be used for the first carrier (e.g., LTE carrier, and/or the first NR carrier, and/or the SUL carrier), and the other Tx of the UE's transmitter can be used for the second carrier (e.g., the 5G NR carrier, and/or the second NR carrier, and/or the NUL carrier).

Figures 17A, 17B:
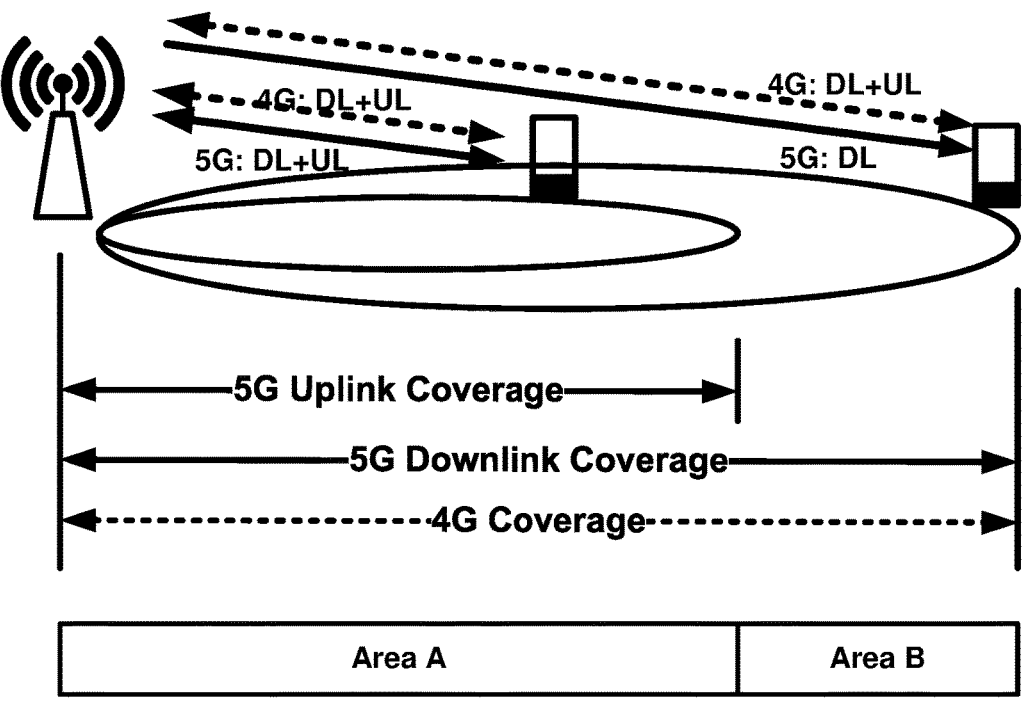
FIG. 17A illustrates an example application scenario of EN-DC deployment, according to some embodiments.
FIG. 17B illustrates an example of uplink operation modes of a UE in Area A and Area B based on the application scenario shown in FIG. 17A, according to some embodiments.

FIG. 17A shows an example application scenario of EN-DC deployment. The difference between 4G coverage and 5G coverage is shown in the figure. In area A, because there are both 4G and 5G coverage, UE capable of EN-DC may transmit data by 4G and/or 5G network. As the commercial terminal generally supports 2 transmission channels (2Tx), one Tx may be used for 4G and the other for 5G NR. In area B, because there is 4G coverage, UE may transmit data via 4G network, e.g., not via 5G network.

FIG. 17B shows an example of uplink operation modes of a UE in Area A and Area B according to FIG. 17A. Mobile devices supporting EN-DC will have two concurrent radio connections to the Evolved Packet Core (EPC), one of which is via 5G NR and the other via LTE. However, because UE uses one Tx for 5G NR, the uplink dual-stream capability of 5G NR is limited, which means peak uplink data throughput is, for example, 74% of what can be achieved in 5G SA. In general, with non-stand-alone (NSA) architecture, 5G uplink throughput is improved compared to 4G, yet still lower than 5G stand-alone (SA). The coverage of 5G NR is not improved, but in areas without 5G coverage where both signaling and traffic can be transmitted over 4G, user experience is not significantly deteriorated compared to that of 4G network.

Figure 18A:
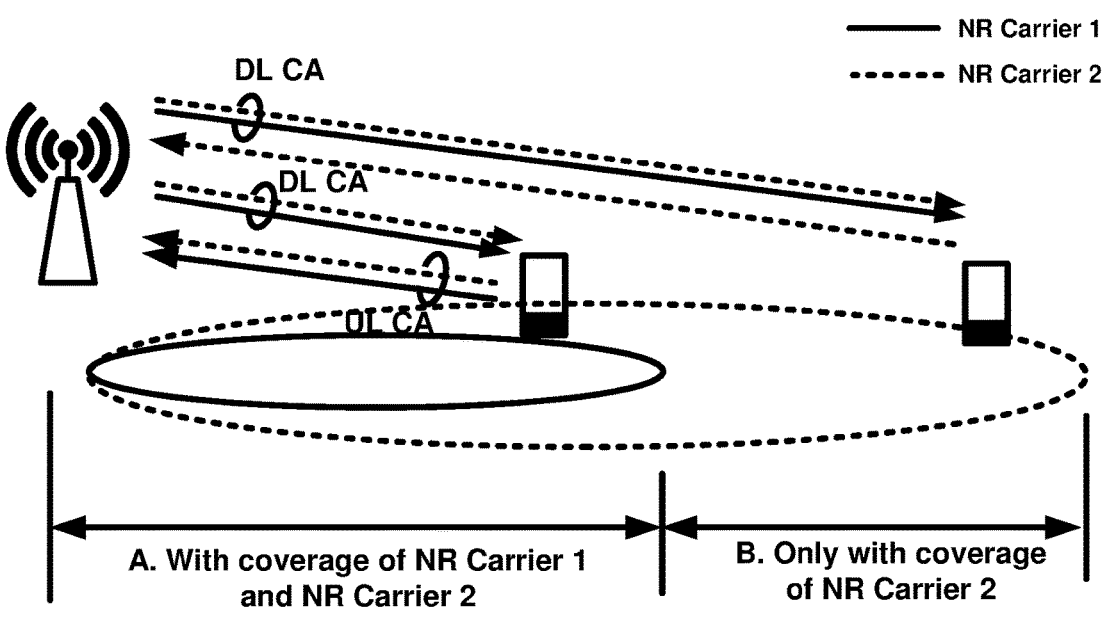
FIG. 18A illustrates an example application scenario of UL inter-band CA, according to some embodiments.

FIG. 18A shows an example application scenario of UL inter-band CA. In area A, with coverage of NR Carrier 1 and NR Carrier 2, UL CA can be activated. In area B, with coverage of one carrier, UE uses one carrier to transmit data. Inter-band carrier aggregation aggregates the carriers of different operating bands. For example, 3GPP may be compatible with 13 Inter-band CA operating bands involving FR1, such as CA_n3-n78, CA_n28-n78, etc. At the area where the two aggregating carriers' coverage is good, uplink CA can be used to improve spectrum utilization. However, as most mobile devices support two transmission channels (2Tx), two transmission channels are to support two carriers respectively, so UL CA will restrain the uplink dual-stream capability on TDD-NR which may result in capacity loss.

Figure 18B:
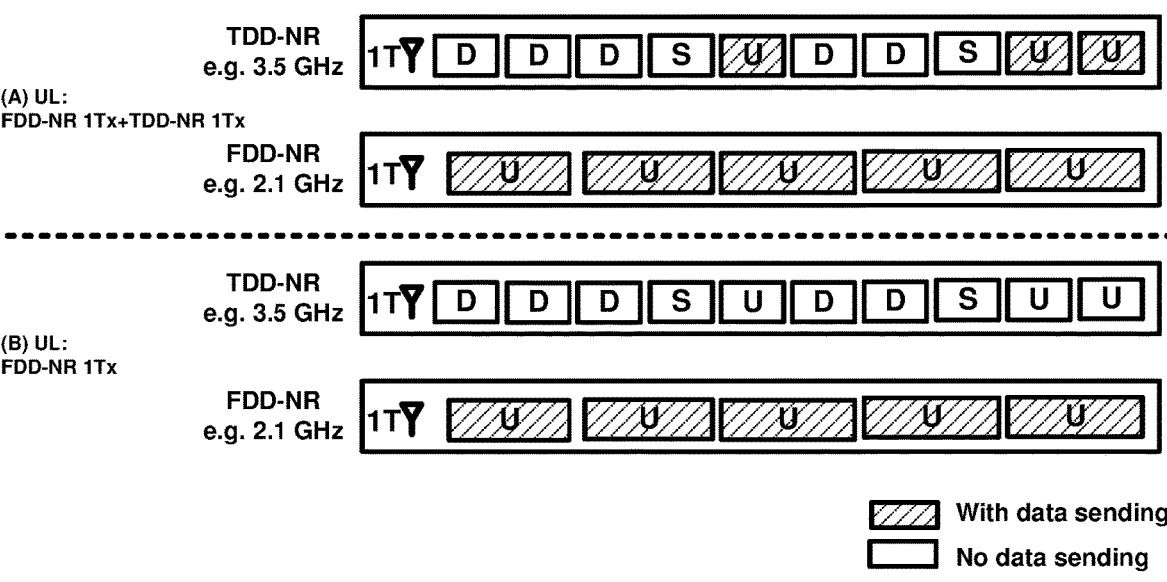
FIG. 18B illustrates an example of uplink operation modes of a UE in area A and area B based on the application scenario shown in FIG. 18A, according to some embodiments.

FIG. 18B shows an example of uplink operation modes of a UE in area A and area B according to FIG. 18A. FDD-NR usually adopts medium- or low-range bands offering better uplink coverage than TDD-NR. Therefore, FDD-NR can be used to provide 5G services beyond the TDD-NR coverage area to improve user experience. For example, when the uplink data rate at cell edge is 2 Mbps, if FDD-NR 2.1 GHz (20 MHz bandwidth) and TDD-NR 3.5 GHz (100 MHz bandwidth) are aggregated, the coverage can be improved by 17.8% compared with SA-based TDD-NR single carrier. Since UL inter-band CA cannot use uplink dual streams, it may have a negative impact on capacity. For example, when 2.1 GHz (20 MHz bandwidth) and 3.5 GHz (100 MHz bandwidth) are aggregated, the uplink peak data rate of a single user drops to 80% of that with 3.5 GHz in SA mode. In this case, gNB will NOT activate uplink CA but single-carrier mode to maximize the resource utilization. It may be clarified that NOT in all scenarios will UL CA have the negative impact on capacity. The single user's uplink throughput of CA is directly related to the bandwidth and uplink duty ratio (of TDD-NR carrier) of the two aggregated component carriers (CC1 and CC2). For example, when CC1 is a TDD-NR carrier (bandwidth of 50 MHz and 2.5 ms dual-period frame structure), and CC2 is an FDD-NR carrier (bandwidth of 20 MHz). The uplink peak throughput of UL CA is increased by about 8% compared to that of TDD-NR single-carrier of dual-stream. CA technology was introduced from the 4G era and has been successfully deployed and commercialized worldwide. NR CA has been included since 3GPP Rel-15. Intra-band CA can aggregate multiple frequency carriers of the same band and improve user experience. However, the throughput of inter-band CA can be limited in some cases by the number of transmission channels of terminals.

Figure 19A:
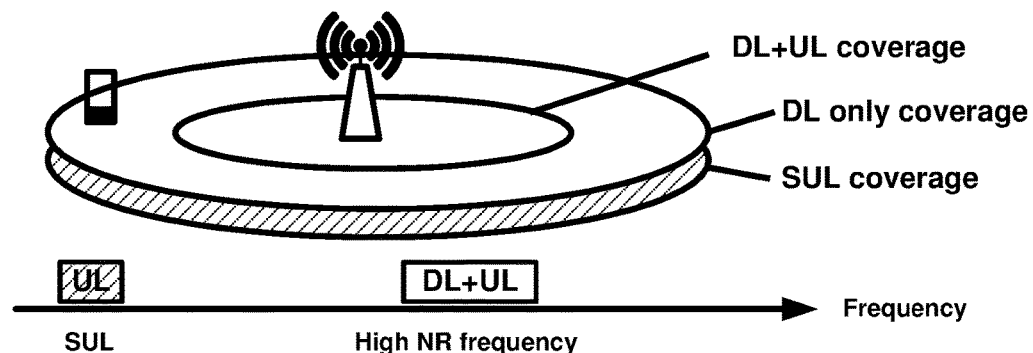
FIG. 19A illustrates an example of supplementary uplink coverage (SUL), according to some embodiments.

FIG. 19A shows an example of supplementary uplink coverage. Supplementary uplink (SUL) is introduced to extend the uplink coverage by providing a supplementary uplink (usually in sub-3 GHz band). With SUL, a DL frequency band (NR frequency band) and two uplink frequency bands (one NR frequency band and one SUL frequency band) are configured in the same cell. When the uplink coverage of the NR carrier is good, UE uses the NR carrier to send and receive data. When the UE is moving beyond the uplink coverage of the NR carrier, UE uses the SUL carrier for transmitting data. UE can dynamically select the UL NR or SUL for data transmission, but cannot use the two carriers at the same time. The uplink operating bands of SULs are defined similarly to those of the corresponding FDD-LTE/FDD-NR operating bands, and need to be shared with the existing network (4G or 5G). The SUL bands may involve uplink, so it cannot be used alone. For example, 3GPP is compatible with the 8 combinations of SUL and NR bands, including the combined definition of n78, n79 and SUL bands.

Figure 19B:
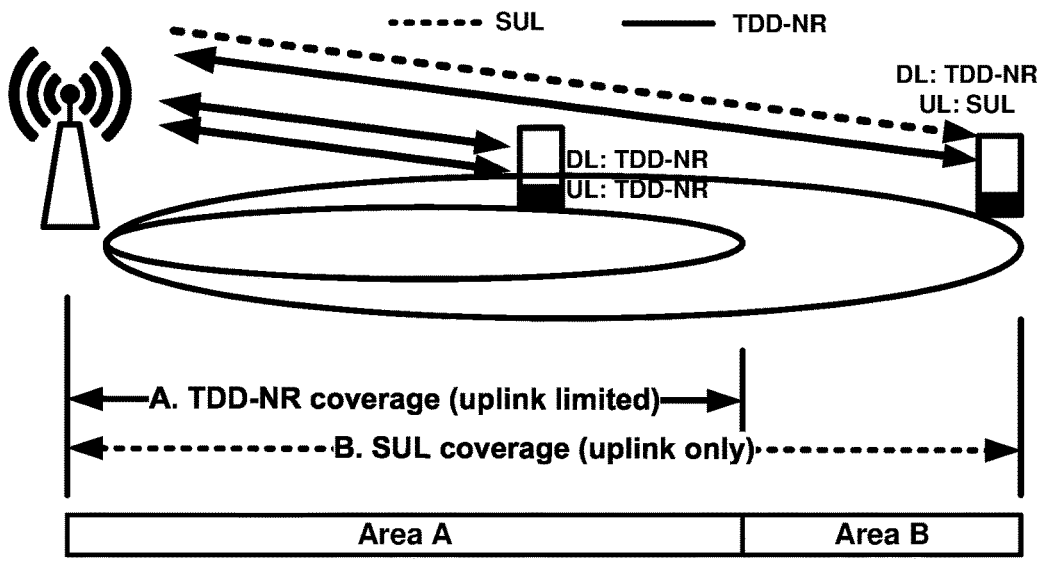
FIG. 19B illustrates an example application scenario of SUL, according to some embodiments.

FIG. 19B shows an example application scenario of SUL. In Area A, with the good coverage of TDD-NR, UE uses TDD-NR for data transmitting. In Area B, beyond the uplink coverage of TDD-NR, UE switches to the SUL band for data sending.

Figure 19C:
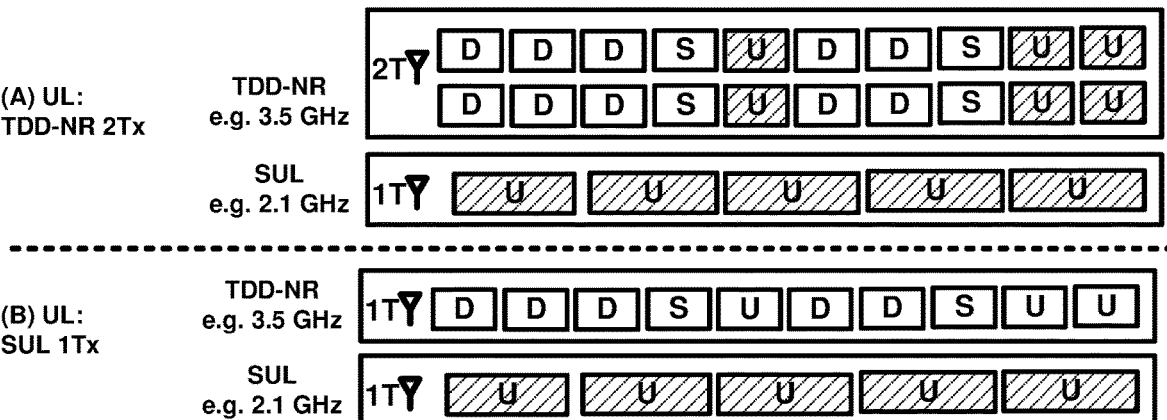
FIG. 19C illustrates an example of uplink operation modes of a UE in Area A and Area B based on the example applicable shown in FIG. 19B, according to some embodiments.

FIG. 19C shows an example of uplink operation modes of a UE in Area A and Area B according to FIG. 19B. SUL may be implemented at sub-3 GHz bands with better uplink coverage than TDD-NR bands, therefore may improve user experience. For example, in dense urban areas where cell edge uplink data rate is 2 Mbps, if SUL 2.1 GHz (bandwidth of 20 MHz) and TDD-NR 3.5 GHz (bandwidth of 100 MHz) are deployed for networking, the network coverage can be increase by 17.8% compared to that of TDD-NR single-carrier and SA architecture. In TDD-NR coverage areas, TDD-NR will be used to send and receive data, so SUL will NOT influence the single user's peak throughput. The downside of SUL is that it makes general 5G NR bands and SUL bands more dependent on one another since they have to be in the same cell, which limits its applicability. SUL technology improves the uplink coverage by using sub-3 GHz bands for uplink transmission. SUL defines new paired spectrum between TDD-NR and SUL and SUL is obtained by sharing the spectrum with 4G network. Therefore, 5G may be co-sited with 4G which limits the flexibility of 5G deployment and brings new problems to network deployment.

As seen in above UL scenarios, for the commercial UE that uses one Tx for a 5G NR, the uplink dual stream capability of 5G NR cannot be used, and so the peak UL data throughput is much lower than the achievable throughout. In 3GPP Rel. 16, UL Tx Switching was introduced as a new feature to enhance EN-DC, UL CA, and SUL performance. UL Tx switching can maximize uplink resource utilization with respect to UE's capability. It uses one Tx channel either for carrier 1 or carrier 2, and uses the other Tx channel exclusively for carrier 2.

A transmitter (Tx) of a wireless device may have/comprise one or multiple (e.g., two) antennas/Tx chains. Throughout this disclosure, the terms "antenna" and/or "Tx chain" may be interchangeable and/or may be used to refer to a physical antenna connector (e.g., of a respective antenna unit) of the UE that can integrate hardware and software to transmit/radiate/propagate a radio signal in the air directed as a particular beam. Here, an antenna may comprise an array/group of multiple antenna elements that generate a signal based on beamforming and/or MIMO/massive MIMO. Throughout this disclosure, the following terms may be used interchangeably: Tx; antenna; transmit antenna; transmitter antenna; transmission antenna; Tx antenna; transmit channel; Tx channel; transmission channel; transmit chain; Tx chain; Tx RF chain; transmission chain; physical antenna port. In some embodiments, "Tx" may be used for short to refer to the above concept.

Antenna may comprise one or more RF components and/or antenna arrays, configured to send and/or receive wireless signals. Antenna may be coupled to radio front end circuitry and may be any type of antenna capable of transmitting and/or receiving data and/or signals wirelessly. In some embodiments, antenna may comprise one or more omni-directional, sector or panel antennas operable to transmit/receive radio signals between, for example, 2 GHz and 66 GHz. An omni directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna may be separate from network node and may be connectable to network node through an interface or port. RF interface may be configured to provide a communication interface to RF components such as a transmitter, a receiver, and an antenna.

For example, advanced antenna system (AAS) is a combination of an AAS radio and a set of AAS features. An AAS radio consists of an antenna array closely integrated with the hardware and software required for transmission and reception of radio signals, and signal processing algorithms to support the execution of the AAS features. Compared to conventional systems, this solution provides much greater adaptivity and steerability, in terms of adapting the antenna radiation patterns to rapidly time-varying traffic and multipath radio propagation conditions. In addition, multiple signals may be simultaneously received or transmitted with different radiation patterns. Multi-antenna techniques, here referred to as AAS features, include beamforming and MIMO. Applying AAS features to an AAS radio results in significant performance gains because of the higher degrees of freedom provided by the larger number of radio chains, also referred to as Massive MIMO.

For beamforming, the UE may use multiple antennas to control the direction of a wave-front by appropriately weighting the magnitude and phase of individual antenna signals in an array of multiple antenna elements. That is, the same signal is sent from multiple antennas that have sufficient space between them (at least ½ wavelength). In any given location, the receiver will thus receive multiple copies of the same signal. Depending on the location of the receiver, the signals may be in opposite phases, destructively averaging each other out, or constructively sum up if the different copies are in the same phase, or anything in between. By adjusting the phase and amplitude of the transmitted signals, constructive addition of the corresponding signals at the base station receiver can be achieved, which increases the received signal strength and thus the UE's uplink throughput. The more antenna elements there are, the higher the gain.

In digital beamforming (also known as baseband beamforming or precoding), the signal is pre-coded (amplitude and phase modifications) in baseband processing before RF transmission. Multiple beams (one per each user) can be formed simultaneously from the same set of antenna elements. In analog beamforming, the signal phases of individual antenna signals are adjusted in RF domain. Analog beamforming impacts the radiation pattern and gain of the antenna array, thus improves coverage. Unlike in digital beamforming, one beam per set of antenna elements can be formed.

Spatial multiplexing, here referred to as MIMO, is the ability to transmit multiple data streams, called layers, using the same time and frequency resource, where each data stream can be beamformed. The purpose of MIMO is to increase throughput. MIMO builds on the basic principle that when the received signal quality is high, it is better to receive multiple streams of data with reduced power per stream, than one stream with full power. The potential is large when the received signal quality is high and the streams do not interfere with each other. The potential diminishes when the mutual interference between streams increases. A number of layers/data streams that can be supported may be called "rank". To distinguish between UL layers, a UE needs to have at least as many Tx antennas as there are layers, e.g., 2Tx to support 2-layer (or 2-port) transmissions.

An antenna port may be generally used as a generic term for signal transmission under identical channel conditions. For each operating mode for which an independent channel is assumed (e.g., SISO vs. MIMO), a separate logical antenna port may be defined. Signals transmitted from different antennas ports may experience different "radio channels" even if the set of antennas are located at the same site. In some cases, it is important that transmissions share the same antenna port (e.g., quasi-collocated). OFDM symbols that are transmitted via identical antenna ports are subject to the same channel conditions. This helps the base station to estimate the channel using reference signals (e.g., DMRS) and use that information in decoding information content on physical channels (e.g., PUSCH/PUCCH). According to 3GPP specification definition, an antenna port is defined such that the channel over which a symbol on the antenna port is conveyed can be inferred from the channel over which another symbol on the same antenna port is conveyed. MIMO takes advantage of this property (different radio channel) across different antenna ports to transmit multiple parallel streams of data. It is important to understand that antenna port is an abstract concept. There is a difference in logical 'antenna port' and physical 'antenna element'. Specific transmissions use specific antenna ports and then those antenna ports are mapped onto one or more physical antenna elements.

Figure 20:
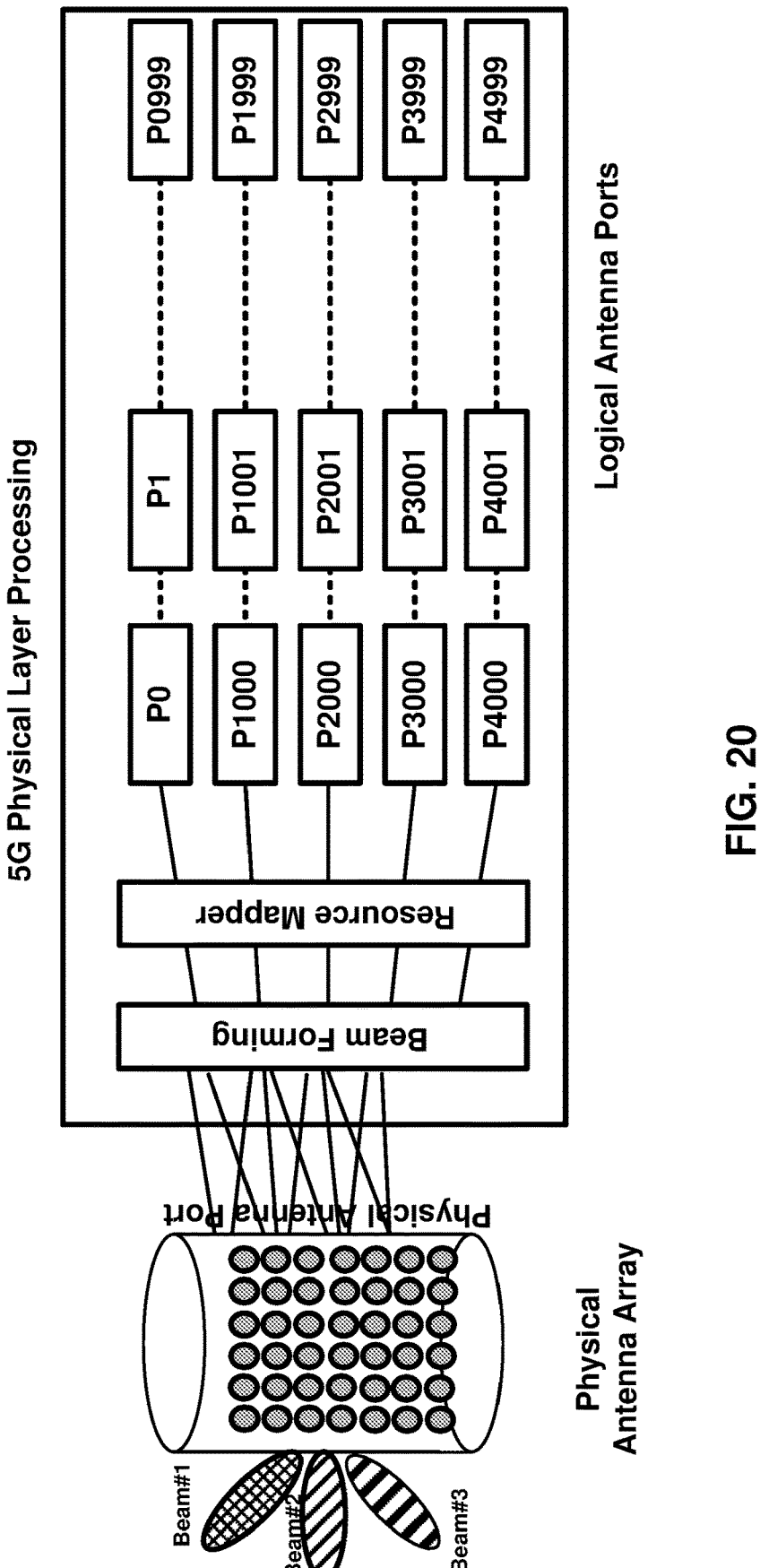
FIG. 20 illustrates an example of wireless device transmitter antenna, according to some embodiments.

FIG. 20 shows an example of wireless device transmitter antenna. Logical antenna ports are mapped to physical antenna ports as shown in the figure. The mapping of antenna port to physical antenna is controlled by beam forming, as a certain beam needs to transmit the signal on certain antenna ports to form a desired beam. There is a possibility that two antenna ports are mapped to one physical antenna port, and/or a single antenna port mapped is to multiple physical antenna ports.

In order to determine the characteristic channel for an antenna port, a UE may carry out a separate channel estimation for each antenna port. Separate reference signals that are suitable for estimating the respective channel may be defined for each antenna port. The way in which these logical antenna ports are assigned to the physical transmit antennas of a UE may be up to the UE, and may vary between UEs of the same type (because of different operating conditions) and also between UEs from different manufacturers. The UE may not explicitly notify the base station of the mapping that has been carried out, rather the base station may take this into account automatically during demodulation.

For the case of UL channel estimation, there are differences depending on whether time division duplex (TDD) or frequency division duplex (FDD) is used. For TDD, the same frequency is used for both UL and DL transmission. Since the radio channel is reciprocal (the same in UL and DL), detailed short-term channel estimates from UL transmission of known signals can be used to determine the DL transmission beams. This is referred to as reciprocity-based beamforming. For full channel estimation, signals should be sent from each UE antenna and across all frequencies. For FDD, where different frequencies are used for UL and DL, the channel is not fully reciprocal.

Characteristics of a UE transmitter may be specified at the antenna connector of the UE with a single or multiple transmit antenna(s). For UE with integral antenna, a reference antenna with a gain of 0 dB may be assumed. Transmitter requirements for UL MIMO operation may apply when the UE transmits on 2 ports on the same CDM group. The UE may use higher MPR (Allowed maximum power reduction) values outside this limitation.

For inter-band carrier aggregation with one uplink carrier assigned to one NR band, transmitter power requirements may apply. For inter-band carrier aggregation with uplink assigned to two NR bands, UE maximum output power shall be measured over all component carriers from different bands. If each band has separate antenna connectors, maximum output power is measured as the sum of maximum output power at each UE antenna connector. The period of measurement shall be at least one sub frame (1 ms).

For uplink transmissions, a UE may reconfigure/retune some radio frequency (RF) hardware (and/or a Tx chain, e.g., filters and/or duplexers) between two carriers, e.g., from a first carrier to a second carrier or vice versa. This reconfiguration/retuning may be referred to as moving/ switching a Tx chain between carriers. In fact, UL Tx switching between two carriers comprises reconfiguring/ retuning of an UL Tx chain/antenna from a center frequency of a first carrier to a center frequency of a second carrier (or vice versa). Same UL Tx chain/antenna/antenna connector may be used for uplink transmissions via the first carrier (e.g., before switching) and the second carrier (e.g., after switching). The UL Tx switching may be in response to receiving scheduling commands and/or TDD UL symbols/ slots/subframes, thus, also called "dynamic UL Tx switching".

Throughout this disclosure, the following terms may be used interchangeably: Tx switching; UL switching; carrier switching; UL carrier switching; UL Tx switching; UL transmission switching; UL transmit channel switching; UL Tx chain switching; UL Tx antenna switching; Tx antenna switching; Dynamic UL Tx switching.

Figures 21A, 21B:
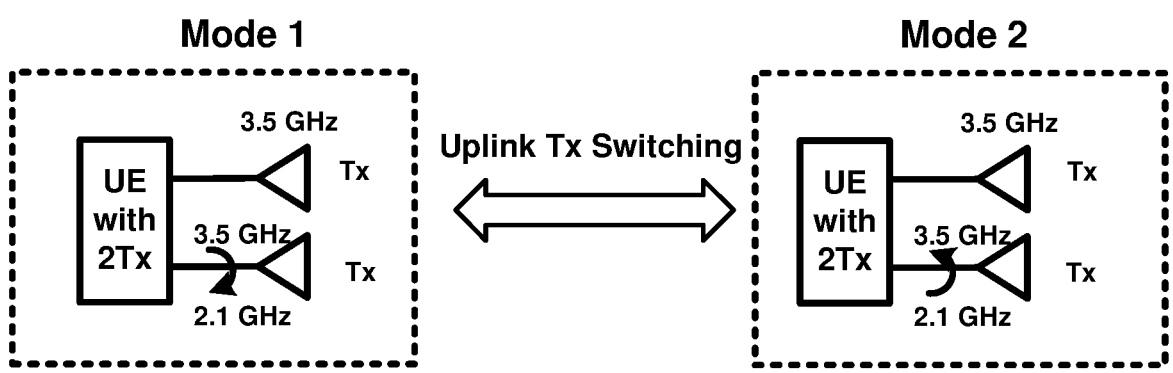
FIG. 21A illustrates an example of uplink Tx switching for a UE with 2Tx, according to some embodiments.
FIG. 21B illustrates an example of transmission options for UL Tx switching, according to some embodiments.

FIG. 21A shows an example of uplink Tx switching for a UE with 2Tx. As shown in the figure, UL Tx switching enables two operation modes: Mode 1, where one Tx channel is used for 2.1 GHz carrier, and the other is used for 3.5 GHz carrier; and Mode 2, where one Tx channel is switched to 3.5 GHz, and the other is still used for 3.5 GHz, which enables TDD-NR Dual-Stream transmission. Uplink Tx Switching is used when switching between mode 1 and mode 2.

FIG. 21B shows an example of transmission options for UL Tx switching. As UE capabilities vary from terminal to terminal, Option 1 and Option 2 are further defined in Rel-16, as shown in the figure. In option 1, UE can send data over carrier 1 and carrier 2 in time division mode (TDM), but not at the same time. This option may be referred to as "switched uplink". In option 2, in the terminal side, carrier 1 and carrier 2 can be flexibly aggregated, either in TDM mode or simultaneous transmission mode. This option may be referred to as "dual uplink".

Figures 22A, 22B, 22C:
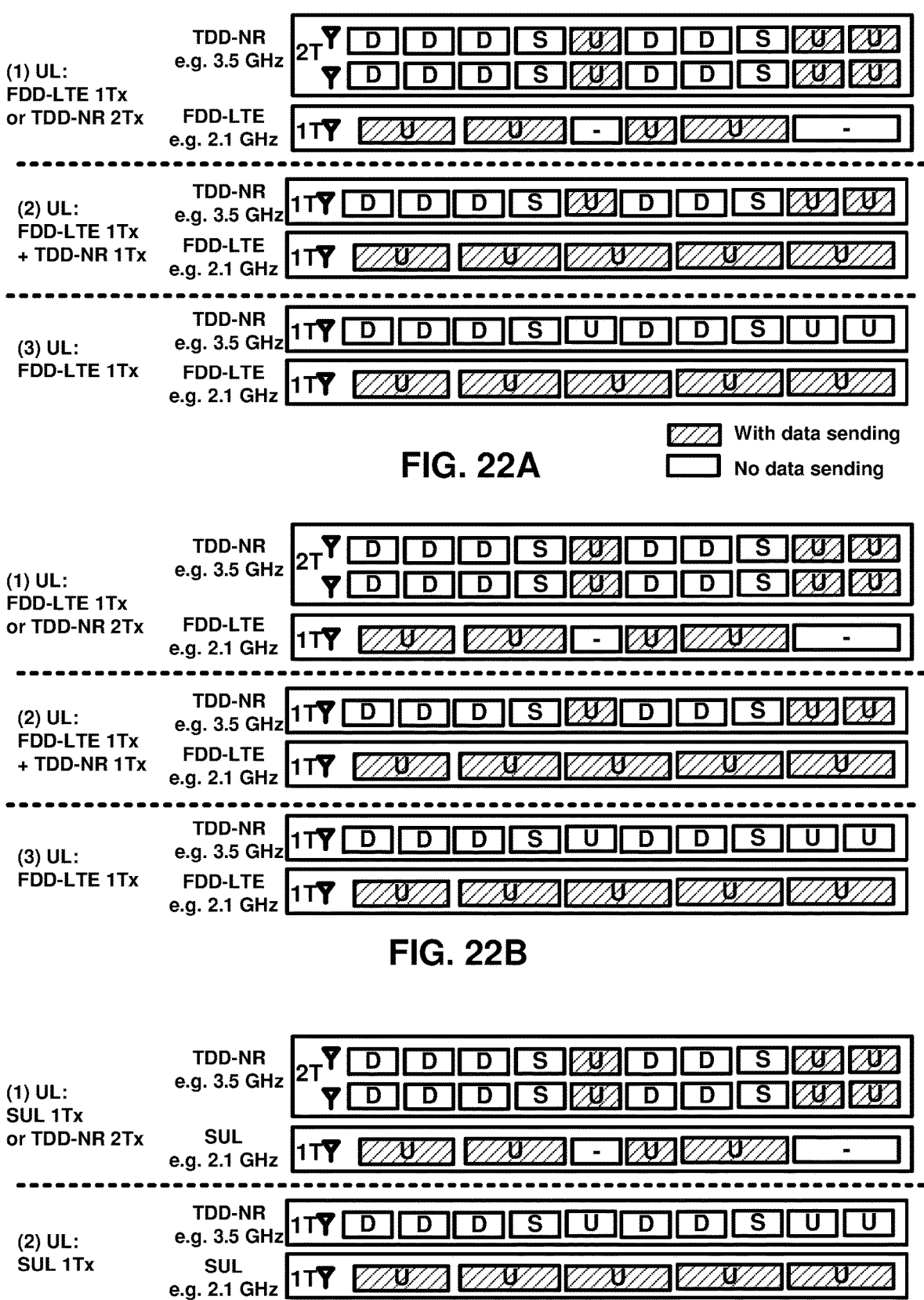
FIG. 22A illustrates an example of uplink operating modes of UE with Uplink Tx Switching in EN-DC scenario, according to some embodiments.
FIG. 22B illustrates an example of uplink operating modes of UE with Uplink Tx Switching in inter-band CA scenario, according to some embodiments.
FIG. 22C illustrates an example of uplink operating modes of UE with Uplink Tx Switching in SUL scenario, according to some embodiments.

FIG. 22A shows an example of uplink operating modes of UE with Uplink Tx Switching in EN-DC scenario. With Uplink Tx Switching (EN-DC), in the uplink time slots for TDD-NR, the Tx channels that originally supported LTE are switched to the TDD-NR frequency band, so that UE can use dual-stream in uplink, and in other time slots, the Tx are switched back to LTE. With regard to factors of the UE' capabilities and wireless environment, UE can work in different modes as shown in FIG. 22A. Uplink Tx Switching is used to enhance the uplink capacity. With Uplink Tx Switching, in the uplink time slots for TDD-NR, dual-stream is maintained, and in other time slots UE uses the traditional EN-DC mode, resulting the uplink peak throughput increased by about 17% of that of TDD-NR in SA architecture.

FIG. 22B shows an example of uplink operating modes of UE with Uplink Tx Switching in inter-band CA scenario. With Uplink Tx switching activated for inter-band CA, in TDD-NR UL time slots UE can transmit data with dual-stream. For example, when close to cell tower, UE can use inter-band CA with uplink Tx switching to further improve capacity and reduce latency. At cell edge, UE uses FDD frequency band to send data, while maintaining FDD and TDD carrier aggregation in downlink, improving user experience. Inter-band CA can flexibly support Option 1 and Option 2 of uplink Tx switching. UE can work in one of the modes shown in FIG. 22B depending on the UE capabilities and the radio environment. In addition, 3GPP Rel-16 has expanded the frequency band combinations of carrier aggregation to 78, and by integrating with Uplink Tx Switching, CA can boost 5G performance in coverage, capacity and latency.

With Uplink Tx Switching, UE can connect to both FDD and TDD carriers at the same time, even at cell edge, which solves the issue of no 5G access due to limited uplink. For example, in case of TDD-NR with 3.5 GHz and a bandwidth of 100 MHz, and FDD-NR frequency band of 2.1 GHz utilized for carrier aggregation, when cell edge uplink data rate is 2 Mbps, adopting CA with Uplink Tx Switching can increase network capacity by 17.8%, compared to the network with single-carrier TDD-NR. In the case of TDD-NR with 3.5 GHz (bandwidth of 100 MHz) aggregates FDD-NR of 2.1 GHz (bandwidth is 20 MHz) with Uplink Tx Switching, uplink peak throughput capacity is improved by 20%. Uplink Tx Switching can increase uplink time slot availability to 100%, therefore HARQ RTT can be reduced by 25% without uplink data having to waiting for TDD-NR uplink timeslots. 3GPP Rel-15 introduces inter-band CA with concurrent transmission on two carriers which may result in capacity loss without TDD-NR's dual-stream transmission on uplink. While with Uplink Tx Switching, this limitation has been eliminated by sending data on FDD-NR and TDD-NR carriers with TDM mode. CA with Uplink Tx Switching maximizes spectrum utilization in both time domain and frequency domain, and by integrating with the feature of power boosting on TDD-NR carrier to achieve better user experiences.

FIG. 22C shows an example of uplink operating modes of UE with Uplink Tx Switching in SUL scenario. With Uplink Tx Switching, SUL can integrate both TDD-NR and SUL's time-frequency resources within TDD-NR's coverage area, thereby increasing uplink capacity. SUL supports Option 1 (TDM mode) with uplink Tx switching. Depending on the wireless environments, UE operates in the modes shown in FIG. 22C. When close to cell tower, UE switches between TDD-NR and SUL frequency bands for data transmission. At cell edge, SUL carrier is used to provide uplink coverage. Therefore, SUL with Uplink Tx Switching improves uplink throughput and reduces latency, and cannot improve the coverage compared with SUL without Uplink Tx Switching. With Uplink Tx Switching, uplink time-frequency resources of SUL can be allocated for UE, and single user's uplink capacity can be increased by 20%. Up to 100% of the uplink time slots can be available, and HARQ RTT can be reduced by nearly 20%.

Some LTE-NR aggregation combinations of channels across two bands may be considered difficult to achieve, because the simultaneous uplink transmissions on these bands give rise to inter-modulation (IM) products in a downlink (DL), e.g., from base station to wireless device, band. For example, this may happen for inter-band frequency division duplex (FDD)-FDD and time division duplex (TDD)-TDD combinations. This means that there will be combinations of channels across the said two bands that are not difficult to achieve, which means that the wireless device may support dual simultaneous uplink for the band combination. Here, a channel may be a part of spectrum.

For the aggregation combinations where IM products due to simultaneous multiple uplink (UL), e.g., from wireless device to base station, transmitters to DL receivers in the wireless device are caused, any problems with IM depend on the actual output power of the UL, the power balance, the allocations, the wanted signal levels and other interference. Then, the different wireless device implementations will have varying performance. In an ideal scenario, the BS will reliably obtain channel state information (CSI) reports and PHR and may then be able to take action for a notorious band combination, if the IM can be distinguished from other external interference.

A UE supporting uplink CA across carriers can be assumed to have dedicated Transmit (Tx) chains for each carrier, and hence is able to support CA without any restrictions. On the other hand, there can be UEs that may share some hardware (e.g., a Tx antenna, a power amplifier, phase locked loops, a transmitter chain circuit, etc.) across the two carriers, and hence may need special handling (e.g., via scheduling) to ensure proper operation. For example, a UE may have 2 Tx chains, and it can transmit on the uplink on two carriers, but with some restriction. Such a UE is not able to transmit 1 Tx on carrier 1 and 2 Tx on carrier 2 (e.g., to support 2-layer multiple-input-multiple-output (MIMO) on carrier 2) since it has 2 Tx chains, and hence the UE can support either case 1 or case 2 for transmitting on the uplink.

Implementation of dual-UL is certainly possible at higher expense in terms of additional RF components, e.g., two TX digital front end, additional TX phase locked loop (PLL), additional TX measurement receiver, power management between two ULs (of different stacks), multiplexer filters needed after PA (duplexers replaced by multiplexers), isolation between the TX paths, etc.

A switching gap may be needed to allow the UE enough time to switch (e.g., to move/reconfigure some hardware (or a Tx chain) from carrier 1 to carrier 2 or vice versa) between the two carriers. The network (NW) needs to provide switching gaps on one of the carriers and would also need to provide enough additional relaxation in UE Physical Uplink Shared Channel (PUSCH) processing time, which is time typically between an end of an UpLink (UL) grant and start of the PUSCH.

When configuring serving cells with uplink carriers, e.g., for dual connectivity and/or carrier aggregation, the network may send an enquiry (e.g., UECapabilityEnquiry) for the UE radio access capability information. The network initiates the procedure to a UE in RRC_CONNECTED when it needs (additional) UE radio access capability information. The UE may receive the enquiry from the base station, e.g., via an RRC message. The UE may set the contents of the capability information (e.g., UECapabilityInformation) message based on the request fields in the enquiry message. For example, if the ue-CapabilityRAT-RequestList contains a UE-CapabilityRAT-Request with rat-Type set to nr, the UE shall include in the ue-CapabilityRAT-ContainerList a UE-CapabilityRAT-Container of the type UE-NR-Capability and with the rat-Type set to nr. The UE may include the list of supported band combinations and feature sets (e.g., supportedBandCombinationList, featureSets and featureSetCombinations).

The UE may send an RRC message comprising the UE capability information. The UE capability information may comprise a list of band combinations supported by the UE (e.g., BandCombinationList). The list of band combinations may contain a list of NR CA, NR non-CA and/or MR-DC band combinations (also including DL only or UL only band).

In an example, the enquiry may comprise a request for UL Tx switching (e.g., uplinkTxSwitchRequest). In response, the UE may send the list of band combinations that the UE can support for UL Tx switching (e.g., BandCombinationUplinkTxSwitch). For example, the UE may include into the list of supported band combinations for UL Tx switching (e.g., supportedBandCombinationList-UplinkTxSwitch) as many NR-only/E-UTRA-NR band combinations that supported UL TX switching as possible from a list of candidate band combinations, starting from a first entry.

The list of (one or more) supported band combinations for UL Tx switching may comprise a list of (one or more) supported band pairs (e.g., supportedBandPairListNR), and/or the support option for the uplink Tx switching (e.g., uplinkTxSwitching-OptionSupport). For example, support option may indicate a "switched UL" mode (e.g., TDM transmission), or "dual UL" mode (concurrent transmission), or both modes. For example, support option may indicate whether power boosting for UL Tx switching is supported or not (e.g., uplinkTxSwitching-PowerBoosting).

Each band pair of the supported band pairs for UL Tx switching comprises a first frequency band and a second frequency band. The capability information indicates, for each band pair (e.g., ULTxSwitchingBandPair), an index of a first frequency band (e.g., bandIndexUL1) and an index of a second frequency band (e.g., bandIndexUL2) for simultaneous transmission. The capability information may also indicate for each band pair, a switching gap/period associated with the two frequency bands of the band pair (e.g., uplinkTxSwitchingPeriod). For example, the switching gap/period may be a duration in microseconds (e.g., 35 us, 140 us, or 210 us).

The network may configure one or more cells for the UE. For example, the network may transmit RRC message(s) indicating one or more cell groups (e.g., CellGroupConfig). The RRC message(s) may comprise, for a cell group (MCG and/or SCG), configuration parameters of one or more serving cells, e.g., Pcell and/or SPcell and/or Scell(s). Each of the one or more serving cells may comprise one or more uplink carriers (e.g., UL (NUL) and/or SUL). The RRC message(s) may comprise a parameter that indicates an option, e.g., switched UL or dual UL, for UL Tx switching within the cell group (e.g., uplinkTxSwitchingOption), e.g., based on the UE capability information. The RRC message (s) may comprise a parameter that indicates whether power boosting is enabled for UL Tx switching within the cell group (e.g., uplinkTxSwitchingPowerBoosting).

The network may configure one or more serving cells for the UE, which may be the SpCell or an SCell of an MCG or SCG. The UE may receive one or more RRC messages comprising configuration parameters of the one or more serving cells. The configuration parameters of a serving cell may indicate downlink configurations and/or uplink configurations. For example, the configuration parameters of the serving cell may indicate one or more downlink BWPs of the serving cell. For example, the configuration parameters of the serving cell may indicate at least one uplink carrier of the serving cell, e.g., UL (NUL) and/or SUL. For an uplink carrier, the configuration parameters may indicate one or more UL BWPs. For an uplink carrier, the configuration parameters may indicate that UL Tx switching is configured (e.g., uplinkTxSwitching).

The UL Tx switching configuration associated with an uplink carrier of a cell may indicate whether the configured uplink carrier is "carrier1" or "carrier2" for dynamic UL Tx switching (e.g., via uplinkTxSwitchingCarrier). For example, the UL "carrier1" may be capable of one transmit antenna connector and UL "carrier2" may be capable of two transmit antenna connectors. For example, in case of inter-band UL CA or SUL, network configures one of the two uplink carriers involved in dynamic UL TX switching as carrier1 and the other as carrier2. In case of (NG)EN-DC, network always configures the NR carrier as carrier 2.

The UL Tx switching configuration associated with an uplink carrier of a cell may indicate a location of UL Tx switching period (e.g., via uplinkTxSwitchingPeriodLocation). For example, a Boolean parameter/field may indicate whether the location of the UL Tx switching period is configured in this respective UL carrier or not. In case of inter-band UL CA or SUL, network configures this field to TRUE for one of the uplink carriers involved in dynamic UL TX switching and configures this field in the other carrier to FALSE. In case of (NG)EN-DC, network always configures this field to TRUE for NR carrier (i.e. with (NG)EN-DC, the UL switching period always occurs on the NR carrier).

Figures 23A, 23B:
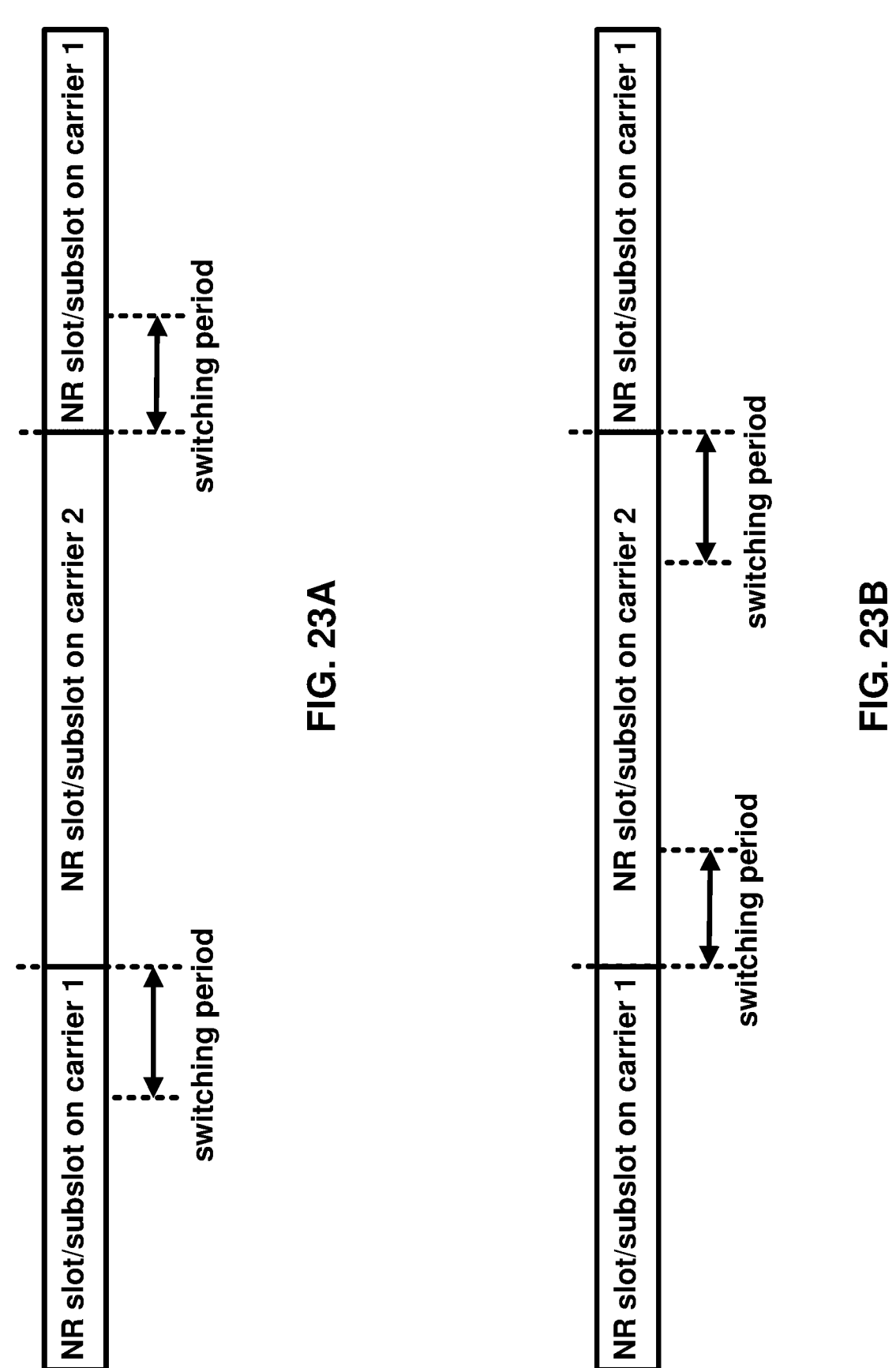
FIG. 23A and FIG. 23B illustrate examples of UL Tx switching period location, according to some embodiments.

FIG. 23A and FIG. 23B show examples of UL Tx switching period location. Time mask for switching between two uplink carriers is shown in FIG. 23A and FIG. 23B. A switching time mask may be applicable for an uplink band pair. For example, the uplink band pair may be associated with an inter-band UL CA configuration and/or SUL configuration and/or dual connectivity (e.g., NR-DC and/or EN/DC and/or NE-DC and/or MR-DC). The two uplink carriers may be in different bands with different carrier frequencies. A capability information indicating UL Tx switching period/gap (e.g., uplinkTxSwitchingPeriod, $N_{Tx1-Tx2}$) may be present for the respective band combination associated with the two uplink carriers and/or sent to the network. For example, NR UL carrier 1 is capable of one transmit antenna connector and NR UL carrier 2 is capable of two transmit antenna connectors, e.g., with 3 dB boosting on the maximum output power when the capability uplinkTxSwitchingPowerBoosting is present and the IE powerboostingTxSwitching is set to 1. The UE may support the switch between single layer transmission with one antenna port and two-layer transmission with two antenna ports on the two uplink carriers following the scheduling commands and/or rank adaptation. In an example, both single layer and two-layer transmission with 2 antenna ports, and single layer transmission with 1 antenna port may be supported on NR UL carrier 2.

The switching periods described in FIG. 23A and FIG. 23B are located in either NR carrier 1 or carrier 2 as indicated in RRC signaling (e.g., uplinkTxSwitchingPeriodLocation). FIG. 23A shows an example time mask for switching between UL carrier 1 and UL Carrier 2, where the switching period is located in carrier 1. FIG. 23B shows an example time mask for switching between UL carrier 1 and UL Carrier 2, where the switching period is located in carrier 2. The length of uplink switching period may be less than the value indicated by UE capability uplinkTxSwitchingPeriod. The requirements may apply for the case of co-located and synchronized network deployment for the two uplink carriers. The requirements may apply for the case of single TAG for the two uplink carriers, e.g., the same uplink timing for the two carriers.

The UE may omit uplink transmission during the uplink switching gap $N_{Tx1-Tx2}$ if one or more conditions are met and/or the UE is configured with UL Tx switching (uplinkTxSwitching). The switching gap/period $N_{Tx1-Tx2}$ is indicated by UE capability uplinkTxSwitchingPeriod for the respective band combination associated with the two uplink carriers. The UE may indicate a capability for uplink switching with a parameter (e.g., BandCombination-UplinkTx-Switch) for a band combination. For that band combination, the UE may be configured with a MCG using E-UTRA radio access and with a SCG using NR radio access (EN-DC). For that band combination, the UE may be configured with uplink carrier aggregation. For that band combination, the UE may be configured in a serving cell with two uplink carriers with higher layer parameter for SUL (supplementaryUplink). The one or more conditions under which the switching gap/period may be present and the location of the switching gap may be defined as follows.

If an uplink switching is triggered for an uplink transmission starting at $T_0$, after $T_0$-$T_{offset}$, the UE may not be expected to cancel the uplink switching, and/or to trigger any other new uplink switching occurring before $T_0$ for any other uplink transmission that is scheduled after $T_0$-$T_{offset}$, where $T_{offset}$ is the UE processing procedure time defined for the uplink transmission triggering the switch.

The UE may not expect to perform more than one uplink switching in a slot with $\mu_{UL}$=max($\mu_{UL, 1}$, $\mu_{UL, 2}$), where the $\mu_{UL, 1}$ corresponds to the subcarrier spacing of the active UL BWP of one uplink carrier before the switching gap and the $\mu_{UL, 2}$ corresponds to the subcarrier spacing of the active UL BWP of the other uplink carrier after the switching gap.

A UE may indicate a capability for uplink switching (e.g., with BandCombination-UplinkTxSwitch) for a band combination. For that band combination, the UE may be configured with a MCG using E-UTRA radio access and with a SCG using NR radio access (EN-DC). The UE may be configured with uplink switching (e.g., with parameter uplinkTxSwitching).

The UE may be configured with switched UL transmission mode (e.g., uplinkTxSwitchingOption set to 'switchedUL'). The UE may be to transmit in the uplink based on DCI(s) received before $T_0$-$T_{offset}$ or based on a higher layer configuration(s). The UE may be to transmit an NR uplink that takes place after an E-UTRA uplink on another uplink carrier. The UE may not be expected to transmit for the duration of switching period/gap $N_{Tx1-Tx2}$ on any of the two carriers. The UE may be to transmit an E-UTRA uplink that takes place after an NR uplink on another uplink carrier. The UE may not be expected to transmit for the duration of switching period/gap $N_{Tx1-Tx2}$ on any of the two carriers. The UE may not be expected to transmit simultaneously on the NR uplink and the E-UTRA uplink. If the UE is scheduled or configured to transmit any NR uplink transmission overlapping with an E-UTRA uplink transmission, the NR uplink transmission may be dropped.

The UE may be configured with dual UL transmission mode (e.g., uplinkTxSwitchingOption set to 'dualUL'). The UE may be to transmit in the uplink based on DCI(s) received before $T_0$-$T_{offset}$ or based on a higher layer configuration(s). The UE may be to transmit an NR two-port uplink that takes place after an E-UTRA uplink on another uplink carrier. The UE may not be expected to transmit for the duration of switching period/gap $N_{Tx1\text{-}Tx2}$ on any of the two carriers. The UE may be to transmit an E-UTRA uplink that takes place after an NR two-port uplink on another uplink carrier. The UE may not be expected to transmit for the duration of switching period/gap $N_{Tx1\text{-}Tx2}$ on any of the two carriers. The UE may not be expected to transmit simultaneously a two-port transmission on the NR uplink and the E-UTRA uplink. In other cases the UE may be expected to transmit normally all uplink transmissions without interruptions. The UE may be configured with tdm-PatternConfig or by tdm-PatternConfig2. For the E-UTRA subframes designated as uplink by the configuration, the UE may assume the operation state in which one-port E-UTRA uplink can be transmitted. For the E-UTRA subframes other than the ones designated as uplink by the configuration (e.g., downlink and/or special and/or flexible subframes/slots/symbols), the UE may assume the operation state in which two-port NR uplink can be transmitted.

A UE may indicate a capability for uplink switching (e.g., with BandCombination-UplinkTxSwitch) for a band combination. For that band combination, the UE may be configured with uplink carrier aggregation. The UE may be configured with uplink switching (e.g., with parameter uplinkTxSwitching). The UE may be to transmit in the uplink based on DCI(s) received before $T_0$-$T_{offset}$ or based on a higher layer configuration(s). The UE may be to transmit a 2-port transmission on one uplink carrier and the preceding uplink transmission may be a 1-port transmission on another uplink carrier. The UE may not be expected to transmit for the duration of switching period/gap $N_{Tx1\text{-}Tx2}$ on any of the two carriers. The UE may be to transmit a 1-port transmission on one uplink carrier and the preceding uplink transmission may be a 2-port transmission on another uplink carrier. The UE may not be expected to transmit for the duration of switching period/gap $N_{Tx1\text{-}Tx2}$ on any of the two carriers.

For the UE configured with switched UL transmission mode (e.g., uplinkTxSwitchingOption set to 'switchedUL'), when the UE is to transmit a 1-port transmission on one uplink carrier and if the preceding uplink transmission was a 1-port transmission on another uplink carrier, then the UE may not be expected to transmit for the duration of switching period/gap $N_{Tx1\text{-}Tx2}$ on any of the two carriers. For the UE configured with dual UL transmission mode (e.g., uplinkTx-SwitchingOption set to 'dualUL'), when the UE is to transmit a 2-port transmission on one uplink carrier and if the preceding uplink transmission was a 1-port transmission on the same uplink carrier and/or the UE is under the operation state in which 2-port transmission cannot be supported in the same uplink carrier, then the UE may not be expected to transmit for the duration of switching period/gap $N_{Tx1\text{-}Tx2}$ on any of the two carriers. For the UE configured with dual UL transmission mode (e.g., uplinkTxSwitchingOption set to 'dualUL'), when the UE is to transmit a 1-port transmission on one uplink carrier and if the preceding uplink transmission was a 1-port transmission on another uplink carrier and/or the UE is under the operation state in which 2-port transmission can be supported on the same uplink carrier, then the UE may not be expected to transmit for the duration of switching period/gap $N_{Tx1\text{-}Tx2}$ on any of the two carriers. The UE may not be expected to be scheduled and/or configured with uplink transmissions that result in simultaneous transmission on two antenna ports on one uplink carrier, and any transmission on another uplink carrier. In other cases, the UE may be expected to transmit normally all uplink transmissions without interruptions.

A UE may indicate a capability for uplink switching (e.g., with BandCombination-UplinkTxSwitch) for a band combination. For that band combination, the UE may be configured in a serving cell with two uplink carriers, e.g., configured with SUL with higher layer parameter supplementaryUplink. The UE may be configured with uplink switching (e.g., with parameter uplinkTxSwitching). If the UE is to transmit any uplink channel or signal on a different uplink from the preceding transmission occasion based on DCI(s) received before $T_0$-$T_{offset}$ or based on a higher layer configuration(s), then the UE may assume that an uplink switching is triggered in a duration of switching gap $N_{Tx1\text{-}Tx2}$, where $T_0$ is the start time of the first symbol of the transmission occasion of the uplink channel or signal and $T_{offset}$ is the preparation procedure time of the transmission occasion of the uplink channel or signal. During the switching gap $N_{Tx1\text{-}Tx2}$, the UE may not be expected to transmit on any of the two uplinks. In other cases, the UE may be expected to transmit normally all uplink transmissions without interruptions.

There are a variety of emerging and new consumer services which require high uplink date rate, e.g., HD video calls, online webcast/sales, augmented reality (AR), etc., which require about ~10 s Mbps uplink data rate. To boost the uplink throughput and capacity for such widely applicable scenarios, it is necessary to efficiently utilize all uplink resources in multi-carrier scenarios (>2 frequency bands). In practical deployments scenarios, networks will support more than 2 bands. Therefore, efficient utilization of these UL resources may be prioritized.

However, it is difficult to implement more than 2Tx for smartphones due to increasing cost, complexity, heat generation, power consumption and intermodulation interference. Smartphones today are not capable of simultaneously transmitting on more than 2 bands, since current commercial smartphones support up to 2Tx RF chains. More Tx RF chains are difficult to be implemented for smartphone due to the following reasons: the cost and complexity is increasing because of more Tx RF chains, power supply modules and so on; the size, heat generation and power consumption will also increase dramatically if more than 2 power supply modules work at the same time; more Tx RF chains also increase the number of PLLs (phase locked loops) and LOs (local oscillators) which cause intermodulation interference and degrade the downlink performance for some band combination; and, some Tx RF resources may be underutilized due to power limitation or restrictions of less available UL slots on TDD band. A high percentage of smartphones is expected to remain so in years to come. This makes it very difficult for networks to fully exploit all of available uplink resources/bands, and for smartphones to increase their uplink data rates.

Enhancements for operation with more than 4 Tx antenna may be considered targeting devices such as CPEs or IoT devices without size and cost constraints. Enhancements for frequency-selective precoding may be considered to provide most gains when the transmission includes 4 MIMO layers, so, such gains would not be applicable for 2Tx smartphones. Enhancements for mTRP (multi Transmit Receive Point) uplink are in principle applicable to all device types, and provide gains mostly for cell-edge performance in macrocell mTRP deployments, however, uplink performance may be improved for smartphones not in coverage-limited conditions.

Many operators have deployed or plan to deploy NR on more than two frequency bands with different bandwidths, TDD/FDD duplex, and DL/UL configurations. In order to boost the uplink throughput and capacity for widely applicable scenarios, it is necessary to efficiently utilize all uplink resources in multi-carrier scenarios (>2 bands) where most devices are smartphones with a limited number of Tx antennas (e.g., 2Tx). Therefore, it is important to enable 2Tx switching dynamically among more than 2 UL bands.

In existing technologies, the UL capabilities of band configuration and concurrent transmission are strictly coupled. Limited by the protocol designs, UEs with 2Tx can be configured with 2 UL bands, thus 2Tx switching can be performed across 2 configured UL bands. For selecting/switching carriers among more than 2 bands, semi-statical RRC cell reconfiguration can be used. UL Tx switching between two configured bands for 2Tx UE was introduced to improve the UL data rate by allowing the 2Tx to be used for UL MIMO on any one of the two bands in a switching manner. For uplink, the network needs to configure serving cell(s) to comply with UE uplink capabilities derived from the FeatureSetCombination requirement, regardless the status of the serving cell(s), e.g., activated or deactivated. In other words, UE uplink capabilities, such as band configuration, activation and concurrent transmission, are strictly coupled in existing technology, e.g., the maximum number of configured bands, the maximum number of activated bands and the maximum number of uplink transmitting bands for PUSCH are equal to each other. The maximum number of PUSCH transmitting bands depends on the number of concurrent Tx RF chains equipped on the UE. Therefore, limited by protocol designs, 2Tx UEs can be configured with at most 2 UL bands simultaneously, with/without Tx switching, which causes that activation/deactivation can be enabled on the 2 configured UL bands. 2Tx UEs can select or switch carriers among more than 2 UL bands by RRC-based cell(s) reconfiguration which requires much longer latency.

In existing technology, switching carriers among more than 2 UL bands is through RRC-based cell(s) reconfiguration which requires long latency, e.g., about 50 ms (Note: fast cell activation/deactivation can be within 2 configured UL bands). Dynamic UL 2Tx switching among more than 2 UL bands can enable much faster carrier switching which requires much shorter latency, e.g., symbol-level delay similar to SRS carrier switching.

It is desirable that the UL capabilities of band configuration and concurrent transmission are decoupled, e.g., maximum number of configured bands>maximum number of simultaneously transmitting bands. With this, UEs with 2Tx can be configured with more than 2 UL bands, thus UEs with 2Tx can dynamically perform Tx switching across more than 2 configured UL bands, e.g., 4 UL bands. This enables flexible spectrum access.

Dynamic 2Tx switching among more than 2 bands may be based on the traffic, TDD D/U (downlink symbols/uplink symbols) configuration, bandwidth, and channel condition of each band. Dynamic 2Tx switching among more than 2 bands can lead to higher UL data rate, higher system spectrum utilization and higher UL capacity for latency-bounded traffic thanks to efficient utilization of TDD UL slots, better adaptation to channel conditions, and higher trunking efficiency.

To compare RF complexity of 2Tx switching on more than 2 UL bands, while Tx switching requires some switch, the comparison may be with 3Tx or 4Tx devices, i.e. devices supporting simultaneous transmission of 3UL or 4UL. The RF for these devices is much more complex than 2Tx with Tx switching. The main difference comes from the required number of power supplies and Tx RF chains (just 2 power supplies and Tx RF chain needed for 2 simultaneous uplinks).

For 5G evolution (in Release 18), flexible spectrum access (FSA) as a flexible spectrum utilization mechanism for 2Tx or 3Tx UE is an important direction to improve the uplink user perceived throughput and network throughput. For example, UE capabilities of configuration, activation and simultaneous transmission may be decoupled. Through this way, a UE can be configured with and activated on more than two bands while utilizing one or two of those bands for concurrent PUSCH transmission with 2 concurrent Tx RF chains. Accordingly, FSA provides a mechanism for dynamically selecting a subset of configured carriers and correspondingly switch Tx for transmission based on the traffic, TDD D/U configuration, bandwidth, and channel condition of each band. In addition, UE devices capable of 2Tx switching among more than 2 UL bands have much less complexity and cost than UE devices capable of simultaneously transmission on more than 2 UL bands (e.g., 3Tx or 4Tx UEs), whose main differences come from the number of power supplies.

By supporting dynamic UL Tx switching among more than 2 bands, FSA can lead to higher UL data rate, higher system spectrum utilization and higher UL capacity for latency-bounded traffic.

Dynamic UL Tx switching among more than 2 bands enables efficient utilization of TDD UL slots. Network can dynamically schedule the UE on the bands with wider bandwidth, and/or with most unscheduled RBs in a given slot. For example, for a given slot, when one of the active TDD bands/cells is downlink (D), UE can be switched to another TDD band which is uplink (U) according to the TDD configurations, being able to provide higher UL data rate with wider bandwidth, and the UE can be switched back to the TDD band when uplink slot is available on the band. As a result, FSA can achieve higher UL data rate due to more UL available resources.

Dynamic UL Tx switching among more than 2 bands enables better adaptation to channel conditions. Network can schedule the UE on the bands with better channel conditions. Compared with legacy mechanism, more UL bands are available for better channel adaptation. For example, for cell-edge users, selecting the best UL carriers and RBs from more UL spectrum enabled by FSA will lead to better uplink coverage and higher UL system efficiency.

Dynamic UL Tx switching among more than 2 bands enables higher trunking efficiency. Emerging applications such as virtual reality and augmented reality, impose strict latency (millisecond-level) and reliability requirements. FSA can alleviate the transmission timeouts issue and thus offer a considerable performance improvement for these applications thanks to TTI-level carrier switching and fast system load balancing. Specifically, considering the traffic arrives randomly, if a frequency band is congested with user traffic, FSA can dynamically allocate a part of the traffic load to another frequency band to use the unoccupied resources as much as possible.

In existing technology, a UE may be semi-statically configured with two carriers from two frequency bands for UL Tx switching. For example, UE may receive a higher layer signaling (e.g., RRC message) that semi-statically configures two carriers with two frequency bands for UL Tx switching. It may take a long time (e.g., tens of milliseconds) to configures, e.g., the higher layer signaling, two carriers with two frequency bands for UL Tx switching. For enabling dynamic UL Tx switching across M (e.g., M>2) frequency bands, the UE supports M Tx antennas/chains (which causes high cost and high power consumption). For enabling dynamic UL Tx switching across M (e.g., M>2) frequency bands, a lower layer signaling (e.g., PDCCH (e.g., DCI) in a PHY layer and/or an MAC CE in a MAC layer) mechanism may be incorporated into UL Tx switching, e.g., to help the 2Tx UE dynamically use one or more UL carriers with one or more bands switched among a plurality of bands (e.g., M bands). Based on the existing technology, there is a gap to enable this feature for the 2Tx UE. For example, the existing UL Tx switching technology is not scalable to support more than 2 frequency bands.

For example, if switching between any two bands out of M (M>2) configured bands is allowed, new Tx switching scenarios might emerge (e.g., both Tx switching, and/or switching either of the 2Tx between same two bands), which are not supported by the current standard and/or technology. Some of these new Tx switching scenarios may not be needed and/or may not be essential towards the UL capacity gain in a practical deployment.

Figure 24:
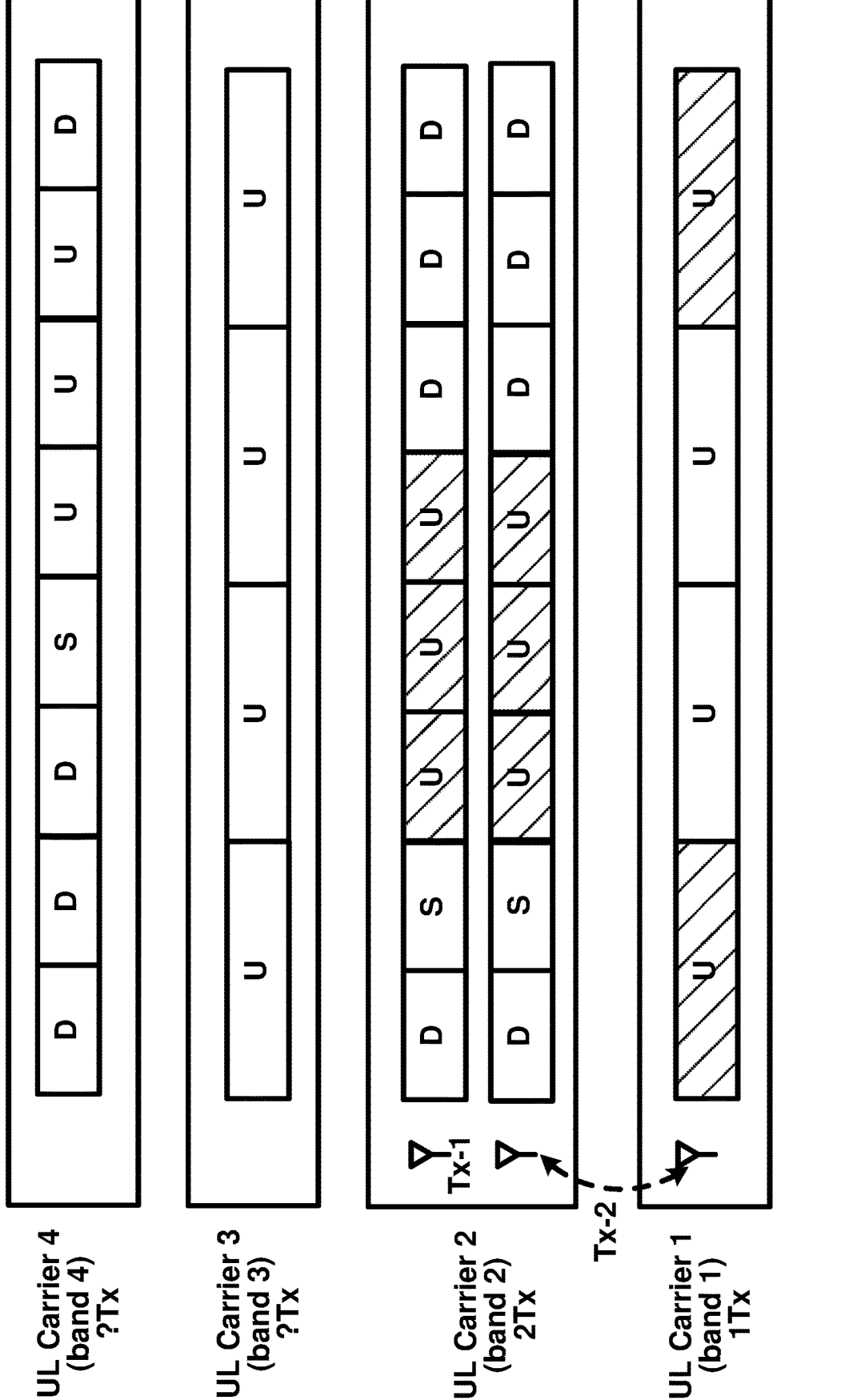
FIG. 24 illustrates an example of UL Tx switching for a 2Tx UE, according to some embodiments.

FIG. 24 shows an example of UL Tx switching for a 2Tx UE. As shown in the figure, based on the existing technology, the UE may be configured with carrier 1 in band 1 and carrier 2 in band 2, e.g., carrier 1 capable of 1Tx antenna and carrier 2 capable of 2Tx antennas. UE may use a first Tx (e.g., Tx-1 in the figure) for uplink transmissions via carrier 2, and use a second Tx (e.g., Tx-2 in the figure) for uplink transmissions via carrier 1 and carrier 2 based on UL Tx switching. When the UE is configured with more than 2 bands, e.g., carrier 3 in band 3 and/or carrier 4 in band 4, then depending on whether carrier 3 and carrier 4 are configured to support dual stream UL transmissions or not (e.g., capable of 1Tx antenna or 2Tx antennas), different possibilities may happen.

Figure 25:
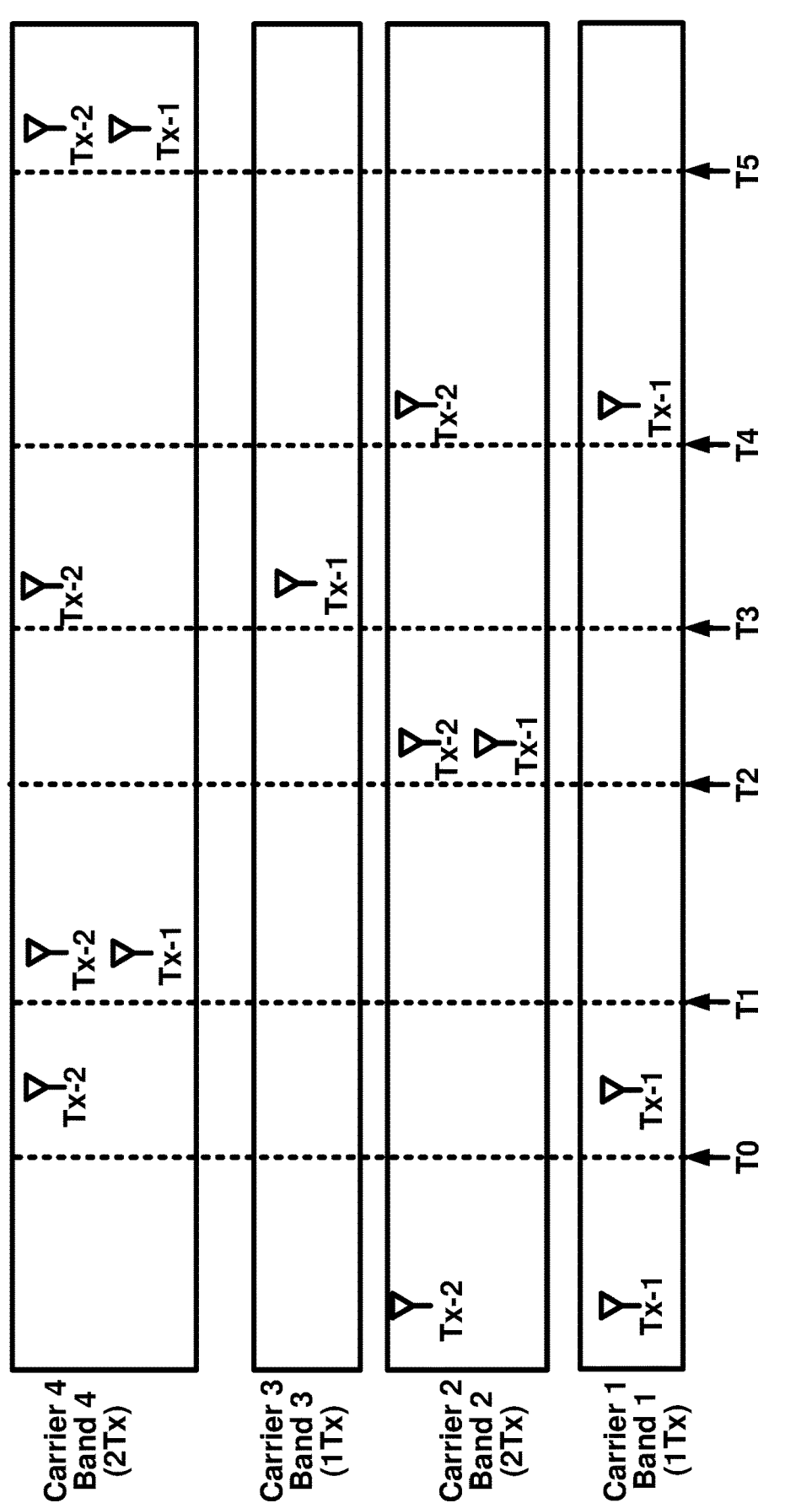
FIG. 25 illustrates an example of UL Tx switching for a 2Tx UE across more than 2 bands, according to some embodiments.

FIG. 25 shows an example of UL Tx switching for a 2Tx UE across more than 2 bands. In this example, carrier 1 and carrier 3 are configured as capable of 1Tx antennas (e.g., supporting single layer transmissions), and carrier 2 and carrier 4 are configured as capable of 2Tx antennas (e.g., supporting one-layer and two-layer transmissions). As shown in the figure, if no restrictions are applied, then the UE may switch (move/retune/reconfigure) either and/or both Tx chains/antennas among M=4 bands. For example, at time T2 a grant is received for carrier 2, which requires the UE to switch both Tx-1 and Tx-2 from band 4 to band 2. This is a new Tx switching scenario. For example, at time T3 a first grant is received for carrier 3 and a second grant is received for carrier 4, which requires the UE to switch both Tx chains: Tx-1 from band 2 to band 3, and Tx-2 from band 2 to band 4. In another example, the UE may switch Tx-2 from band 2 to band 3, and Tx-1 from band 2 to band 4. Depending on which Tx is switched from which band to which band, the resulting switching gap and thus, uplink transmissions might be different. Similar scenario happens at T4. For example, at time T5, a grant is received for carrier 4, which requires the UE to switch both Tx chains: Tx-1 from band 1 to band 4, and Tx-2 from band 2 to band 4. In this scenario, switching of each Tx chain may require different time, resulting in different switching gaps. It is essential for the network to know the resulting switching gap to process the received UL transmission. This information also helps the network to schedule uplink transmissions more efficiently across the configured UL carriers.

Towards a manageable and scalable dynamic multi-carrier UL operation in practical scenarios, some necessary restriction might be needed to avoid overcomplicated design without visible gains. For example, it may not be necessary to support all possible can combinations for UL Tx switching among the configured bands and/or carriers. For example, there may be no motivation to support every two simultaneous bands from/over four configured bands, that results in (4 choose 2)=6 different states.

Additionally, some restriction in UL Tx switching may be needed with respect to the new Tx switching scenarios. For example, whether both Tx chains may be switched simultaneously, and/or whether at least one of them will not be switched (e.g., fixed for using a certain carrier)? For example, in some scenarios, the resulting UL transmissions may be different depending on which Tx chain is switched, and thus, some restriction may be needed to avoid uncertainty and/or overcomplicated design. For example, the network may not be able to control the internal processes of all wireless devices. In these scenarios, some restrictions may be helpful.

For example, in the existing technology, a single switching period/gap is reported and used for a pair of bands, comprising a single (e.g., the same) Tx switching between the two bands. If switching between any two bands out of M (M>2) configured bands is allowed, new Tx switching scenarios might emerge (e.g., both Tx switching, and/or switching either of the 2Tx between same two bands), which are not supported by the current standard. The new Tx switching scenarios may result in new/different switching periods, e.g., depending on the UE's RF hardware of the two Tx chains. For example, if the Tx switching is left to UE's implementation, same carrier switching may result in different Tx switching (e.g., based on UE implementation), and thus, different switching gaps, which may impact the resulting UL transmissions due to puncturing.

It is essential, for successful reception of the UL transmissions at the network side, to address the new Tx switching scenarios such that the UE and the network have a common understanding of the corresponding switching period in each scenario. This information will enable the network to better schedule UL transmissions across the M configured bands.

Additionally, if UE's implementation randomly switches either of the Tx channels and RF chains and antenna connectors on a TTI level based on the scheduling commands, a UE power consumption of the UE will be increased. It might be desirable to restrict the dynamic Tx switching scenarios and define a UE behavior with respect to the new ones in order to enable the switching Tx determination and reduce the power consumption.

Embodiments propose one or more dynamic Tx switching operations such that the network can control/predict the UE's UL Tx switching possibilities (and thus enhance the UL processing/scheduling), as well as RRC signaling that enable the new switching scenarios within the proposed operations. Embodiments enable the UE to determine how to map each of the two Tx chains/antennas to the M (M>2) UL carriers/bands, and which Tx to use for which band in the new emerging switching scenarios. The Tx chain to use/ switch per transmission may not be explicitly indicated by the network (and may be left to UE's implementation). Example embodiment(s) may provide some guideline/ framework that help the network and the UE have a mutual understanding of the Tx switching gap in the new switching scenarios. For example, the UE may implicitly determine the Tx chain to switch/use based on the embodiments.

Based on some embodiments, the network may configure multiple (e.g., two or more) pairs of carriers/bands (i.e., 2) out of the M carriers/bands, for the dynamic UL Tx switching operations. For example, the network may indicate to the UE to use one pair of carriers at a time for dynamic UL Tx switching, e.g., based on activation of the carrier pair. The UE may change/switch the active carrier pair, e.g., deactivate a first carrier pair and activate a second carrier pair, based on some (L1/L2) signaling and/or timer and/or indication. The pairing mechanism may be used to restrict the Tx switching scenarios and the band combinations. For example, the network may have the chance to configure pairs of carriers/bands for which Tx switching brings visible gain. The pairing mechanism may be scalable and enable the network and the UE to reuse the existing Tx switching framework based on a pair of (active) carriers/bands, without requiring cell reconfiguration.

Based on some embodiments, the network may configure an anchor carrier (e.g., capable of 2Tx antennas) and multiple switched carriers across the M−1 bands. The mechanism based on the anchor carrier in the example embodiments may enable the UE to extend the existing Tx switching framework to switch a single (e.g., same) Tx chain among M (M>2) carriers/bands, by restricting the Tx switching scenarios. The network may indicate to the UE the anchor carrier at a time for dynamic UL Tx switching, e.g., based on activation of the carrier pair. The UE may change/switch the anchor carrier, e.g., deactivate a first anchor carrier and activate a second anchor carrier, based on some (L1/L2) signaling and/or timer and/or indication. The anchor mechanism may be scalable and enable more dynamic exploitation of configured bands in a systematic approach.

Some embodiments may apply to UEs configured with more than two uplink carriers from more than 2 frequency bands. Some embodiments may apply to UEs that have more than 2Tx, e.g., 3Tx and/or 4Tx. Some embodiments may apply to UEs that are configured with UL carriers from a number of frequency bands that's beyond their UL Tx capability.

A 2Tx UE may be a UE that has/comprises two UL Tx channels/chains/antennas (not more). The 2Tx UE may be capable of two UL Tx antenna connectors.

A 2Tx UE may not be capable of simultaneous switching of both Tx chains/antennas. For example, it may take a considerably long time/period for the UE to switch both Tx chains/antennas at the same time. The embodiments may enable the UE to perform UL Tx switching without requiring unnecessary switching of both Tx chains/antennas simultaneously. For example, based on some embodiments, the UE may not switch 2Tx based on a scheduling command, but maybe based on some specific switching command (e.g., via MAC-CE or a specific DCI format).

A wireless device may receive one or more messages from at least one base station. The one or more messages may comprise one or more RRC messages (e.g., RRCSetup and/or RRCReconfiguration) and/or SIBs (e.g., SIB1). The one or more messages may configure one or more serving cells for the UE (e.g., PCell, PScell, SPcell, and/or SCell). For example, the one or more messages may comprise information elements and/or configuration parameters indicating the one or more serving cells.

The one or more serving cells may be associated with same TAG (timing advance group). The one or more serving cells may be associated with different TAGs. The one or more serving cells may be associated with same cell group (e.g., master cell group or secondary cell group). The one or more serving cells may be associated with different cell groups.

A serving cell may comprise one or more uplink carriers, e.g., (normal) uplink (UL or NUL) carrier, and/or supplementary uplink (SUL) carrier. In an example, the UE may receive one or more messages comprising configuration parameters indicating a plurality of uplink carriers for the UE. The plurality of UL carriers may be of/associated with a same serving cell (e.g., NUL and SUL) or different serving cells (e.g., UL CA and/or NR-DC and/or EN-DC and/or NE-DC).

In an example, the UE may be configured with multiple bands in the uplink. For example, the plurality of UL carriers may be from different frequency bands. For example, each UL carrier of the plurality of UL carriers may belong to a different band. For example, a first UL carrier may belong to a first band, a second UL carrier may belong to a second band, a third UL carrier may belong to a third band, and a fourth UL carrier (if any) may belong to a fourth band, and so on. For example, the UE may be configured with at least one SUL carrier. For example, the UE may be configured with multi-carrier inter-band carrier aggregation. For example, the UE may be configured with multi-carrier dual connectivity.

The UE may have/comprise two UL Tx chains/antennas. An UL Tx chain/antenna of the UE may not be able to support UL transmission simultaneously at two (or more) different frequency bands (e.g., with two or more different center frequencies). The UE may reconfigure/retune a Tx antenna/RF chain to support UL transmission simultaneously at two (or more) different frequency bands. For example, the UE may move/switch the UL Tx chain/antenna from a first UL carrier in a first band to a second UL carrier in a second band.

In an example, the UE may be configured with a plurality of uplink carriers in a same frequency band (e.g., intra-band CA). An UL Tx chain/antenna of the UE may be able to support UL transmission simultaneously in a same frequency band (e.g., with a same center frequency). The UE may not need to reconfigure/retune a Tx antenna/RF chain to support UL transmission simultaneously via carriers in a same frequency band. For example, the UE may not move/switch the UL Tx chain/antenna between bands, since a same UL Tx configuration can support simultaneous UL transmissions via different carriers in a same band (e.g., subject to power restrictions).

The UE (e.g., with a 2Tx capability, having/comprising two Tx chains/antennas) may be configured with three or more UL carriers (e.g., M UL carriers, M>2) from different frequency bands (e.g., M bands, M>2). For example, a first UL carrier may belong to a first band, a second UL carrier may belong to a second band, a third UL carrier may belong to a third band, and a fourth UL carrier (if any) may belong to a fourth band, and so on.

The UE may be configured with (dynamic) UL Tx switching among the configured UL carriers. For example, the one or more messages may indicate to the UE that UL Tx switching is configured/enabled/used for the M (M>2) UL carriers (e.g., via uplinkTxSwitching per UL carrier).

The UE may be configured with one or more UL carrier "pairs" (e.g., pairs of UL carriers) out of/from the M configured UL carriers. The UE may be configured with two or more UL carrier pairs for dynamic UL Tx switching. The UE may receive one or more messages (e.g., RRC messages and/or SIB) indicating UL carrier pairs, each UL carrier pair comprising two UL carrier from the configured UL carriers.

The one or more messages may comprise information elements and/or configuration parameters indicating pairs of UL carriers, from the plurality of configured UL carriers.

An UL carrier pair (e.g., UL carrier couple, or UL carrier twin, or a set of two UL carriers) may comprise two UL carriers. The two uplink carriers of a carrier pair may be configured UL carriers. For example, a first UL carrier pair may comprise a first UL carrier and a second UL carrier. For example, the one or more messages may indicate One or more serving cells associated with the two UL carriers of a carrier pair may or may not be activated (e.g., via one or more cell activation mechanism). For example, at least one of the one or more serving cells may be a dormant cell.

Figure 26:
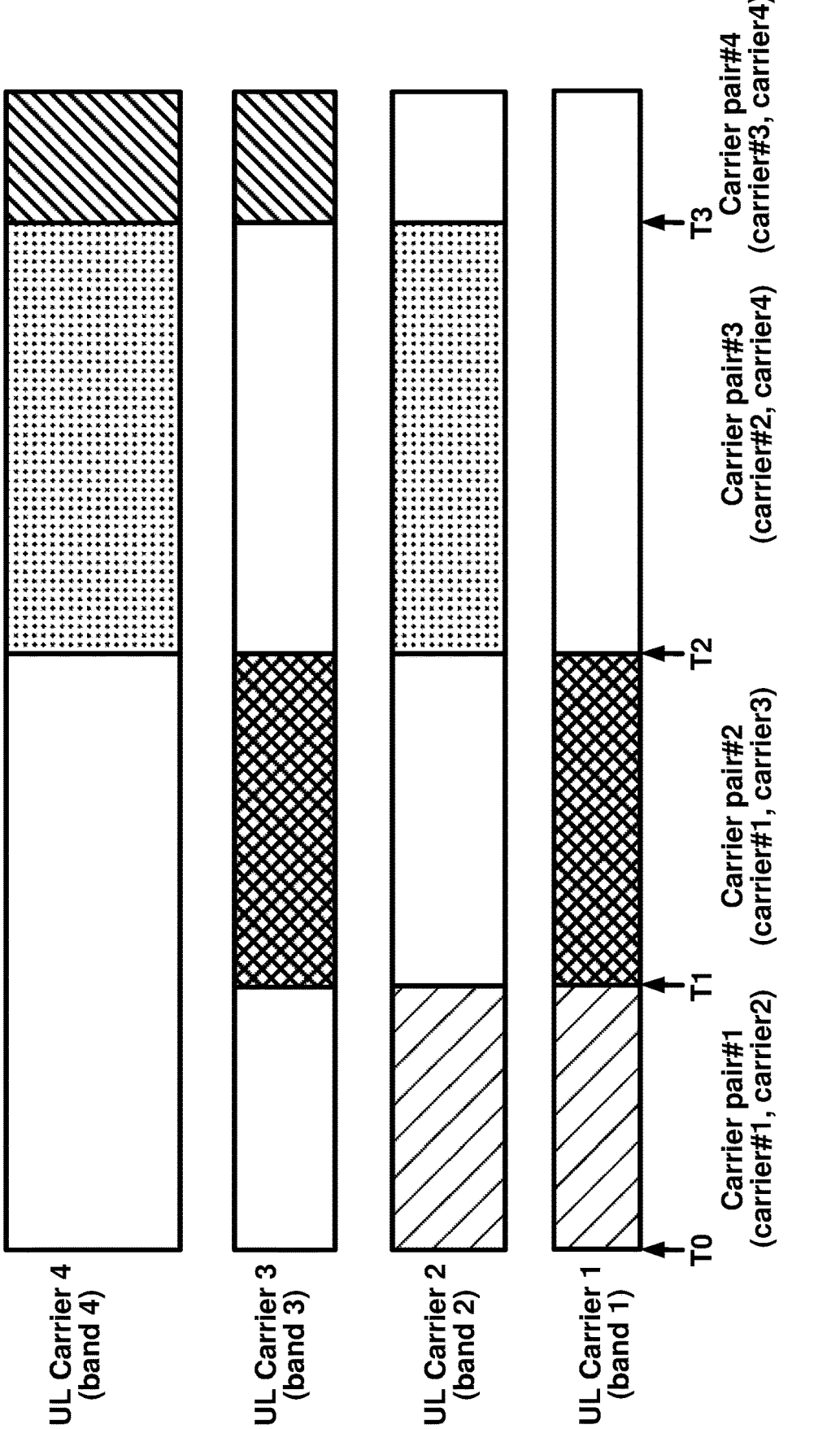
FIG. 26 illustrates an example of UL carrier pairs configured for dynamic UL Tx switching, according to some embodiments.

FIG. 26 shows an example of UL carrier pairs configured for dynamic UL Tx switching. As shown in FIG. 26, a UE (e.g., 2Tx UE) may be configured with four UL carriers on four different bands. The UE may be configured with four UL carrier pairs. For example, UL carrier pair #1, comprising UL carrier 1 and UL carrier 2. For example, UL carrier pair #2, comprising UL carrier 1 and UL carrier 3. UL carrier pair #3, comprising UL carrier 2 and UL carrier 4. UL carrier pair #4, comprising UL carrier 3 and UL carrier 4.

Note that in FIG. 26, (4 choose 2)=6 carrier pairs are possible to be configured, but the network restricts the combinations by configuring 4 pairs (2 pair are left out and not configured). The 4 configured UL carrier pairs may be configured based on the allowable/desirable carrier switching scenarios.

At a given time, the UE may use one UL carrier pair, e.g., based on UL Tx switching. For example, as shown in FIG. 26, the UE may use UL carrier pair #1 during (T0, T1), UL carrier pair #2 during (T1, T2), UL carrier pair #3 during (T2, T3), and UL carrier pair #4 after T3. The UE may switch UL Tx chains/antennas between the two UL carriers of a pair (the pair in use, or active pair) during the associated time interval. The UE may switch UL Tx chains/antennas between the two UL carriers of a pair based on received scheduling commands. For example, the UE may switch UL Tx chains/antennas between UL carrier 1 and UL carrier 2 during (T0, T1); between UL carrier 1 and UL carrier 3 during (T1, T2); and so on.

In an example, one or more carrier pairs may have an UL carrier in common. These pairs may be referred to as "common pairs". For example, in FIG. 26, UL carrier pair #1 and UL carrier pair #2 have UL carrier 1 in common.

In an example, each UL carrier may be exclusively configured in one UL carrier pair. For example, UL carrier pairs may not have any UL carrier in common. For example, the UE may not expect to receive configuration parameters of an UL carrier indicating that the UL carrier belongs to two or more UL carrier pairs.

In an example, a "carrier pair" may be referred to as "band pair", based on a 1 to 1 mapping of the UL carriers and the bands.

In an example, one of the two UL carriers in/of an UL carrier pair may be capable of 1Tx (support 1Tx/one Tx antenna connector), and the other UL carrier in/of the UL carrier pair may be capable of 2Tx (support 2Tx/two Tx antenna connectors). For example, the UE may transmit one-layer UL transmissions via a first UL carrier of an UL carrier pair that is capable of 1Tx. For example, the UE may transmit one-layer UL transmissions and/or two-layer UL transmissions via a second UL carrier of the UL carrier pair that is capable of 2Tx.

Figure 27:
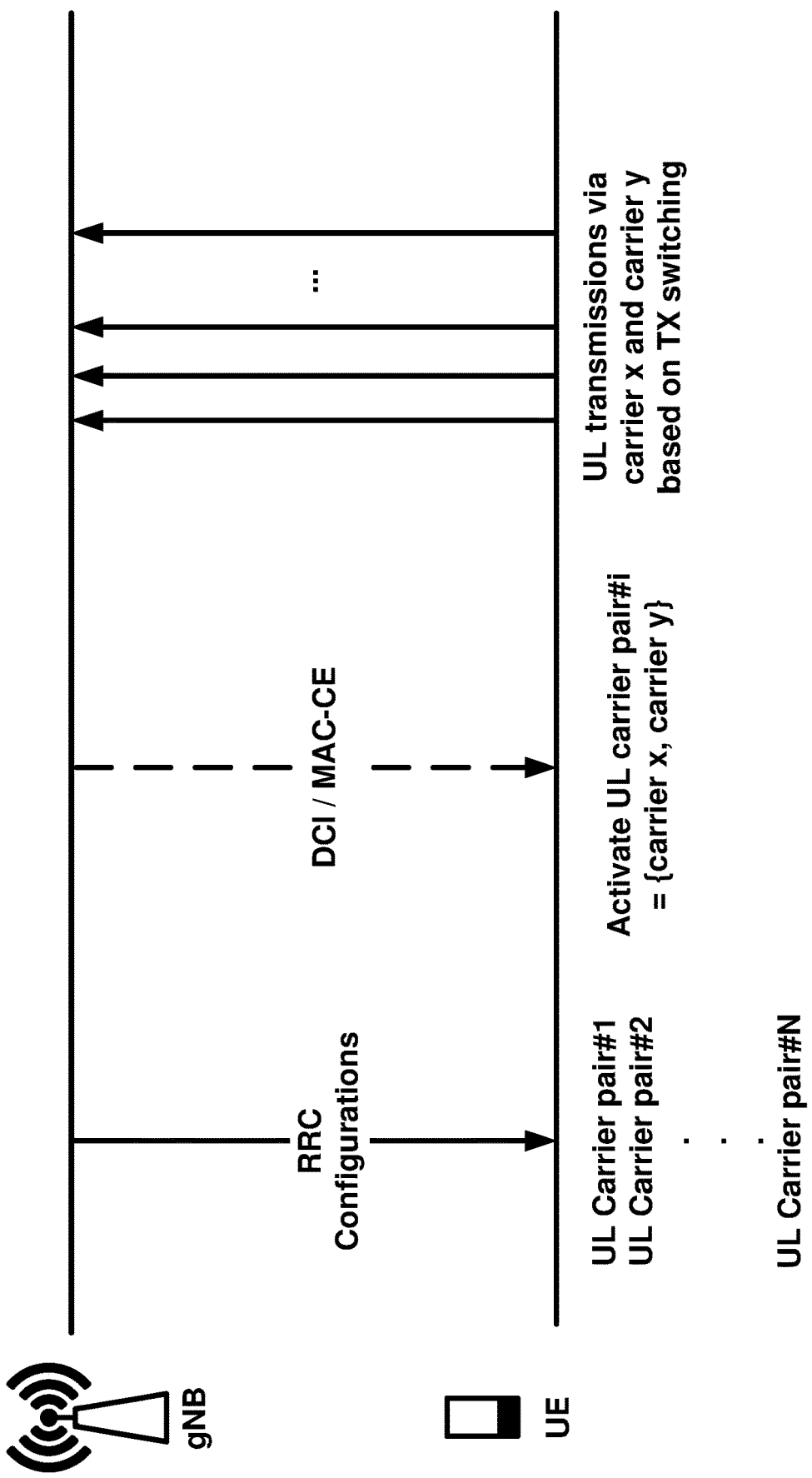
FIG. 27 illustrates an example of signaling between a UE and a base station for configuration of carrier pairs, according to some embodiments.

FIG. 27 shows an example of signaling between a UE and a base station for configuration of carrier pairs. The UE may be configured with M (M>2) UL carriers. As shown in the figure, the UE may receive RRC configurations indicating UL carrier pairs (e.g., N UL carrier pairs, N>1): UL carrier pair #0, UL carrier pair #1, . . . , UL carrier pair #N−1.

In an embodiment, each UL carrier may be configured with an UL carrier index, e.g., UplinkCarrier-Id={0, 1, . . . , M−1}. For example, the RRC configurations may comprise a parameter indicating the UL carrier index for each configured UL carrier. The RRC configurations may comprise an information element, e.g., for dynamic UL Tx switching, indicating the N UL carrier pairs. For example, the RRC configurations may comprise a field indicating a first UL carrier pair, with a first index (e.g., UL UplinkCarrierPair-Id=i, i=0, 1, . . . , N−1) comprising a first UL carrier (e.g., UL carrier #x, x=0, 1, . . . , M−1) and a second UL carrier (e.g., UL carrier #y, y=0, 1, . . . , M−1, x≠y).

In an embodiment, the RRC configurations may indicates, for/in an UL carrier pair, each UL carrier supports 1TX or 2TX. For example, for UL carrier pair #i={UL carrier #x, UL carrier #y}, the RRC configuration parameter(s) may indicate that: UL carrier #x is "carrier1", e.g., capable of 1Tx/one Tx antenna connector; and UL carrier #y is "carrier2", e.g., capable of 2Tx/two Tx antenna connectors. In an example, the RRC message(s) may comprise an information field for each UL carrier pair, that explicitly indicates the Tx capability of each configured UL carrier (e.g., 1Tx or 2Tx).

In an example, the UE may determine the Tx capability of each UL carrier in an UL carrier pair. For example, the UE may receive configuration parameters indicating UL carrier pair #i={UL carrier #x, UL carrier #y}. The configuration parameters may implicitly indicate the Tx capability of each UL carrier in the UL carrier pair, e.g., based on a rule. The rule may be based on an order of the UL carrier in the RRC field that configures/indicates the corresponding UL carrier pair. For example, the UE may determine that a first (e.g., left) UL carrier is capable of 1Tx (e.g., carrier #x is "carrier1" of the pair), and that a second (e.g., right) UL carrier is capable of 2Tx (e.g., carrier #y is "carrier2" of the pair), or vice versa. In an example, the rule may be based on an index of the UL carriers in the UL carrier pair. For example, the UE may determine that an UL carrier with a smaller carrier index is capable of 1Tx, and the other UL carrier with larger carrier index is capable of 2Tx, or vice versa.

In an example, a Tx capability of an UL carrier may be the same in multiple UL carrier pairs that it belongs to (e.g., carrier-specific parameter). For example, UL carrier #x may be capable of 1Tx (or 2Tx), irrespective of the UL carrier pair. For example, if a first UL carrier pair and a second UL carrier pair comprise the UL carrier #x, the Tx capability of UL carrier #x is the same in both UL carrier pairs.

In an example, a Tx capability of an UL carrier may be different in multiple UL carrier pairs that it belongs to (e.g., carrier pair-specific parameter). For example, UL carrier #x may be capable of 1Tx (or 2Tx) depending on the UL carrier pair configuration. For example, if a first UL carrier pair and a second UL carrier pair comprise the UL carrier #x, the Tx capability of UL carrier #x in the first UL carrier pair may be 1Tx and in the second UL carrier pair may be 2Tx.

In an example, for each configured UL carrier, a field/parameter may indicate which UL carrier pair(s) this UL carrier belongs to. For example, a bitmap with a maximum size of N=(M choose 2), each bit indicating whether the corresponding pair is defined using the configured UL carrier, e.g., bit #0=0 means UL carrier pair #0 does not comprise this UL carrier, bit #1=0 means UL carrier pair #1 does not comprise this UL carrier, bit #2=1 means UL carrier pair #2 comprises this UL carrier, and so on. In an example, for each carrier, there are maximum of M−1 pairs for UL Tx switching, e.g., the sum of the bitmap may be less than or equal to M−1. In an example, for each carrier, there is 1 pair for UL Tx switching, e.g., the sum of the bitmap may be equal to 1.

In an embodiment, a 1-to-1 mapping may be defined between configured UL carriers. For example, the RRC may indicate whether each UL carrier is capable of 1Tx or 2Tx. The RRC may indicate a 1-to-1 mapping between 1Tx UL carriers and 2Tx UL carriers. For example, each 1-to-1 mapping may indicate an UL carrier pair. In an example, the mapping may be explicitly indicated by RRC field/parameter. In an example, the mapping may be implicit, e.g., based on a common configuration between the two UL carriers, and/or based on UL carrier index of the UL carriers. For example, the RRC may tag each 1Tx UL carrier with an index from a first set, and each 2Tx UL carrier with an index from a second set, and the mapping may be defined between indexes of the first set and indexes of the second set. For example, {UL carrier #1, UL carrier #3} may be configured as 1Tx carriers, and may be tagged with index{1,2}; and {UL carrier #2, UL carrier #4} may be configured as 2Tx carriers, and may be tagged with index{1,2}. The UE may determine the first UL carrier pair as {UL carrier #1, UL carrier #2}, and the second UL carrier pair as {UL carrier #3, UL carrier #4} (e.g., index 1:1 and index 2:2).

In an example, if a 2Tx carrier is switched, the corresponding 1Tx carrier is also switched based on the configuration of the UL carrier pair.

As shown in FIG. 27, the UE may receive an indication of activation of an UL carrier pair from the base station. For example, the UE may receive a DCI and/or MAC-CE (e.g., L1/L2 signaling via MAC-CE or a specific DCI format indicating a switching/activation command), indicating activation of an UL carrier pair. For example, a downlink signal may indicate that UL carrier pair #i={UL carrier #x, UL carrier #y} is activated.

When an UL carrier pair is activated, the UE may use the two uplink carriers of the activated UL carrier pair for UL transmissions, e.g., based on UL Tx switching. For example, the UEs UL transmissions (e.g., except SRS) may be limited to the two UL carriers of the activated UL carrier pair (e.g., UL carrier #x and UL carrier #y). In an example, the UE may not expect to receive scheduling commands (e.g., UL grants for PUSCH and/or PUCCH and/or PRACH and/or one or more reference signals) for an UL carrier outside/not belonging to the active UL carrier pair. In an example, the UE may not monitor the coresets/search spaces associated with UL carriers that do not belong to the active UL carrier pair. In an example, the UE may stop semi-static UL transmissions (e.g., configured grant type 1 and/or configured grant type 2) on UL carriers that do not belong to the active UL carrier pair (e.g., except for SRS).

At a given time, a single UL carrier pair may be activated. For example, UE may activate a first UL carrier pair, e.g., in response to indication of activation of the first UL carrier pair. In an example, the RRC configuration may comprise a field/parameter indicating a default/initial/primary UL carrier pair (E.g., a firstActiveCarrierPair and/or defaultPair and/or initialPair). For example, the default/initial UL carrier pair may be activated upon receiving the RRC configuration, wherein the RRC configuration may indicate that UL Tx switching is configured. For example, the two UL carriers of the first UL carrier pair may be associated with active serving cell(s).

In an example, the UE may receive indication of changing/switching an UL carrier pair, e.g., via a DCI/MAC-CE, upon receiving an indication of UL carrier pair switching, the UE may deactivate the first UL carrier pair (that is active) and activate a second UL carrier pair. For example, the DCI/MAC-CE comprising the UL carrier pair switching command, may indicate the second UL carrier pair. For example, one UL carrier pair, from the N configured carrier pairs, may be active at a given time.

In an example, the UE may determine to activate a default/initial UL carrier pair in response to PCell/PScell activation.

In an example, the UE may determine to activate an UL carrier pair in response to activation of one or more serving cells associated with at least one UL carrier of the UL carrier pair.

In an example, the UE may determine to switch to the default/initial UL carrier pair in response to deactivation of one or more serving cells associated with at least one UL carrier of the active UL carrier pair.

In an example, the UE may determine to switch to the default/initial UL carrier pair in response to expiration of a timer. For example, the RRC message(s) may configure an UL carrier pair switching timer, and/or indicate a duration for the timer. The timer may help to avoid excess UL carrier pair changing when not necessary (e.g., not enough UL grant received based on Tx switching). For example, the timer may be reset in response to receiving a scheduling command (e.g., UL grant) for either of the UL carriers of the active UL carrier pair.

The embodiments enable using L1/L2 and/or automatic determination (e.g., based on timer) for changing a pair of configured UL carriers instead of RRC signaling, and thus significantly reduce the dynamic Tx switching delay. Based on the embodiments, UE can perform dynamic UL Tx switching between the two UL carriers of the active UL carrier pair, using an existing switching framework. For example, UE may switch one Tx between carrier1 and carrier2 in/of the active carrier pair, based on the scheduling commands. RRC signaling may indicate UL Tx switching parameters per UL carrier pair. RRC signaling may indicate which carrier in a carrier pair is capable of 1Tx and which is capable of 2Tx. For example, RRC configuration may indicate, for each configured UL carrier pair, a first UL carrier as carrier1 (e.g., capable of 1Tx) and a second uplink carrier as carrier2 (e.g., capable of 2Tx). The UE may use one Tx chain/antenna for UL transmissions via the second carrier (i.e., carrier2 of the pair), and/or switch another Tx chain/antenna between the first UL carrier and the second UL carrier of the pair. The UE may apply a respective Tx switching gap based on the two UL carriers of the active UL carrier pair, and based on the respective band combination.

When switching UL carrier pairs, to reduce the activation delay, common band switching may be allowed/defined. For example, one of the carriers may be common between the new pair and the old pair (before and after switching). For example, a first carrier of the new pair and a second carrier of the old pair may belong to a same/common frequency band. In an example, the common carrier and/or the carriers associated with the common band may be capable of 1Tx (i.e., "carrier1"). In an example, the common carrier and/or the carriers associated with the common band may be capable of 2Tx (i.e., "carrier2").

Figure 28:
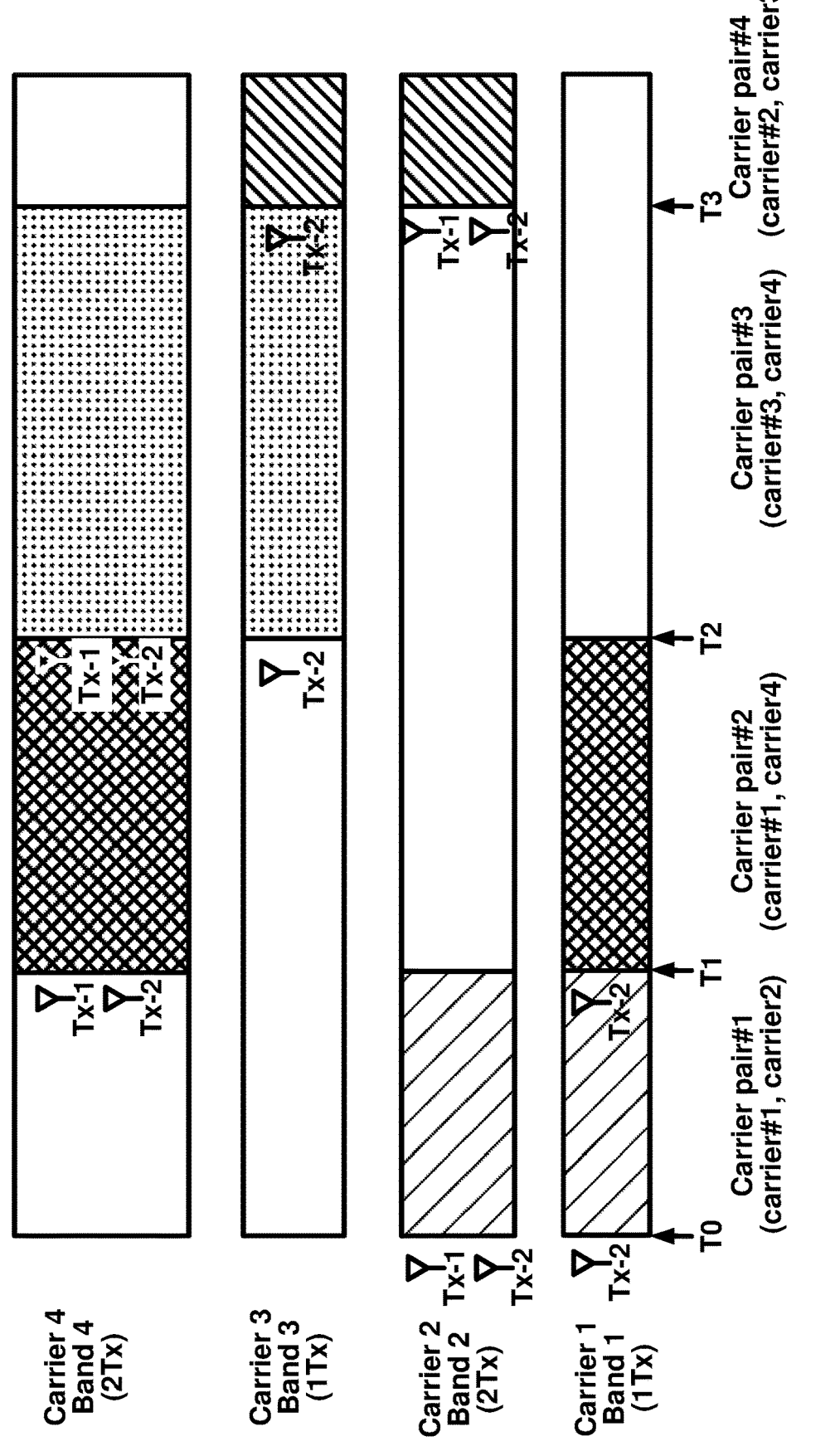
FIG. 28 illustrates an example of UL carrier pairs configured for dynamic UL Tx switching, according to some embodiments.

FIG. 28 shows an example of UL carrier pairs configured for dynamic UL Tx switching. In this example, carrier pair switching based on common band and/or common carrier is illustrated. As shown in the figure, each carrier pair switching involves a single carrier switching, e.g., carrier 2 to carrier 4 at T1 (carrier 1/band 1 is common), and carrier 1 to carrier 3 at T2 (carrier 4/band 4 is common), and so on. The figure suggests how to assign Tx chains/antennas to UL carriers based on the pairing mechanism. As shown in the figure, Tx-1 is used for a 2Tx carrier (a carrier capable of 2 Tx antenna connectors) in a respective UL carrier pair, and Tx-2 (shown in grey) switched between the 1Tx carrier and the 2Tx carrier of the UL carrier pair.

In an embodiment, the wireless device may receive one or more messages comprising configuration parameters indicating a plurality of uplink carriers for the UE. The plurality of UL carriers may be of/associated with a same serving cell (e.g., NUL and SUL) or different serving cells (e.g., UL CA and/or NR-DC and/or EN-DC and/or NE-DC).

In an example, the UE may be configured with multiple bands in the uplink. For example, the plurality of UL carriers may be from different frequency bands. For example, each UL carrier of the plurality of UL carriers may belong to a different band. For example, a first UL carrier may belong to a first band, a second UL carrier may belong to a second band, a third UL carrier may belong to a third band, and a fourth UL carrier (if any) may belong to a fourth band, and so on. For example, the UE may be configured with at least one SUL carrier. For example, the UE may be configured with multi-carrier inter-band carrier aggregation. For example, the UE may be configured with multi-carrier dual connectivity.

The UE may be configured with (dynamic) UL Tx switching among the configured UL carriers. For example, the one or more messages may indicate to the UE that UL Tx switching is configured/enabled/used for the M (M>2) UL carriers (e.g., via uplinkTxSwitching per UL carrier).

The UE may receive one or more messages (e.g., RRC message(s) and/or SIB(s)) indicating one or more "anchor" UL carriers. An anchor UL carrier may be an UL carrier that is capable of two transmit antenna connectors (e.g., 2Tx carrier). The UE (e.g., a 2Tx UE, or a UE that has 2 Tx chains/antennas) may use one (e.g., a first) Tx chain/antenna for the anchor UL carrier. For example, the first Tx chain/ antenna may not be switched between UL carriers in dynamic UL Tx switching. For example, the first Tx chain/ antenna may be fixed/tuned/configured for the anchor UL carrier frequency.

In an embodiment, an anchor UL carrier may be an UL carrier that is capable of one transmit antenna connectors (e.g., 1Tx carrier). The UE (e.g., a 2Tx UE, or a UE that has 2 Tx chains/antennas) may use one (e.g., a first) Tx chain/ antenna for the anchor UL carrier. For example, the first Tx chain/antenna may be switched between UL carriers in dynamic UL Tx switching.

In an example, the first Tx chain may be fixed/tuned/ configured for an UL carrier in the frequency band that the anchor carrier belongs to.

In an example, an "anchor" UL carrier may be referred to as default UL carrier, or active UL carrier, or common UL carrier, or primary UL carrier, etc.

In an example, the anchor UL carrier may be activated. For example, the UE may receive a downlink signal (e.g., RRC and/or DCI and/or MAC-CE signal) indicating that a first UL carrier is activated as the anchor/active/common/ default UL carrier.

The anchor UL carrier may be associated with a set/group of second UL carriers. For example, the one or more messages may comprise configuration parameters that indicate one or more sets/groups of second UL carriers. In an example, a group of second UL carriers may comprise one or more UL carriers that are capable of one transmit antenna connectors (e.g., 1Tx carrier). The UE (e.g., a 2Tx UE, or a UE that has 2 Tx chains/antennas) may use one (e.g., a first) Tx chain/antenna for the anchor UL carrier, and may move/ switch another (e.g., a second) Tx chain/antenna among the group of second UL carriers and/or the anchor UL carrier. For example, the second Tx chain/antenna may be switched based on dynamic Tx switching across the UL carriers, comprising the anchor UL carrier and one or more second UL carriers associated with the anchor UL carrier.

In an embodiment, a group of second UL carriers may comprise one or more UL carriers that are capable of two transmit antenna connectors (e.g., 2Tx carrier). The UE (e.g., a 2Tx UE, or a UE that has 2 Tx chains/antennas) may move/switch two (e.g., a first and a second) Tx chains/ antennas among the group of second UL carriers and/or the anchor UL carrier. For example, the two Tx chains/antennas may be switched based on dynamic Tx switching across the one or more second UL carriers associated with the anchor UL carrier. For example, one of the two (e.g., the first) Tx chains/antennas may be switched based on dynamic Tx switching across the UL carriers, comprising the anchor UL carrier and one or more second UL carriers associated with the anchor UL carrier.

In an example, the one or more second UL carriers, associated with the anchor UL carrier, may be activated (e.g., used for dynamic UL Tx switching) in response to activation of the first/anchor UL carrier. In an example, the anchor UL carrier may be activated. In an example, at least one second UL carrier, of the one or more second UL carriers associated with the first/anchor UL carrier, may be activated. The first/anchor UL carrier and the at least one second UL carrier may be used for dynamic UL Tx switching.

Throughout this disclosure, when two or more UL carriers are used for dynamic UL Tx switching, the UE may move one or more Tx chains/antennas across the two or more UL carriers based on dynamic UL Tx switching. For example, the UE may transmit UL transmissions using the two or more UL carriers based on dynamic UL Tx switching, e.g., based on scheduling commands and/or received UL grants and/or semi-static UL grants. In an example, the dynamic UL Tx switching may be in response to TDD configuration and/or slot formats indicating uplink "U" slots/symbols/ subframes for an UL carrier.

In an example, RRC message(s) may configure one or more sets/groups/lists of UL carriers. For example, a set of UL carriers may comprise an anchor UL carrier and one or more second UL carriers (e.g., switched UL carriers). The UE may determine to activate and/or activate a first set of UL carriers among the one or more sets of UL carriers. For example, the UE may receive an indication of activation of the first set of UL carriers (or first UL carrier set). The UE may use the first set of UL carriers for dynamic UL Tx switching. For example, the UE may transmit UL transmissions using the first set of UL carriers based on dynamic UL Tx switching, e.g., based on scheduling commands and/or received UL grants and/or semi-static UL grants.

In an example, the UE may be configured with multiple anchor UL carriers, e.g., a set/group/list of anchor UL carriers. The set/group/list of anchor UL carriers may comprise UL carrier(s) that are capable of 2Tx antenna connectors. The UE may receive a downlink signal (e.g., an RRC/DCI/MAC-CE, e.g., a MAC-CE or a specific DCI format comprising an activation/switching command) comprising an indication of changing/switching the anchor UL carrier. For example, the UE may determine to switch/ change the anchor UL carrier in response to expiration of a first timer, e.g., a UL Tx switching timer.

For example, the RRC message(s) may indicate a value/ duration for the UL Tx switching timer. A first time scale for first/anchor carrier switching may be greater than a second time scale of the second carrier switching (e.g., based on scheduling commands). This may help reducing the power consumption and delay/gap needed for Tx switching (e.g., 2Tx switching scenarios). The network may manage the time scales using the UL Tx switching timer. For example, the anchor carrier may not change while the UL Tx switching timer is running. For example, the second carrier may change/switch among set of UL carriers while the UL Tx switching timer is running. For example, upon timer expiration, the anchor UL carrier may switch/change among a set/list of anchor UL carriers.

The UE may activate a first anchor UL carrier. The first anchor UL carrier may be associated with a PCell/PScell. The first anchor UL carrier may be associated with a cell with smallest cell index. The first anchor UL carrier may have the smallest UL carrier index among the anchor UL carriers and/or the plurality of configured UL carriers. In an example, the first anchor UL carrier may be capable of one Tx antenna connector. In an example, the first anchor UL carrier may be capable of two Tx antenna connectors.

The UE may switch/change the anchor/active UL carrier from the first anchor UL carrier to a second anchor UL carrier. For example, the UE may deactivate the first anchor UL carrier, and/or activate the second anchor UL carrier. For example, a downlink signal (e.g., RRC/DCI/MAC-CE) may indicate the second anchor UL carrier.

Each anchor UL carrier may be configured with an associated set of second UL carriers. For example, the set of second UL carriers may be capable of one Tx antenna connector. In an example, the set of second UL carriers may be capable of two Tx antenna connectors.

In an example, the UE may activate a first set of second UL carriers associated with the first anchor UL carrier. The UE may switch/change from the first set of second UL carrier to a second set of second UL carriers. For example, the UE may deactivate the first set of second UL carriers, and/or activate the second set of second UL carriers. For example, the second set of second UL carriers may be associated with the second anchor UL carrier. For example, the second anchor UL carrier may be activated.

The UE may switch/change an active anchor UL carrier and/or an active set of UL carriers comprising an anchor UL carrier and a set of second UL carriers associated with the anchor UL carrier. For example, the UE may change/switch from a first anchor UL carrier to a second anchor UL carrier as the active anchor UL carrier. For example, the UE may change/switch from a first set of UL carriers to a second set of UL carriers as the active set of UL carriers. In an example, the switching may be in response to receiving an indication of switching via a downlink signal (e.g., RRC and/or MAC-CE and/or DCI). In an example, the switching may be in response to expiration of a first timer, e.g., a carrier/UL Tx switching timer.

The UE may use an active anchor UL carrier and one or more active second UL carriers associated with the active anchor UL carrier, for transmitting UL transmissions based on dynamic UL Tx switching. The UE may use an active set of UL carriers for transmitting UL transmissions based on dynamic UL Tx switching.

Figure 29:
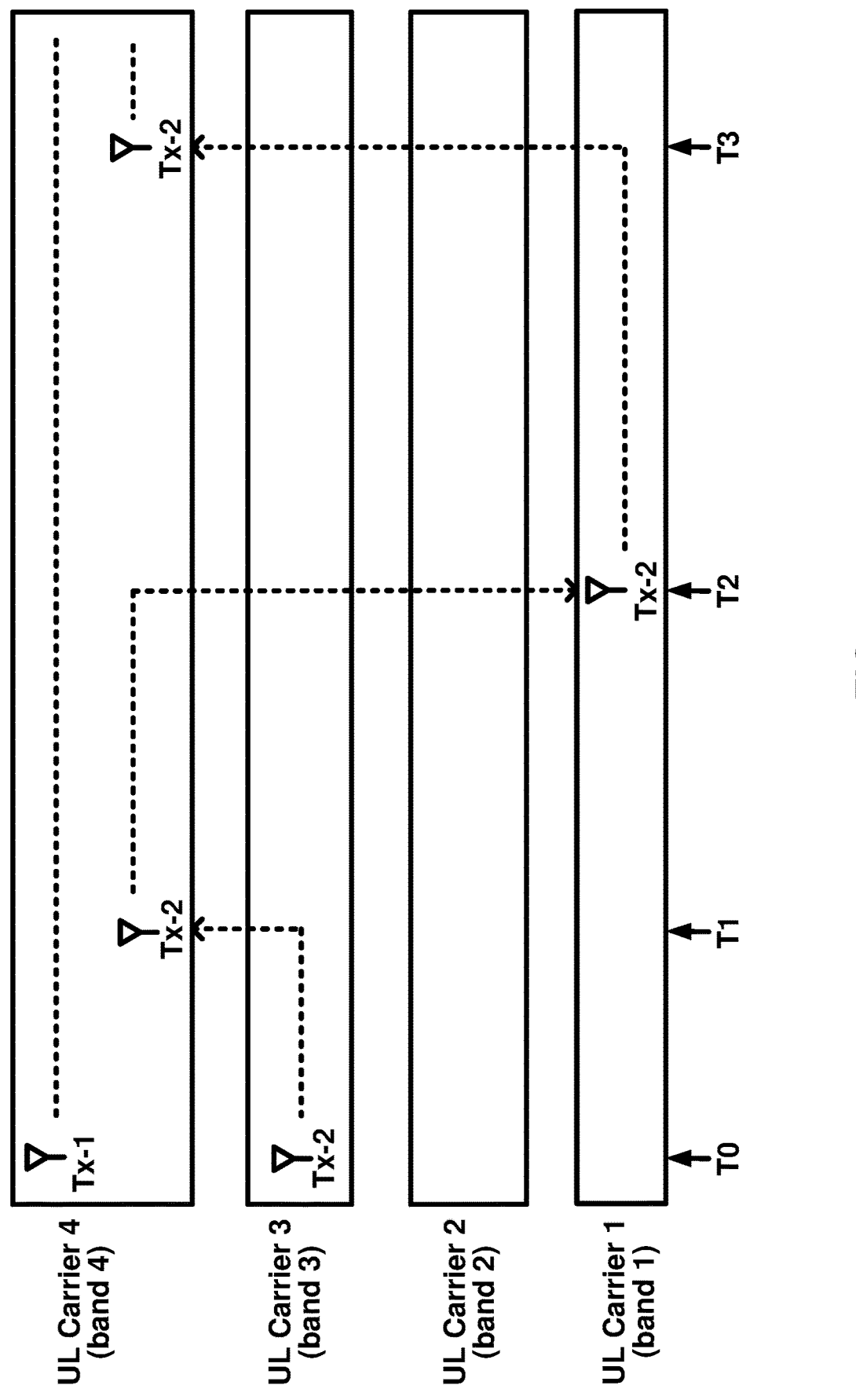
FIG. 29 illustrates an example of dynamic UL Tx switching across four UL carriers in four different bands, according to some embodiments.

FIG. 29 shows an example of dynamic UL Tx switching across four UL carriers in four different bands. In this example, the UE is configured with a set of four UL carriers:

UL carrier 1, UL carrier 2, UL carrier 3, and UL carrier 4. The UE may determine that UL carrier 4 is the anchor UL carrier of the set. For example, UL carrier 4 may be configured via RRC signaling as the anchor UL carrier. The UE may determine that UL carrier 1 and UL carrier 2 and UL carrier 3 are second UL carriers associated with the anchor UL carrier (UL carrier 4). For example, RRC signaling may indicate the association. The UE may activate the anchor UL carrier 4. The UE may activate the set of UL carriers comprising/associated with UL carrier 4.

In the example shown in FIG. 29, the UE uses one Tx chain/antenna (Tx-1) for UL transmissions via UL carrier 4 (the anchor UL carrier), and/or switched the other Tx chain/antenna (Tx-2) among/across the set of UL carriers (UL carrier 1 and UL carrier 2 and UL carrier 3 and UL carrier 4). For example, at time T0, the UE may transmit a one-layer UL transmission using Tx-1 via UL carrier 4 and/or a one-layer UL transmission using Tx-2 via UL carrier 3. The UE may receive an UL grant for UL carrier 4 at T1. The UL grant may comprise a two-layer UL grant. For example, the UE may switch Tx-2 to UL carrier 4. The UE transmit the two-layer UL transmission using Tx-1 and Tx-2 via UL carrier 4. The UE may switch Tx-2 to UL carrier 1 at T2, e.g., for a one-layer UL transmission via UL carrier 1, and/or in response to TDD configuration and/or slot formats indicating uplink "U" slots/symbols/subframes for UL carrier 1. The UE may receive an UL grant for UL carrier 4 at T3. The UL grant may comprise a two-layer UL grant. For example, the UE may switch Tx-2 to UL carrier 4. The UE transmit the two-layer UL transmission using Tx-1 and Tx-2 via UL carrier 4.

In an example, the UE may receive an indication (e.g., a switching command) to switch the anchor UL carrier from carrier 4 to carrier 2. For example, the UE may receive a MAC-CE/DCI comprising the indication. The UE may use one Tx chain/antenna (Tx-1) for UL transmissions via UL carrier 2 (the anchor UL carrier), and/or switched the other Tx chain/antenna (Tx-2) among/across the set of UL carriers (UL carrier 1 and UL carrier 2 and UL carrier 3 and UL carrier 4).

The UE may expect to be scheduled with two-port/two-layer UL transmissions for the (active) anchor UL carrier.

In an example, the RRC configuration of anchor UL carrier or UL carrier pair may be in response to the UE capability. For example, the UE may transmit capability information comprising a field indicating that the UE is not capable of simultaneous switching of 2Tx chains/antennas. For example, the UE may not expect simultaneous switching of both Tx chains/antennas, e.g., not based on scheduling commands, but maybe based on specific switching/activation command indicated by a MAC-CE and/or a specific DCI format, e.g., for UL carrier pair switching and/or anchor UL carrier switching/activation.

Throughout the disclosure, a "carrier" may be replaced by a "band", e.g., UL band pair, and/or anchor band, and/or band switching, etc.

In an embodiment, UE may receive RRC message(s) comprising configuration parameters that indicate each configured UL carrier as either carrier1 (capable of 1Tx) or carrier2 (capable of 2Tx). The network may configure two sets/groups of UL carrier, e.g., a first group of UL carriers as carrier1 (capable of 1Tx); and a second group of UL carriers as carrier2 (capable of 2Tx). In an example, a first half/ portion of configured UL carriers comprising the first half/ portion of carrier indexes with lower values may comprise the first group, and a second half/portion of configured UL carriers comprising the second half/portion of carrier indexes with higher values may comprise the second group, or vice versa.

In an example, it may be pre-defined/configured that switching between which carriers is allowed. For example, switching between carriers of a same/opposite Tx capability may be allowed. In an example, at a given time, the UE may not expect to be performing dynamic Tx switching using 2 carriers with same Tx capability, e.g., one carrier supports 1Tx and the other supports 2Tx. In an example, if at a given time, the UE is using 2 carriers both supporting 2Tx, the UE is not expected to transmit two-port transmissions simultaneously on the two UL carriers.

Figure 30:
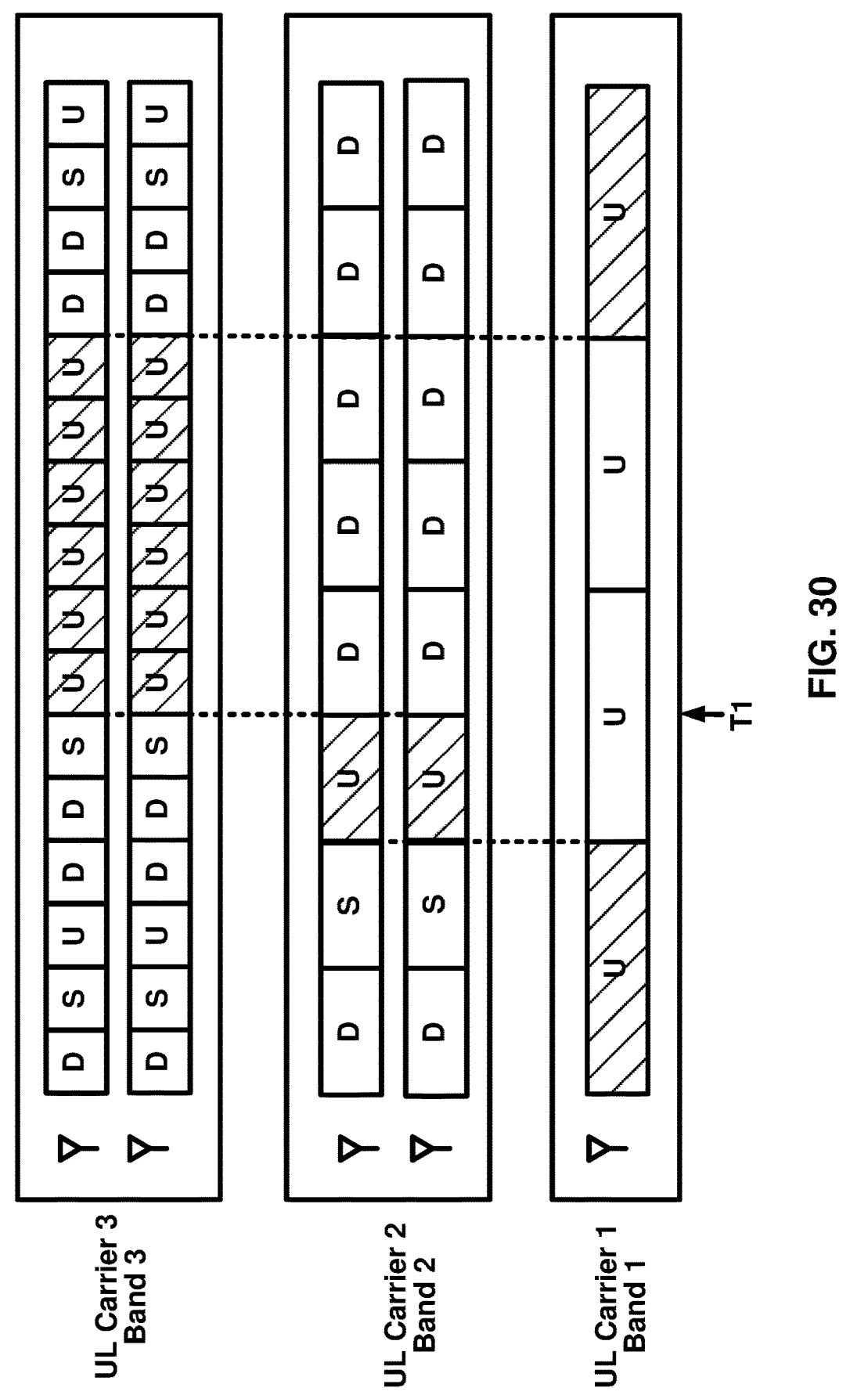
FIG. 30 illustrates an example of dynamic UL Tx switching, according to some embodiments.

FIG. 30 shows an example of dynamic UL Tx switching based on embodiments. In this example, received RRC signaling may indicate that UL carrier 2 and UL carrier 3 are capable of two UL Tx antenna connectors, and UL carrier 1 is capable of one UL Tx antenna connector. In this example, UE switches at time T1 both Tx chains/antennas from UL carrier 2 to UL carrier 3. For example, the UE may transmit a two-port UL transmission using both Tx chains/antennas via UL carrier 3. A previous UL transmission may be another two-port UL transmission using both Tx chains/antennas via UL carrier 2. A respective switching gap for switching both Tx associated with the band combination comprising band 2 and band 3 may be applied, during which the UE may not expect to transmit on any (of the two) UL carriers.

In example of FIG. 30. UL carrier 1 may be the anchor UL carrier. UL carrier 2 and UL carrier 3 may be second UL carriers associated with UL carrier 1.

Figure 31:
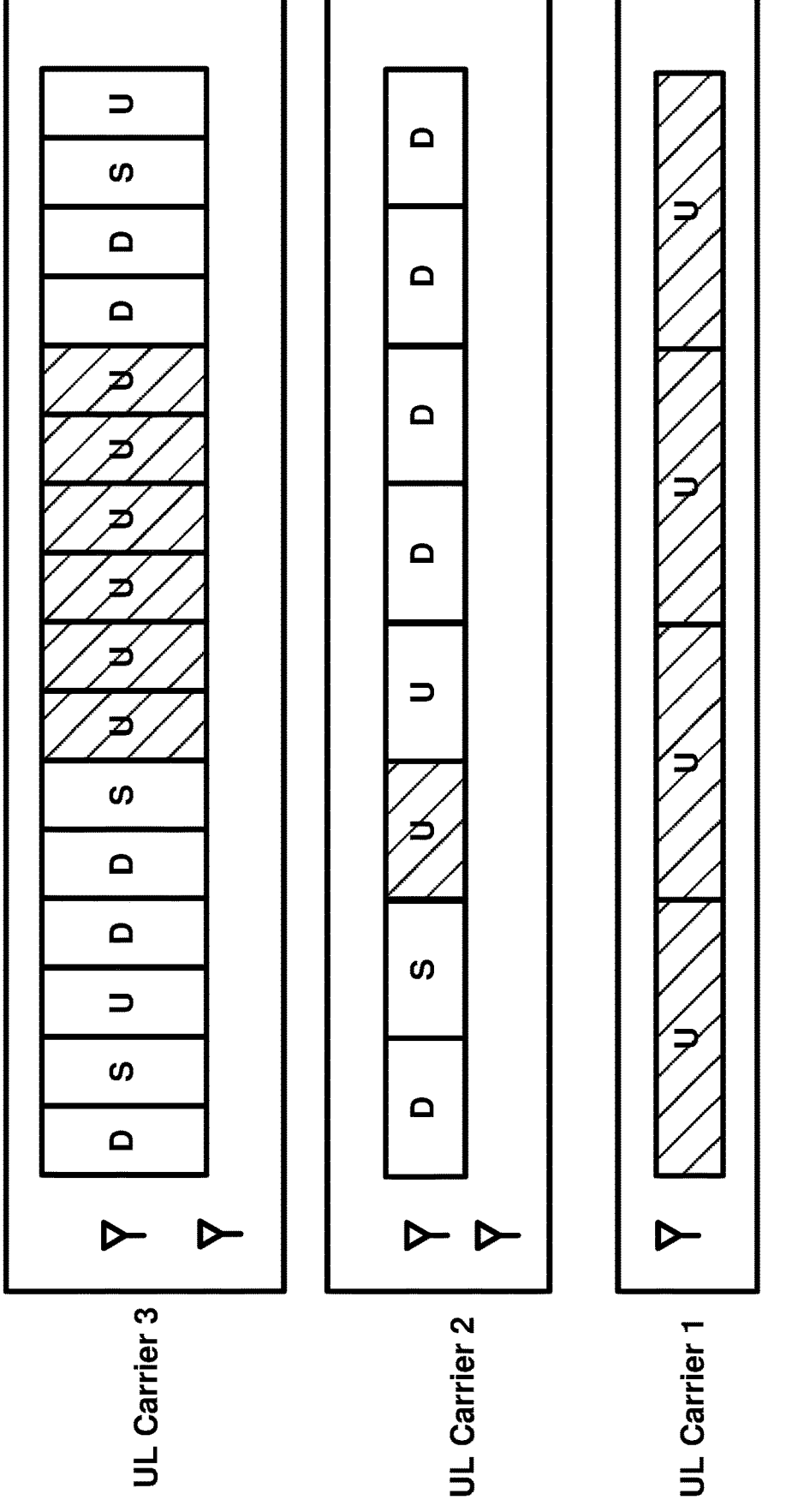
FIG. 31 illustrates an example of dynamic UL Tx switching, according to some embodiments.

FIG. 31 shows an example of dynamic UL Tx switching. In this example, the UE is not capable of dual UL transmissions. This example may be referred to as switched UL transmission mode (e.g., TDM). For example, received RRC signaling may indicate/configure UL carrier 2 and UL carrier 3 as switched UL carriers.

A wireless device may receive one or more messages comprising configuration parameters of one or more cells. The wireless device may receive one or more radio resource control (RRC) messages indicating a plurality of uplink carrier pairs, each uplink carrier pair comprising two uplink carriers between which a transmission antenna may switches. The wireless device may switch a first transmission antenna from a first uplink carrier of a first uplink carrier pair to a second uplink carrier of the first uplink carrier pair. The first uplink carrier pair may be selected from the plurality of uplink carrier pairs. The wireless device may transmit an uplink transmission using the first transmission antenna via the second uplink carrier.

The one or more RRC messages may further indicate that uplink transmission switching is configured for the wireless device using an uplink carrier pair of the plurality of uplink carrier pairs. The wireless device may select the first uplink carrier pair from the plurality of uplink carrier pairs. The first uplink carrier may be configured in a first frequency band. The second uplink carrier may be configured in a second frequency band. The first uplink carrier and the second uplink carrier may be configured for dual connectivity. The first uplink carrier and the second uplink carrier may be configured for a carrier aggregation. The carrier aggregation may be an inter-band carrier aggregation. One of the first uplink carrier and the second uplink carrier may be configured for supplementary uplink. A transmitter of the wireless device may comprise the first transmission antenna and a second transmission antenna. A count of transmission antennas of the wireless device may be two. The first transmission antenna may be switched between the first uplink carrier and the second uplink carrier. The second transmission antenna may be used for uplink transmissions via the first uplink carrier. The switching may be in response to receiving a scheduling command for the second uplink carrier. The scheduling command may indicate a one-port uplink transmission.

The wireless device may switch the first transmission antenna from the second uplink carrier to the first uplink carrier. For example, the switching the first transmission antenna from the second uplink carrier to the first uplink carrier comprises (re-)configuring the first transmission antenna to be used for transmission scheduled via the first uplink carrier. For example, the switching the first transmission antenna from the second uplink carrier to the first uplink carrier comprises (re-)configuring the first transmission antenna to be not used for the second uplink carrier. The switching may be in response to receiving a second scheduling command for the first uplink carrier. The second scheduling command may indicate a two-port uplink transmission. The wireless device may transmit the two-port (e.g., dual) uplink transmission using the first transmission antenna and a second transmission antenna, and via the first uplink carrier. The wireless device may be capable of supporting the two-port (e.g., dual) uplink transmission using the first transmission antenna and the second transmission antenna. The wireless device may receive configuration parameters of a cell group. The cell group may comprise the first uplink carrier and the second uplink carrier, indicating that the two-port (e.g., dual) uplink transmission is enabled via the first uplink carrier. The wireless device may select the first uplink carrier pair, among the plurality of uplink carrier pairs, based on receiving an indication of activation of the first uplink carrier pair. The one or more RRC messages may comprise the indication of activation of the first uplink carrier. The wireless device may receive a downlink signal comprising the indication of activation of the first uplink carrier. The downlink signal may be a downlink control information (DCI) based on a first format. The downlink signal may be a medium access control control element (MAC-CE) comprising the indication of activation of the first uplink carrier. The indication of activation of the first uplink carrier may be in response to expiration of a timer in higher layers.

The one or more RRC messages may further indicate configuration of a plurality of cells comprising a plurality of uplink carriers, that comprise the two uplink carriers of the first uplink carrier pair, for the wireless device. Each uplink carrier, of the plurality of uplink carriers, may be associated with a respective frequency band. For each uplink carrier pair, the one or more RRC messages may comprise respective parameters for uplink transmission switching. The parameters respective to each uplink carrier pair for uplink transmission switching may comprise: an indication that one of the two uplink carriers of the respective uplink carrier pair is capable of one transmission antenna connector, and another one of the two uplink carriers is capable of two transmission antenna connectors. The parameters respective to each uplink carrier pair for uplink transmission switching may comprise an indication an uplink transmission switching option (e.g., comprising Option 1 and/or Option 2 in the example embodiments). The uplink transmission switching option may comprise switched uplink (e.g., Option 1 in the example embodiments) or dual uplink (e.g., Option 2 in the example embodiments). The parameters for uplink transmission switching may comprise an indication of location of uplink transmission switching period. The wireless device may transmit a capability information of the wireless device indicating a supported band combination comprising a first frequency band that the first uplink carrier belongs to and a second frequency band that the second uplink carrier belongs to. The capability information may further indicate an uplink transmission switching period associated with the switching the first transmission antenna from the first uplink carrier to the second uplink carrier.

A wireless device may receive one or more radio resource control (RRC) messages indicating a plurality of uplink carrier pairs, each uplink carrier pair comprising two uplink carriers for uplink transmission antenna switching. The wireless device may determine to switch one of uplink transmission antennas between two uplink carriers of a first uplink carrier pair, among the plurality of uplink carrier pairs. The wireless device may transmit uplink transmissions using the uplink transmission antennas via the first uplink carrier pair.

A wireless device may receive one or more radio resource control (RRC) messages indicating configuration of uplink carriers, each uplink carrier associated with a respective frequency band; first parameters for uplink transmission switching using a first carrier pair comprising a first uplink carrier and a second uplink carrier of the uplink carriers; and second parameters for uplink transmission switching using a second carrier pair comprising a third uplink carrier and a fourth uplink carrier of the uplink carriers. The wireless device may determine to switch between the first uplink carrier and the second uplink carrier in response to activation of the first carrier pair. The wireless device may transmit, based on the first parameters, uplink transmissions via the first uplink carrier and the second uplink carrier.

A wireless device may receive one or more radio resource control (RRC) messages indicating a plurality of uplink carriers comprising: a first uplink carrier, associated with a first frequency band, that is capable of transmission using two transmission antennas; and two or more second uplink carriers, associated with second frequency bands different from the first frequency band, that are capable of transmission using one transmission antenna. The wireless device may switch an uplink transmission antenna between two uplink carriers among the plurality of uplink carriers. The wireless device may transmit, based on the switching, uplink transmissions via the plurality of uplink carriers.

The wireless device may transmit a two-port uplink transmission via the first uplink carrier and using the transmission antenna and a second transmission antenna. The wireless device may switch the uplink transmission antenna from the first uplink carrier to a second uplink carrier from the two or more second uplink carriers. The wireless device may transmit a one-port uplink transmission via the second uplink carrier and using the transmission antenna. The wireless device may transmit a one-port uplink transmission via the first uplink carrier and using the second transmission antenna. The one or more RRC message may further indicate two or more first uplink carriers, comprising the first uplink carrier, that are capable of transmission using two transmission antennas. The wireless device may switch a second transmission antenna from the first uplink carrier to a third uplink carrier, wherein the third uplink carrier is selected from the two or more first uplink carriers. The wireless device may transmit a two-port uplink transmission via the third uplink carrier and using the transmission antenna and a second transmission antenna. The switching may be in response to an indication of activation of the third uplink carrier. The wireless device may receive a second RRC message comprising a parameter indicating that the third uplink carrier is activated. The second RRC message may indicate that the first uplink carrier is de-activated. The wireless device may receive a downlink signal comprising the indication of activation. The downlink signal may be a downlink control information (DCI) based on a first format. The downlink signal may be a medium access control control element (MAC-CE) comprising a transport block indicating the activation. The indication may be in response to expiration of a timer in higher layers.

What is claimed is:

1. A wireless device comprising:
one or more processors; and
memory storing instructions that, when executed by the one or more processors, cause the wireless device to:
receive a radio resource control (RRC) reconfiguration or setup message comprising configuration parameters, of at least one cell comprising a plurality of uplink carriers, indicating:
uplink switching with three or more uplink bands, wherein each uplink carrier of the plurality of uplink carriers is in a respective uplink band of the three or more uplink bands; and
a plurality of uplink band pairs, from the three or more uplink bands, for the uplink switching, wherein the configuration parameters comprise, for each uplink band pair of the plurality of uplink band pairs, a respective parameter indicating whether a corresponding uplink band pair is configured with:
uplink switching based on dual uplink; or
uplink switching based on switched uplink; and
transmit, based on a first uplink band pair, of the plurality of uplink band pairs, being configured with the uplink switching based on dual uplink:
a first uplink transmission on a first uplink band of the first uplink band pair; and
a second uplink transmission on a second uplink band of the first uplink band pair.

2. The wireless device of claim 1, further comprising, based on the first uplink band pair being configured with the uplink switching based on dual uplink, simultaneously transmitting the first uplink transmission and the second uplink transmission.

3. The wireless device of claim 1, wherein the first uplink transmission is a first one-port physical uplink shared channel (PUSCH) transmission on a first uplink carrier, of the plurality of uplink carriers, on the first uplink band.

4. The wireless device of claim 1, further comprising transmitting capability information of the wireless device indicating a supported band combination comprising the first uplink band and the second uplink band.

5. The wireless device of claim 1, wherein the configuration parameters further indicate at least one uplink carrier, of the plurality of uplink carriers, associated with each cell of the at least one cell.

6. The wireless device of claim 1, wherein the configuration parameters further indicate, for each uplink carrier of the plurality of uplink carriers, a respective frequency domain location that is in a frequency range of a respective band of the three or more uplink bands.

7. The wireless device of claim 1, wherein the second uplink transmission is a second one-port physical uplink shared channel (PUSCH) transmission on a second uplink carrier, of the plurality of uplink carriers, on the second uplink band.

8. The wireless device of claim 1, wherein the second uplink transmission is a second two-port physical uplink shared channel (PUSCH) transmission on a second uplink carrier, of the plurality of uplink carriers, on the second uplink band.

9. A base station comprising:

one or more processors; and memory storing instructions that, when executed by the one or more processors, cause the base station to:

transmit a radio resource control (RRC), RRC, recon-figuration or setup message comprising configura-tion parameters, of at least one cell comprising a plurality of uplink carriers, indicating:

uplink switching with three or more uplink bands, wherein each uplink carrier of the plurality of uplink carriers is in a respective uplink band of the three or more uplink bands; and a plurality of uplink band pairs, from the three or more uplink bands, for the uplink switching, wherein the configuration parameters comprise, for each uplink band pair of the plurality of uplink band pairs, a respective parameter indicating whether a corresponding uplink band pair is con-figured with:

uplink switching based on dual uplink; or uplink switching based on switched uplink; and receive, based on a first uplink band pair, of the plurality of uplink band pairs, being configured with the uplink switching based on dual uplink:

a first uplink transmission on a first uplink band of the first uplink band pair; and a second uplink transmission on a second uplink band of the first uplink band pair.

10. The base station of claim 9, further comprising, based on the first uplink band pair being configured with the uplink switching based on dual uplink, simultaneously receiving the first uplink transmission and the second uplink trans-mission.

11. The base station of claim 9, wherein the first uplink transmission is a first one-port physical uplink shared chan-nel (PUSCH) transmission on a first uplink carrier, of the plurality of uplink carriers, on the first uplink band.

12. The base station of claim 9, wherein the configuration parameters further indicate at least one uplink carrier, of the plurality of uplink carriers, associated with each cell of the at least one cell.

13. The base station of claim 9, wherein the configuration parameters further indicate, for each uplink carrier of the plurality of uplink carriers, a respective frequency domain location that is in a frequency range of a respective band of the three or more uplink bands.

14. The base station of claim 9, wherein the second uplink transmission is a second one-port physical uplink shared channel (PUSCH) transmission on a second uplink carrier, of the plurality of uplink carriers, on the second uplink band.

15. The base station of claim 9, wherein the second uplink transmission is a second two-port physical uplink shared channel (PUSCH) transmission on a second uplink carrier, of the plurality of uplink carriers, on the second uplink band.

16. A non-transitory computer-readable medium compris-ing instructions that, when executed by one or more pro-cessors of a wireless device, cause the wireless device to:

receive a radio resource control (RRC) reconfiguration or setup message comprising configuration parameters, of at least one cell comprising a plurality of uplink car-riers, indicating:

uplink switching with three or more uplink bands, wherein each uplink carrier of the plurality of uplink carriers is in a respective uplink band of the three or more uplink bands; and a plurality of uplink band pairs, from the three or more uplink bands, for the uplink switching, wherein the configuration parameters comprise, for each uplink band pair of the plurality of uplink band pairs, a respective parameter indicating whether a corre-sponding uplink band pair is configured with:

uplink switching based on dual uplink; or uplink switching based on switched uplink; and transmit, based on a first uplink band pair, of the plurality of uplink band pairs, being configured with the uplink switching based on dual uplink:

a first uplink transmission on a first uplink band of the first uplink band pair; and a second uplink transmission on a second uplink band of the first uplink band pair.

17. The non-transitory computer-readable medium of claim 16, further comprising, based on the first uplink band pair being configured with the uplink switching based on dual uplink, simultaneously transmitting the first uplink transmission and the second uplink transmission.

18. The non-transitory computer-readable medium of claim 16, wherein the first uplink transmission is a first one-port physical uplink shared channel (PUSCH) transmis-sion on a first uplink carrier, of the plurality of uplink carriers, on the first uplink band.

19. The non-transitory computer-readable medium of claim 16, further comprising transmitting capability infor-mation of the wireless device indicating a supported band combination comprising the first uplink band and the second uplink band.

* * * * *